United States Patent
Spira et al.

(10) Patent No.: US 9,760,660 B2
(45) Date of Patent: Sep. 12, 2017

(54) METHODS OF DEVELOPING A MATHEMATICAL MODEL OF DYNAMICS OF A VEHICLE FOR USE IN A COMPUTER-CONTROLLED VEHICLE SIMULATOR

(71) Applicant: CAE INC., Montreal (CA)

(72) Inventors: Daniel Spira, Beaconsfield (CA); Vincent Myrand-Lapierre, Montreal (CA); Olivier Soucy, Montreal (CA)

(73) Assignee: CAE Inc., Montréal, Québec ( * ) Notice: Subject to any disclaimer, the term of this patent is extended or adjusted under 35 U.S.C. 154(b) by 563 days.

(21) Appl. No.: 14/009,916

(22) PCT Filed: Oct. 9, 2012

(86) PCT No.: PCT/CA2012/000954
§ 371 (c)(1),
(2) Date: Oct. 4, 2013

(87) PCT Pub. No.: WO2013/049930
PCT Pub. Date: Apr. 11, 2013

(65) Prior Publication Data
US 2014/0207429 A1    Jul. 24, 2014

Related U.S. Application Data

(60) Provisional application No. 61/544,012, filed on Oct. 6, 2011.

(51) Int. Cl.
*G06F 17/10*    (2006.01)
*G06F 17/50*    (2006.01)
(Continued)

(52) U.S. Cl.
CPC ......... *G06F 17/5009* (2013.01); *G06Q 10/04* (2013.01); *G09B 9/02* (2013.01);
(Continued)

(58) Field of Classification Search
None
See application file for complete search history.

(56) References Cited

U.S. PATENT DOCUMENTS 7,236,914 B1 *    6/2007    Zyskowski ......... G06F 17/5009
                                                   434/30
2004/0050999 A1 *    3/2004    Hill ...................... G05D 19/02
                                                   244/17.27
2010/0318336 A1    12/2010    Falangas

FOREIGN PATENT DOCUMENTS

EP    0909380 A1    4/1999

OTHER PUBLICATIONS

J. Leishman, et al., "State-Space Representation of Unsteady Airfoil Behavior," AIAA Journal, May 1990, pp. 836-844.*

(Continued)

*Primary Examiner* — Aniss Chad
*Assistant Examiner* — David M Rogers
(74) *Attorney, Agent, or Firm* — Fasken Martineau DuMoulin LLP

(57) ABSTRACT

A method of developing a mathematical model of dynamics of a vehicle for use in a computer-controlled simulation, comprising: selecting a coefficient of a state-space model mathematically modelling the dynamics of the vehicle, the selected coefficient having a value for a predetermined state of the vehicle; and varying, a parameter of a physically-based computerized model mathematically modelling the dynamics of the vehicle, the parameter related to at least one of physical characteristics of the vehicle and phenomena influencing the dynamics of the vehicle, to improve the accuracy of the physically-based model via computer-implemented numerical optimization, the computer-implemented numerical optimization targeting the coefficient of the state-space model such that the difference between a value predicted by the physically-based model and the value of the (Continued)

coefficient of the state-space model for the predetermined vehicle state is within a predetermined range.

21 Claims, 41 Drawing Sheets

(51) Int. Cl.
    *G09B 23/02*     (2006.01)
    *G06Q 10/04*     (2012.01)
    *G09B 9/02*     (2006.01)

(52) U.S. Cl.
    CPC .......... *G09B 23/02* (2013.01); *G06F 17/5095* (2013.01); *G06F 2217/16* (2013.01)

(56) References Cited

OTHER PUBLICATIONS

C. Bottasso, et al., "Time-Domain Parameter Estimation for First-Principle Rotorcraft Models Using Recursive and Batch Procedures: Formulation and Preliminary Results," Scientific Report No. DIA-SR. (Dipartimento di Ingegneria Aerospaziale, Politecnico di Milano, Italy), Apr. 2009, 30 pages.*
B. Glaz, et al., "Surrogate Based Optimization of Helicopter Rotor Blades for Vibration Reduction in Forward Flight," 47th AIAA/ASME/ASCE/AHS/ASC Structures, Structural Dynamics, and Materials Conference, May 2006, Newport, Rhode Island, 21 pages.*
"Helicopter Training Toolkit," U.S. JHSIT, 1st Ed., Sep. 2009, 45 pages.*
"Joint Aviation Requirements," JAR-FSTD H: Helicopter Flight Simulation Training Devices, Initial Issue, May 2008, 56 pages.*
P. Van Esbroeck, et al., "Model Development of a Level D Black Hawk Flight Simulator," Paper No. AIAA-2000-4582, AIAA Modeling and Simulation Technologies Conference, Denver, CO, Aug. 2000, 11 pages.*
C. Quiding, et al., "GenHel S-76C Model Correlation using Flight Test Identified Models," Proceedings of the American Helicopter Society 64th Annual Forum, Montreal, Canada, Apr. 29-May 1, 2008, 28 pages.*
J. Howlett, "UH-60A Black Hawk Engineering Simulation Program: Vol. I: Mathematical Model," NASA CR-166309, 1981, 361 pages.*
P. Hamel, et al., "Advances in Rotorcraft System Identification", Progress in Aerospace Science, vol. 33, 1997, pp. 259-284.*
P. Talbot, et al., "A Mathematical Model of a Single Main Rotor Helicopter for Piloted Simulation," NASA TM-84281, 1982, 52 pages.*

J. Murray, et al., "pEst Version 2.1 User's Manual," NASA Technical Memorandum 88280, Ames Research Center, Dryden Flight Research Facility, Edwards, California, 1987, 75 pages.*
F. Bailey, "A Simplified Theoretical Method of Determining the Characteristics of a Lifting Rotor in Forward Flight," NACA Report No. 716, 1941, 19 pages.*
International Search Report of PCT/CA2012/000954, Feb. 6, 2013, Goran Basic.
Smith, S., "Helicopter Simulation Modeling Techniques for Meeting FAA AC120-63 Level D Qualification Requirements," Proceedings of the American Helicopter Society 56th Annual Forum, Va. Beach, Va., May 2000.
van der Vorst, J., Zeilstra, K. D. S., Jeon, D. K., Choi, H. S., and Jun, H. S., "Flight Mechanics Model Development for a KA32 Training Simulator," Proceedings of the 35th European Rotorcraft Forum, Hamburg, Germany, Sep. 2009, pp. 1-9.
Spira, D., and Davidson, I., "Development and Use of an Advanced Tandem-Rotor Helicopter Simulator for Pilot Training," Proceedings of the RAeS Conference on The Challenge of Realistic Rotorcraft Simulation, London, UK, Nov. 2001.
Anon., Federal Register 14 CFR Part 60, Federal Aviation Administration, May 2008.
Jategaonkar, R. J., Flight Vehicle System Identification: A Time Domain Methodology, American Institute of Aeronautics and Astronautics, Reston, Va., 2006, pp. 394-485.
Tischler, M. B., and Remple, R. K., Aircraft and Rotorcraft System Identification: Engineering Methods with Flight Test Examples, American Institute of Aeronautics and Astronautics, Reston, Va., 2006, pp. 321-433.
Padfield, G. D., Helicopter Flight Dynamics: The Theory and Application of Flying Qualities and Simulation Modeling, AIAA Education Series, Washington, D.C., 1996, pp. 184-279.
Theophanides, M., and Spira, D., "An Object-Oriented Framework for Blade Element Rotor Modelling and Scalable Flight Mechanics Simulation," Proceedings of the 35th European Rotorcraft Forum, Hamburg, Germany, Sep. 22-25, 2009, pp. 1-14.
Prouty, R. W., Helicopter Performance, Stability, and Control, Krieger Publishing Company, Malabar, Fla., 1995, pp. 273-339 and 541-637.
Peters, D., and HaQuang, N., "Dynamic Inflow for Practical Applications", Journal of the American Helicopter Society, vol. 33, No. 4, Oct. 1988, pp. 64-68.
Nocedal, Jorge and Wright, Stephen J., Numerical Optimization, Springer Science and Business Media, LLC, Cover pages, Contents, Preface, Preface to the Second Edition and Chapter 2 (pp. 10-29), 2nd ed., 2006, New York, N.Y.

* cited by examiner

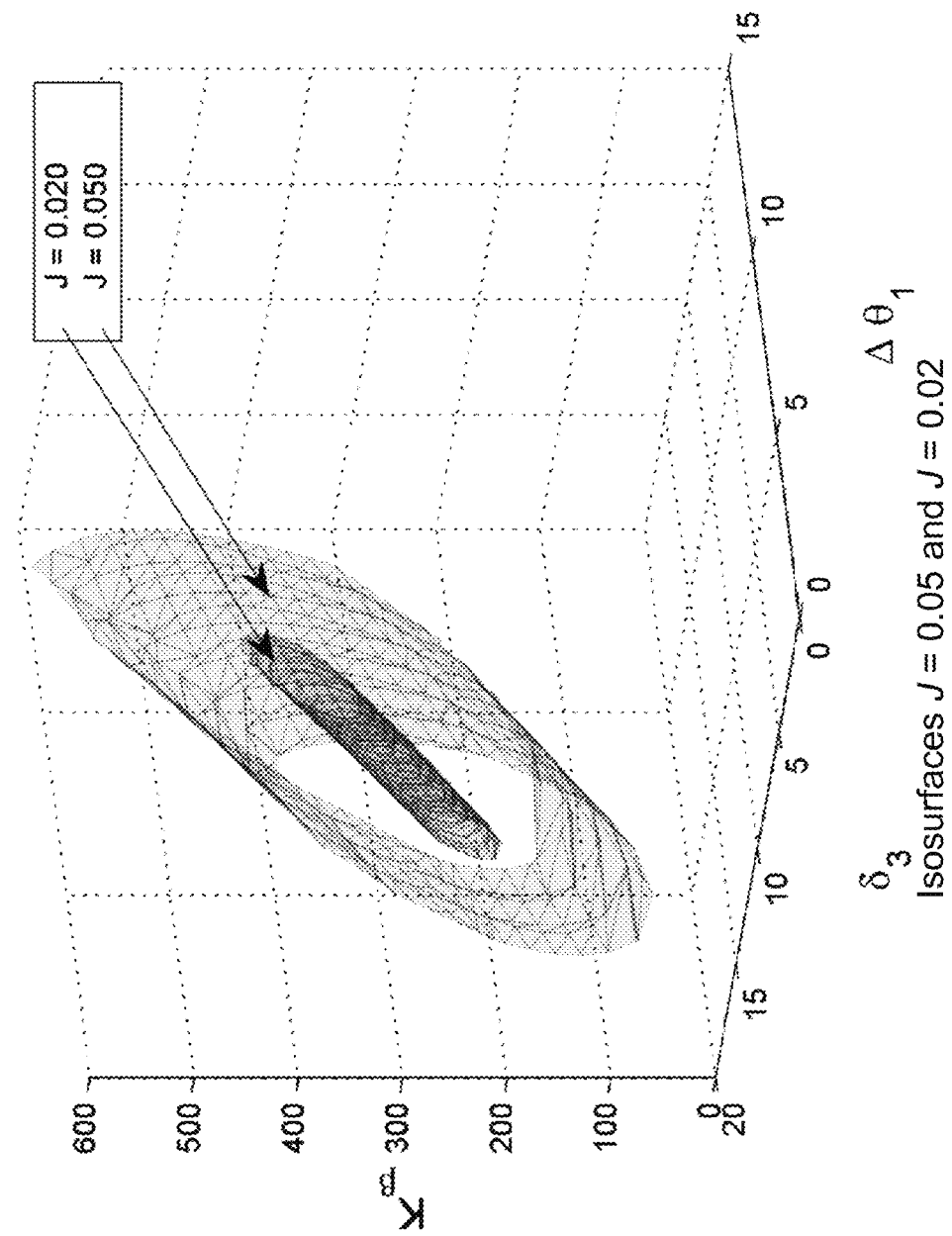

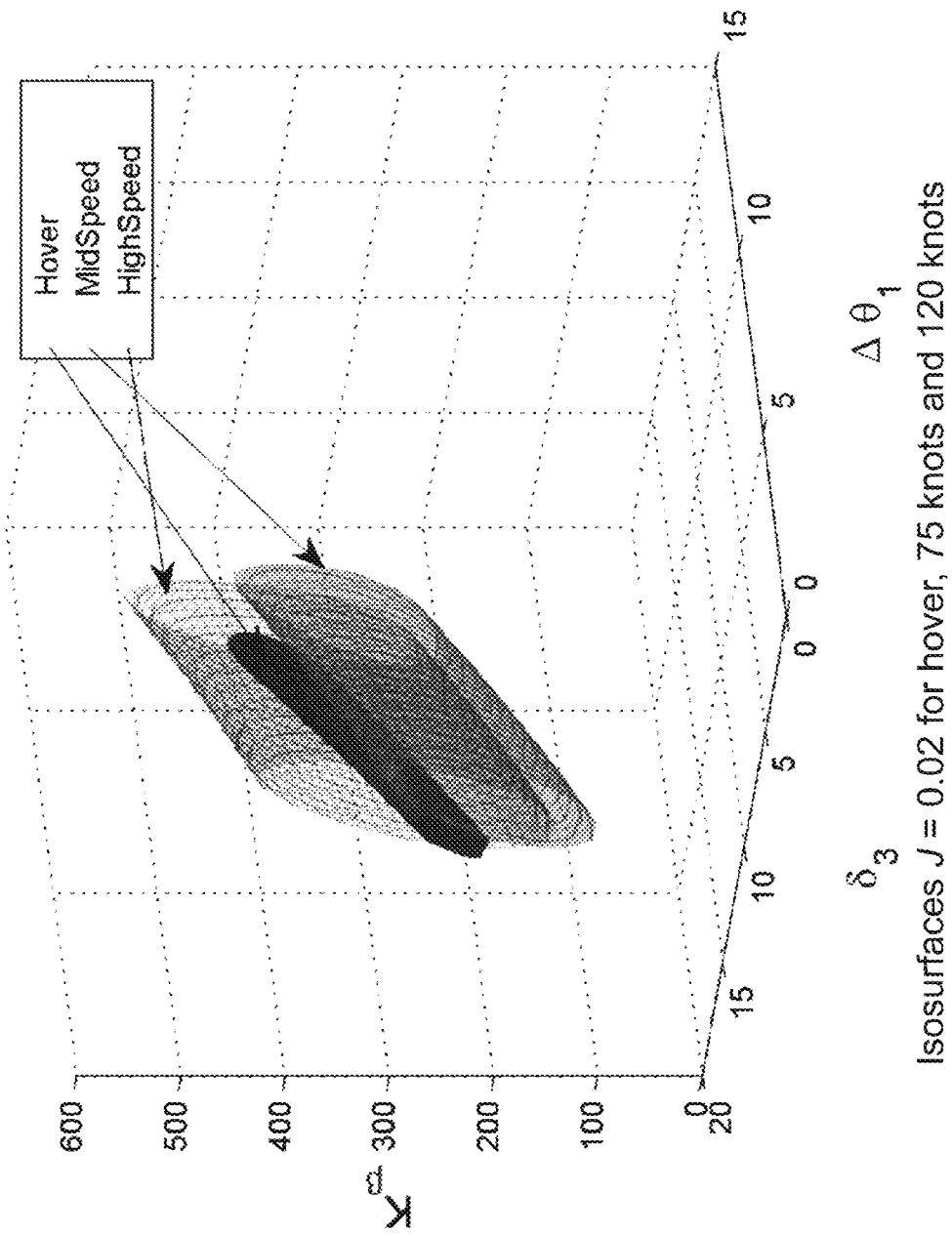

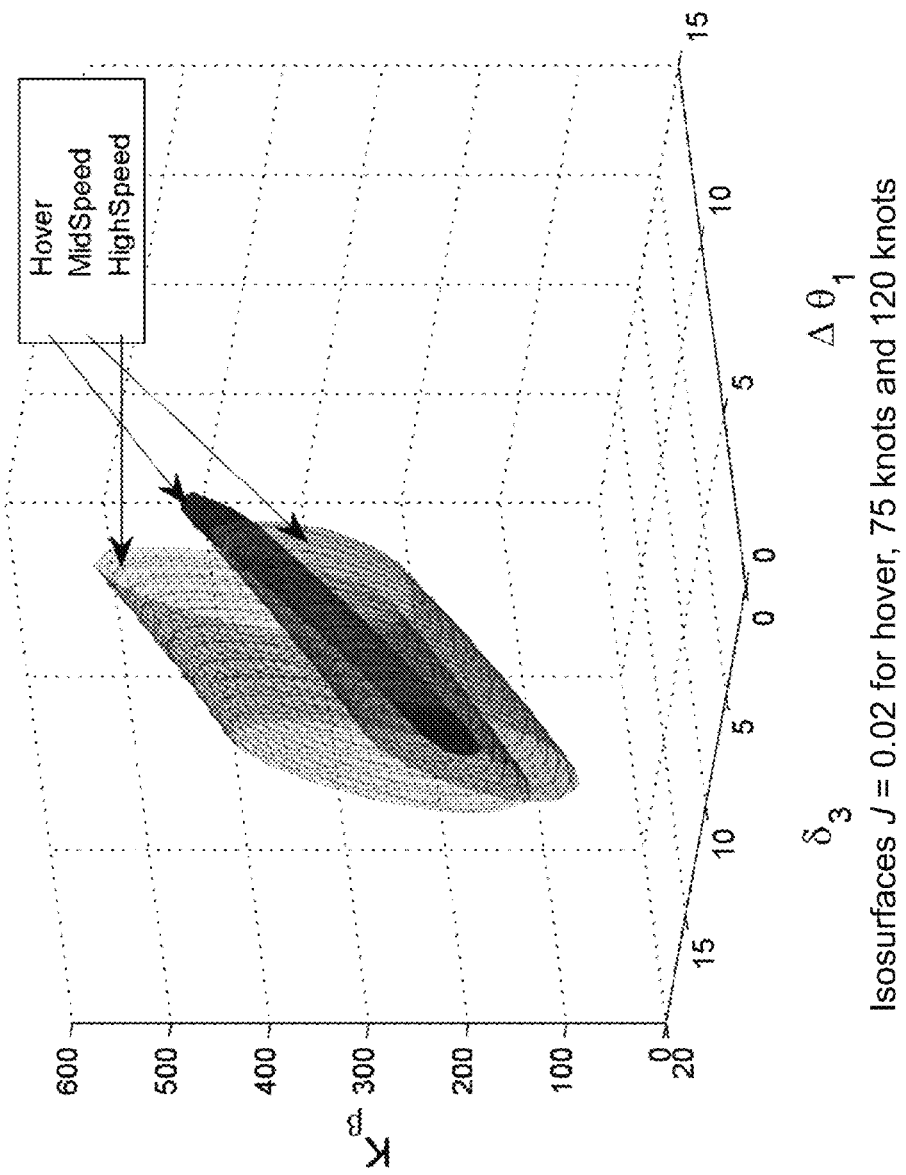

METHODS OF DEVELOPING A MATHEMATICAL MODEL OF DYNAMICS OF A VEHICLE FOR USE IN A COMPUTER-CONTROLLED VEHICLE SIMULATOR

CROSS-REFERENCE TO RELATED APPLICATIONS

The present application claims the benefit of priority to U.S. provisional patent application Ser. No. 61/544,012, filed Oct. 6, 2011, entitled: "Reducing Blade Element Model Configuration Data Requirement Using Identification and Optimization". This application is incorporated herein by reference in its entirety in all jurisdictions permitting incorporation by reference.

FIELD

The present specification relates to methods of developing mathematical models of dynamics of a vehicle for use in computer-controlled simulations of at least the vehicle, and to computer-controller simulators employing a model developed by such a method.

BACKGROUND

The goal of a vehicle simulator is to cause a human operator (the "operator" of the simulator) to feel (in as much as this is possible) what he or she would feel in the actual vehicle being simulated, were they operating the vehicle under the actual conditions that the simulator is then currently attempting to simulate. In circumstances where regulatory approval of the simulator is required (e.g. in the case of an aircraft simulator), a very high degree of fidelity of vehicle simulation is required in order to gain such approval, and to assist in the simulator actually be useful to its human operators to gain experience in operating the vehicle being simulated.

In order to achieve such a level of fidelity, the simulator's computer systems contain what is known as a "model" of the vehicle. This model of the vehicle attempts to mathematically describe various characteristics of the actual vehicle being simulated. The simulator's computer systems use this model to control the various other systems of the simulator (e.g. mechanical actuators that generate various accelerations experienced by the operator, simulator cabin visual display and audio generation systems, simulated vehicle instrumentation within the simulator cabin, etc.). The model must accurately mathematically describe the characteristics of the actual vehicle in order to have an accurate vehicle simulation, and it must do so preferably throughout the entire range of the intended simulated operating conditions, which typically encompasses the vehicle's entire operational envelope.

Typical simulation models of vehicle dynamics are what is known in the art as physically-based mathematical models. A physically-based mathematical model incorporates various explicit terms related to the vehicle physical's components and/or various physical phenomena that are believed to affect the vehicle's dynamics. (As it is impossible to perfectly mathematically model vehicle dynamics, there is no "one" physically-based model per vehicle. Many different physically-based models of a vehicle are possible that will satisfactorily enable vehicle simulation. Different simulator manufacturers and different model developers will create their own, slightly different models for using in modeling a vehicle.)

The reason why physically-based models are typically used in simulators is because they are generally capable of predicting the vehicle's dynamics under vehicle operating conditions to be simulated other than those operating conditions at which the physically-based models were validated. This predictive nature of such models is very important to model developers and simulator manufacturers.

The development of a physically-based model is very complex and time consuming; and particularly so for vehicles for which there is no comprehensive theory of motion. An example of such a vehicle is a helicopter; there being no comprehensive theory governing all aspects of helicopter flight mechanics. What this means is that a helicopter model developer, when developing a model for a particular helicopter, will incorporate into the model such terms as he or she believes to be appropriate, but that such a model will necessarily have parameters that are unknown (e.g. coefficients of terms already in the model, terms missing from the model—effectively having a coefficient of zero, etc.) and whose value must be determined in order to achieve the required level of fidelity of vehicle simulation. The values are conventionally determined through a time consuming iterative process (typically known as "tuning") to achieve the required level of objective and subjective fidelity throughout the entire simulated helicopter flight envelope.

As an example, FIG. 1 illustrates a conventional method of physically-based vehicle model development. As a starting point the model developer(s) selects a physically-based mathematical model they believe to be appropriate (that will serve as a starting point of the development process) for the vehicle they are trying to simulate. What is "appropriate" in any particular instance is a function of experience, training and skill-level of the developer. Continuing with the example of a helicopter simulator, the model developer may start with a blade element model as a foundation for the simulation, and incorporate models representing physical phenomena such as rotor inflow and aerodynamic phase lag (ref 3, 4 & 5); fuselage and empennage aerodynamic (ref 4, 5 & 6); and aeroelastic parameters (ref 7 & 8). Each of these models includes parameters that may need to be determined empirically for a specific helicopter type.

Once the model has been constructed, it is populated with configuration data such as aerodynamic coefficients, mass properties, and aeromechanical data. As was discussed above, the model (being physically-based) will also include unknown parameters whose values need to be determined. Two examples of such unknown parameters in the helicopter example include (but are not limited to) inflow model parameters and downwash amplification factors for interactional aerodynamics. As was also discussed, the determination of the values of these parameters is accomplished via an iterative tuning process. Specifically, tuning is generally performed using brute-force methods, e.g. placing a large number of sweeping combinations of parameter values in the model and then assessing the impacts of such combinations on the model. For example, simulated time responses generated with a physically-based mathematical models for the various combinations of parameter values are compared with corresponding flight test data recorded during the flight of a real helicopter. The tuning process requires a lot of skill and experience from the model designers as, at each iteration, the model designers analyze the differences between the simulated time responses of the model and the corresponding vehicle (e.g. flight) test data, and determine new candidate parameter values for the next iteration. This process continues until an acceptable convergence between the simulated time responses and the corresponding vehicle test data is reached. If the tuning process is ineffective, i.e. there is no acceptable convergence between the simulated time response and the corresponding vehicle test data, then the physically-based mathematical model itself (as opposed to simply the values of its parameters) needs to be changed to incorporate terms for different physical components and/or phenomena, and the process restarted to tune that new model.

The decision of which parameters to adjust, either individually or in combination, is often based on physical reasoning, convenience or heuristics. Further the configuration data are not always known, in which case configuration data parameters may also need to be treated as tuning parameters. Thus, in the end, while the conventional development methodology of physically-based mathematical models for simulators yields satisfactory results, it is complex and time consuming, A second conventional method (albeit completely separate from the physically-based model development process) is also used to develop vehicle models for use in simulating vehicle dynamics. This method may be referred to as the "state-space" method, as it involves the generation of a "state-space" model of the vehicle's dynamics. In a state-space model the vehicle is seen as a black-box, into which various inputs are sent and as a result of the functioning of which various outputs occur. Through various conventional techniques, a "state-space" model of the vehicle is created, such that the various inputs when sent into the model result in the appropriate outputs from the model. The actual physical components of the vehicle, their properties and the actual physical phenomena affecting the vehicle are neither expressly nor discretely modeled as part of the state-space model creation process (contrary to the case of a physically-based model). For an aircraft, for example, a typically state-space model consists of a small number of parameters that describe the dynamics of the vehicle as represented by the large set of time-response data.

A major drawback of a state-space model is the fact that such models can rarely be used for vehicle operating conditions other than those at which the model was created. This is because such state-space models do not have a good predictive capability beyond such vehicle operating conditions. Thus in the field of aircraft simulation, state-space models are conventionally only used for low-fidelity simulations or specialized applications requiring only limited flight envelope coverage (i.e. vehicle operating conditions limited to those similar to operating condition at which the state-space model was created). They are not used for high-fidelity, full-flight envelope simulations.

For example, if a state-space model is identified (created) from an aircraft's flight test data for an aircraft having and airspeed of 100 knots when travelling near sea level, one cannot assume that this model will also be valid for the same aircraft travelling at the same speed at an altitude of 10,000 feet. In the two cases the atmospheric pressure and density, and hence aerodynamic forces acting on the aircraft, will be different. (By contrast, a physically-based mathematical model for the same aircraft having properly-tuned based on data for the aircraft travelling at sea level would be able to predict the aircraft's behavior at 10,000 feet, as the physically-based model would incorporate mathematical terms related to physical laws including the effects of atmospheric pressure and density.)

It is common in the aircraft design and test and evaluation fields to express the flying qualities experienced by a human operator of the aircraft as stability and control coefficients, which are parameters of a state-space model. The stability and control coefficients describe the dynamic response of the vehicle to control inputs at a single operating condition without detailed knowledge the physical properties of the aircraft. Thus, even though state-space models are not used for full-envelope high-fidelity simulations, state-space models are useful in describing vehicle dynamics more compactly than the large set of time-response data that they represent. However, the traditional simulation model development method does not use stability and control coefficients during the design of the physically-based model. Therefore, the stability and control characteristics of the resulting physically-based model may not be accurate. Further improvements to the generation of aircraft simulation models are therefore desirable.

SUMMARY

It is an object of the technology disclosed in the present specification to ameliorate at least some of the inconveniences present in the prior art.

It is a further object of the technology disclosed in the present specification to provide an improved method of developing a mathematical model of dynamics of a vehicle for use in a computer-controlled simulation of at least the vehicle, as least as compared with some of the prior art.

Thus, in one aspect, the present technology provides a method of developing a mathematical model of dynamics of a vehicle for use in a computer-controlled simulation of at least the vehicle. The method comprises:

Selecting at least one coefficient of a state-space model mathematically modelling the dynamics of the vehicle stored within at least one non-transient computer-readable information storage medium. The state-space model has a plurality of coefficients describing the dynamics of the vehicle being modeled. The selected at least one coefficient has a value for at least one predetermined state of the vehicle.

Varying, via at least one computer processor in operative communication with the at least one non-transient computer-readable information storage medium, at least one parameter of a physically-based computerized model mathematically modelling the dynamics of the vehicle stored within the at least one non-transient computer-readable storage medium, to improve the accuracy of the physically-based model via computer-implemented numerical optimization of the at least one parameter of the physically-based model. The at least one parameter is related to at least one of physical characteristics of at least a part of the vehicle and phenomena influencing the dynamics of the vehicle. The computer-implemented numerical optimization targets the at least one coefficient of the state-space model such that the difference between a value predicted by the physically-based model and the value of the at least one coefficient of the state-space model for the at least one predetermined vehicle state is within a predetermined range.

The present technology thus attempts to overcome some of the disadvantages present in the prior art (in some instances) in the following manner. A physically-based model is to be used in simulations as this type of model has a good predictive ability of vehicle dynamics at vehicle operating conditions beyond those for which the model was created and validated. However, in the creation of such a model the conventional disadvantages of the complexity such a model's creation and the time it takes to create such a model are ameliorated by using a numerical optimization process that utilizes a state-space model of the vehicle (at given operations conditions) as a target for that numerical optimization process. This likely reduces the amount of tuning necessary for the physical model (although it may not eliminate it completely), reducing the time and complexity of the model creation process.

In some embodiments,
selecting at least one coefficient of a state-space model mathematically modelling the dynamics of the vehicle stored within at least one non-transient computer-readable information storage medium is selecting a plurality of coefficients of the state-space model; and
the computer-implemented numerical optimization concurrently targets the plurality of coefficients of the state-space model such that the difference between the value of each of the plurality of coefficients of the state-space model for the at least one predetermined vehicle state and the value predicted by the physically-based model with respect to that coefficient is within a predetermined range.

In some embodiments, varying at least one parameter of a physically-based computerized model mathematically modelling the dynamics of the vehicle is concurrently varying a plurality of parameters of the physically-based computerized model mathematically modeling the dynamics of the vehicle, to improve the accuracy of the physically-based model via computer-implemented numerical optimization of the plurality of parameters of the physically-based model.

In some embodiments,
selecting at least one coefficient of a state-space model mathematically modelling the dynamics of the vehicle stored within at least one non-transient computer-readable information storage medium is selecting a plurality of coefficients of the state-space model;
varying at least one parameter of a physically-based computerized model mathematically modelling the dynamics of the vehicle is concurrently varying a plurality of parameters of the physically-based computerized model mathematically modeling the dynamics of the vehicle, to improve the accuracy of the physically-based model via computer-implemented numerical optimization of the plurality of parameters of the physically-based model; and
the computer-implemented numerical optimization concurrently targets the plurality of coefficients of the state-space model such that the difference between the value of each of the plurality of coefficients of the state-space model for the at least one predetermined vehicle state and the value predicted by the physically-based model with respect to that coefficient is within a predetermined range.

In some embodiments,
the selected at least one coefficient has a first value for a first predetermined state of the vehicle and a second value for a second predetermined state of the vehicle; and
the computer-implemented numerical optimization targets the at least one coefficient of the state-space model such that, concurrently,
the difference between the value predicted by the physically-based model and the first value of the at least one coefficient of the state-space model for the first predetermined vehicle state is within a first predetermined range, and
the difference between the value predicted by the physically-based model and the second value of the at least one coefficient of the state-space model for the second predetermined vehicle state is within a second predetermined range.

In some embodiments,
selecting at least one coefficient of a state-space model mathematically modelling the dynamics of the vehicle stored within at least one non-transient computer-readable information storage medium is selecting a plurality of coefficients of the state-space model; and
each of the plurality of coefficients has a first value for a first predetermined state of the vehicle and a second value for a second predetermined state of the vehicle; and
the computer-implemented numerical optimization concurrently targets the plurality of coefficients of the state-space model such that, concurrently,
the difference between the first value of each of the plurality of coefficients of the state-space model for the first predetermined vehicle state and the value predicted by the physically-based model with respect to that coefficient is within a first predetermined range, and
the difference between the second value of each of the plurality of coefficients of the state-space model for the second predetermined vehicle state and the value predicted by the physically-based model with respect to that coefficient is within a second predetermined range.

In some embodiments,
the at least one coefficient has a first value for a first predetermined state of the vehicle and a second value for a second predetermined state of the vehicle; and
varying at least one parameter of a physically-based computerized model mathematically modelling the dynamics of the vehicle is concurrently varying a plurality of parameters of the physically-based computerized model mathematically modeling the dynamics of the vehicle, to improve the accuracy of the physically-based model via computer-implemented numerical optimization of the plurality of parameters of the physically-based model; and
the computer-implemented numerical optimization targets the at least one coefficient of the state-space model such that, concurrently,
the difference between the value predicted by the physically-based model and the first value of the at least one coefficient of the state-space model for the first predetermined vehicle state is within a first predetermined range, and
the difference between the value predicted by the physically-based model and the second value of the at least one coefficient of the state-space model for the second predetermined vehicle state is within a second predetermined range.

In some embodiments,
selecting at least one coefficient of a state-space model mathematically modelling the dynamics of the vehicle stored within at least one non-transient computer-readable information storage medium is selecting a plurality of coefficients of the state-space model; and each of the plurality of coefficients has a first value for a first predetermined state of the vehicle and a second value for a second predetermined state of the vehicle;

varying at least one parameter of a physically-based computerized model mathematically modelling the dynamics of the vehicle is concurrently varying a plurality of parameters of the physically-based computerized model mathematically modeling the dynamics of the vehicle, to improve the accuracy of the physically-based model via computer-implemented numerical optimization of the plurality of parameters of the physically-based model; and the computer-implemented numerical optimization concurrently targets the plurality of coefficients of the state-space model such that, concurrently, the difference between the first value of each of the plurality of coefficients of the state-space model for the first predetermined vehicle state and the value predicted by the physically-based model with respect to that coefficient is within a first predetermined range, and the difference between the second value of each of the plurality of coefficients of the state-space model for the second predetermined vehicle state and the value predicted by the physically-based model with respect to that coefficient is within a second predetermined range.

In some embodiments, the plurality of parameters defines a first plurality of parameters; and the method further comprises, if the computer-implemented numerical optimization fails, changing at least one of the parameters in the first plurality of parameters to define a second plurality of parameters, and concurrently varying the second plurality of parameters of the physically-based computerized model mathematically modeling the dynamics of the vehicle, to improve the accuracy of the physically-based model via computer-implemented numerical optimization of the second plurality of parameters of the physically-based model.

In some embodiments, the plurality of coefficients defines a first plurality of coefficients; and the method further comprises, if the computer-implemented numerical optimization fails, changing at least one of the coefficients in the first plurality of coefficients to define a second plurality of coefficients, and re-performing the computer-implemented numerical optimization so as to concurrently target the second plurality of coefficients.

In some embodiments, the method further comprises, if the computer-implemented numerical optimization fails, altering at least one predetermined range; and re-performing the computer-implemented numerical optimization.

In some embodiments, the method further comprises, if the computer-implemented numerical optimization fails, altering the physically-based computerized model mathematically modeling the vehicle; and re-performing the computer-implemented numerical optimization.

In some embodiments, the physically-based computerized model mathematically modelling the vehicle is constructed from a library of predetermined model components.

In some embodiments, the coefficients of the state-space model mathematically modelling the dynamics of the vehicle are ones selected from a group consisting of stability and control derivatives of the state-space model, which are a special case of linear time-invariant state-space model coefficients.

In some embodiments, the parameters of the physically-based computerized model mathematically modeling the vehicle are ones selected from a group consisting of parameters related to rotor inflow, unsteady aerodynamics, fuselage aerodynamics, empennage aerodynamics, rotor downwash impingement on the fuselage, tail rotor and empennage, tandem-rotor configuration mutual rotor inflow interaction, aeroelastics, aeromechanical configuration.

In some embodiments, the numerical optimization is performed using a gradient-based optimization method. A gradient-based optimization method is an algorithm which updates the parameters of the physically-based model automatically during successive iterations, and the change in the value of the parameters from one iteration to the next is based on one more previous iteration values of the difference in coefficient values and the value predicted by the physically-based model.

In some embodiments, the method further comprises, if the computer-implemented numerical optimization succeeds, validating, via the at least one computer processor in operative communication with the at least one non-transient computer-readable information storage medium, the numerically optimized physically-based computerized model mathematically against actual vehicle operating data stored in the at least one non-transient computer readable information storage medium.

In another aspect, the present technology provides a non-transient computer-readable information storage device storing a mathematical model of dynamics of a vehicle developed via the methods described herein above.

In another aspect, the present technology provides a computer-controlled vehicle simulator for simulating the vehicle, the simulator comprising:

at least one non-transient computer-readable information storage device storing a mathematical model of dynamics of a vehicle developed via the methods described hereinabove;

a computer processor in operative communication with the at least one non-transient computer-readable information storage device; and at least one actuator for mechanically actuating the simulator, the computer processor controlling the at least one actuator via use of the mathematical model stored by the at least one non-transient computer readable information storage device in order to simulate the dynamics of the vehicle.

In some embodiments, the vehicle is an aircraft;

the simulator is a full-flight simulator;

the simulator further comprises a simulator cabin for simulating at least a portion of a flight deck of the aircraft; and the at least one actuator is a plurality of actuators, and the plurality of actuators are structured and arranged to produce accelerations in multiple degrees of freedom within the simulator cabin.

In another aspect, the present technology provides a computer-controlled vehicle simulator for simulating the vehicle, the simulator comprising:

at least one non-transient computer-readable information storage device storing a mathematical model of dynamics of a vehicle developed via the methods described hereinabove;

a computer processor in operative communication with the at least one non-transient computer-readable information storage device; and a visual display system, the computer processor controlling the visual display system via use of the mathematical model stored by the at least one non-transient computer readable information storage device in order to depict motion of the vehicle.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 10a-e illustrate objective function contours and isosurfaces (hover optimization).

FIGS. 12a-b illustrate objective function isosurfaces for full envelope optimization (quasi-steady inflow).

FIGS. 13a-b illustrate objective function isosurfaces for full envelope optimization (dynamic inflow).

DETAILED DESCRIPTION

Figure 1:
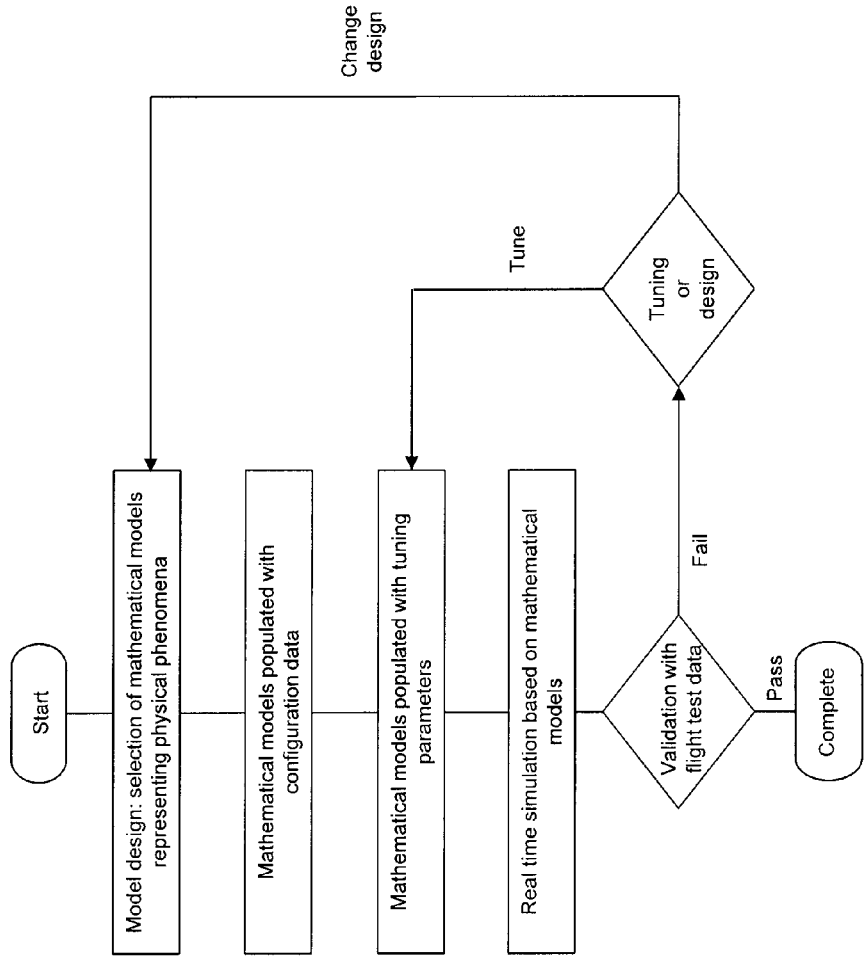
FIG. 1 is flow chart of a prior art vehicle model development process.
Figure 2:
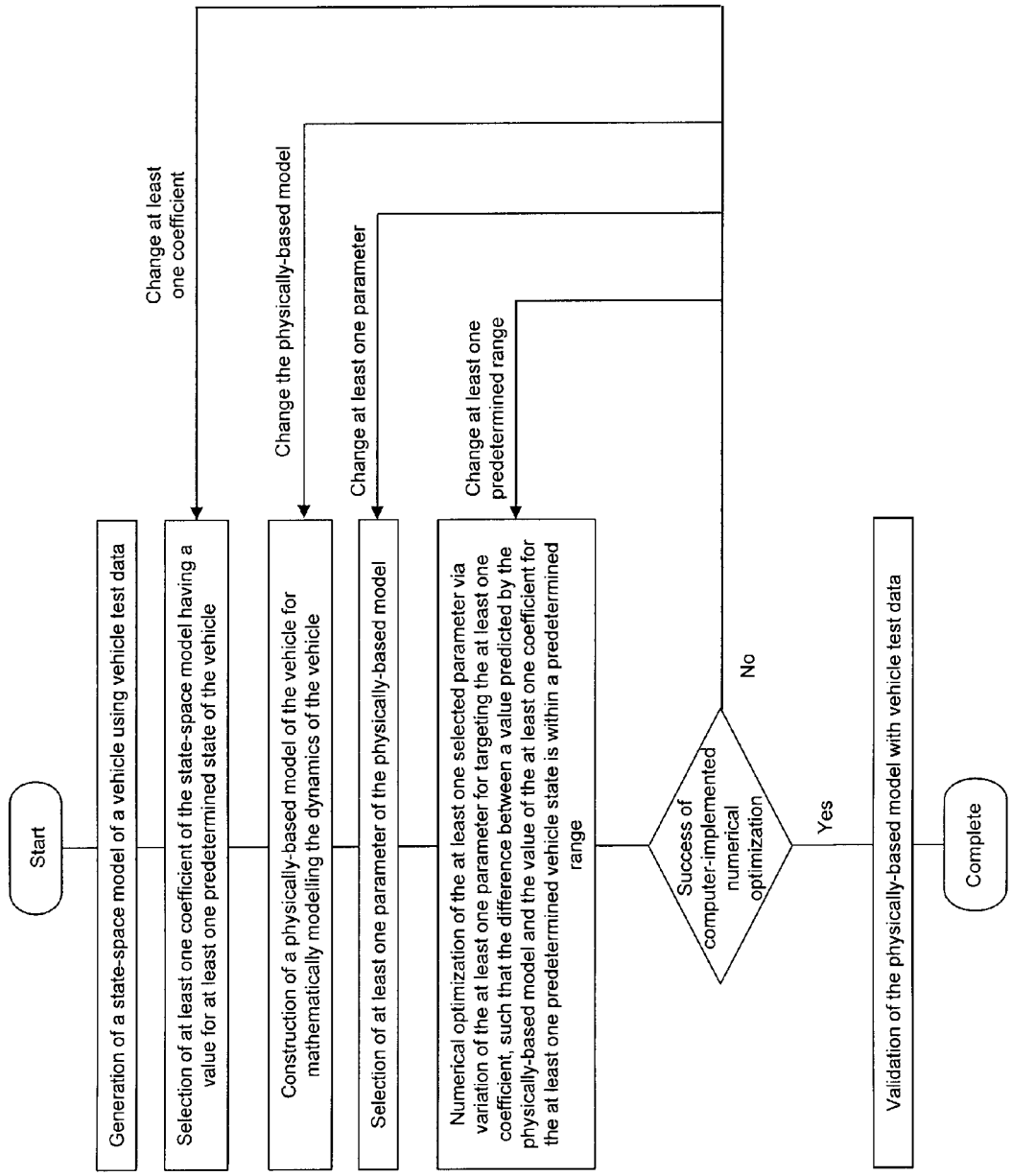
FIG. 2 illustrates a method of developing a mathematical model of dynamics of a vehicle for use in a computer-controlled simulation of at least the vehicle, according to a non-restrictive illustrative embodiment.

As was discussed herein above, an embodiment of the present method comprises:

Selecting at least one coefficient of a state-space model mathematically modelling the dynamics of the vehicle stored within at least one non-transient computer-readable information storage medium. The state-space model has a plurality of coefficients describing the dynamics of the vehicle being modeled. The selected at least one coefficient has a value for at least one predetermined state of the vehicle.

Varying, via at least one computer processor in operative communication with the at least one non-transient computer-readable information storage medium, at least one parameter of a physically-based computerized model mathematically modelling the dynamics of the vehicle stored within the at least one non-transient computer-readable storage medium, to improve the accuracy of the physically-based model via computer-implemented numerical optimization of the at least one parameter of the physically-based model. The at least one parameter is related to at least one of physical characteristics of at least a part of the vehicle and phenomena influencing the dynamics of the vehicle. The computer-implemented numerical optimization targets the at least one coefficient of the state-space model such that the difference between a value predicted by the physically-based model and the value of the at least one coefficient of the state-space model for the at least one predetermined vehicle state is within a predetermined range.

With respect to the design of a model for use in simulating an aircraft, the state-space model consists of a small number of coefficients that describe the dynamics of the aircraft to be simulated when stimulated with control inputs. The state-space model predicts the outputs, without detailed knowledge of the physical properties of the aircraft and/or its components. At least one coefficient of the state-space model is selected to be used in the computer-implemented numerical optimization of the physically-based model. The selected coefficient(s) must be compatible with the physically-based model; i.e. an equivalent of the selected coefficient(s) must be derivable (computable) from the physically-based model.

The state-space model is generated at a computer, using operational test data of the vehicle. For example, when the vehicle is an aircraft, at least some of the operational test data consists of ground test data and flight test data of the aircraft that have been collected while operating the aircraft on ground or in flight. The operational test data are representative of the dynamics of the vehicle to be simulated. They consist of a large set of data, including inputs and corresponding outputs. The inputs are various control inputs (that may be exercised via the control commands of a real vehicle, for instance the turning of the wheel of x degrees), and the outputs are their various effects on the behavior of the vehicle (e.g. angular speeds, angular accelerations, etc). The state-space model generated based on the operational test data is capable of modeling the dynamics of the vehicle, with a small number of coefficients. The selection of the proper coefficient(s) among all the coefficients available from a particular state-space model is based on the experience of a person skilled in the art of computer-controlled simulations of vehicles.

A predetermined state of the vehicle consists in a specific state of the vehicle, in which the vehicle is operating at specific conditions. The specific conditions may include a specific speed, a specific altitude for a flying vehicle, etc. A particular instance of the state-space model corresponds to each predetermined state of the vehicle, with specific values of the coefficients of the state-space model corresponding to the predetermined state. Thus, the computer-implemented numerical optimization takes into consideration each of the predetermined states of the vehicle (there may be one to many), and the corresponding values of the coefficients of the state-space model for each of the pre-determined states.

In the case where the vehicle is an aircraft, the computer-implemented numerical optimization takes into consideration several predetermined states of the aircraft and is usually referred to as a full flight envelope optimization. For example, the flight envelope of a helicopter may include the following flight phases (the predetermined states): hover mode, 75 knots airspeed, and 120 knots airspeed. A state-space model is generated for each of the flight phases, and a value of the selected coefficient(s) of the state-space models is determined for each of the flight phases.

A value of a coefficient of the state-space model predicted by the physically-based model consists in a value of an equivalent of the coefficient, the equivalent being mathematically derived from the physically-based model, and the value of the equivalent being calculated using the physically-based model.

Several types of computer-implemented numerical optimization methods may be used for improving the accuracy of the physically-based model. These methods are well known to persons skilled in the art of numerical optimization. An example of such a numerical optimization method, based on minimizing an objective function, will be detailed later in the description.

The predetermined range of a difference between a value of a coefficient and a value predicted by the physically-based model for the coefficient, may be expressed in various ways. For example, if $g_i^S$ is the value of the coefficient, $g_i^M(\Phi)$ is the value predicted for the coefficient for a set of parameters $\Phi$, a corresponding predetermined range $R_i$ may be defined as represented in equation (1):

$$g_i^S - R_i < g_i^M(\Phi) < g_i^S + R_i \tag{1}$$

Alternatively, the predetermined range may be defined as predetermined percentage of difference between a value of a coefficient and a value predicted by the physically-based model for the coefficient.

An instance of the physically-based model populated with value(s) of the at least one parameter of the physically-based model, for which the difference between the value predicted by the physically-based model and the value of the at least one coefficient of the state-space model for the at least one predetermined vehicle state is within the predetermined range, may be referred to as an optimized physically-based model. It is an instance of the physically-based model that is intended to replicate in the most accurate manner the actual behavior of the vehicle, in accordance with the predetermined range(s). The level of accuracy depends, at least, on: the choice of the at least one coefficient of the state-space model and an appropriate determination of the value of the at least one coefficient for the corresponding predetermined state, the accuracy of the mathematical representation of the physically-based model, the choice of the at least one parameter of the physically-based model, and the numerical optimization technique used to determine the value(s) of the at least one parameter for which the aforementioned difference is within the predetermined range.

An example of a numerical optimization method based on an objective function will now be described. The objective function is defined as a weighted sum of the squared normalized error between the value(s) of the coefficient(s) and the value(s) predicted by the physically-based model for the coefficient(s).

For illustration purposes, we first consider a state-space model with a single predetermined vehicle state, for which four coefficients have been selected, with the following values: $g_1^S$, $g_2^S$, $g_3^S$, and $g_4^S$.

Then, we consider a physically-based model for which three parameters have been identified: x, y, z. The parameters are represented by equation (2).

$$\Phi = [x, y, z] \tag{2}$$

The values predicted by the physically-based model for the coefficients are: $g_1^M(\Phi)$, $g_2^M(\Phi)$, $g_3^M(\Phi)$, and $g_4^M(\Phi)$. They are calculated with the physically-based model, for a set of candidate values of the parameters (2). Each parameter may take values within a determined range, as expressed in equations (3), (4), and (5).

$$x1 \leq x \leq x2 \tag{3}$$

$$y1 \leq y \leq y2 \tag{4}$$

$$z1 \leq z \leq z2 \tag{5}$$

The objective function J to be minimized is represented by equations (6) and (7), where $w_i$ are the weighting factors. The weighting factors are selected by the user, and are representative of the influence of each selected coefficient.

$$\min J(\Phi) = \sum_{i=1}^{4} w_i \left(1 - \frac{g_i^M(\Phi)}{g_i^S}\right)^2 \tag{6}$$

$$\sum_{i=1}^{4} w_i = 1 \tag{7}$$

The optimization problem defined by equations (2) to (7) is solved using a gradient-based first order optimization algorithm (ref. 21)

For instance, the optimization problem may be solved for a value of the objective function J set to 0.020. The solution consists in sets of parameters $\Phi$. For each set of parameters $\Phi$, it is then determined if the differences between the values of the coefficients ($g_1^S$, $g_2^S$, $g_3^S$, and $g_4^S$) and the values predicted by the physically-based model for the coefficients ($g_1^M(\Phi)$, $g_2^M(\Phi)$, $g_3^M(\Phi)$, and $g_4^M(\Phi)$) are within predetermined ranges $R_i$, as expressed for example by equation (1). If this is the case, a corresponding set of parameters $\Phi$ constitute an appropriate numerical optimization of the physically-based model.

If not, a set of parameters $\Phi$ is found, for which the predetermined ranges $R_i$ are respected. The optimization may in this case be solved for a new value of the objective function, for example 0.050. Since this value is greater than the previous value of the objective function (0.020), it is anticipated that, for at least some sets of parameters $\Phi$, the differences between the values of the coefficients and the values predicted by the physically-based model for the coefficients will be lower than this new value of the objective function, and possibly within the predefined ranges $R_i$.

Figure 3:
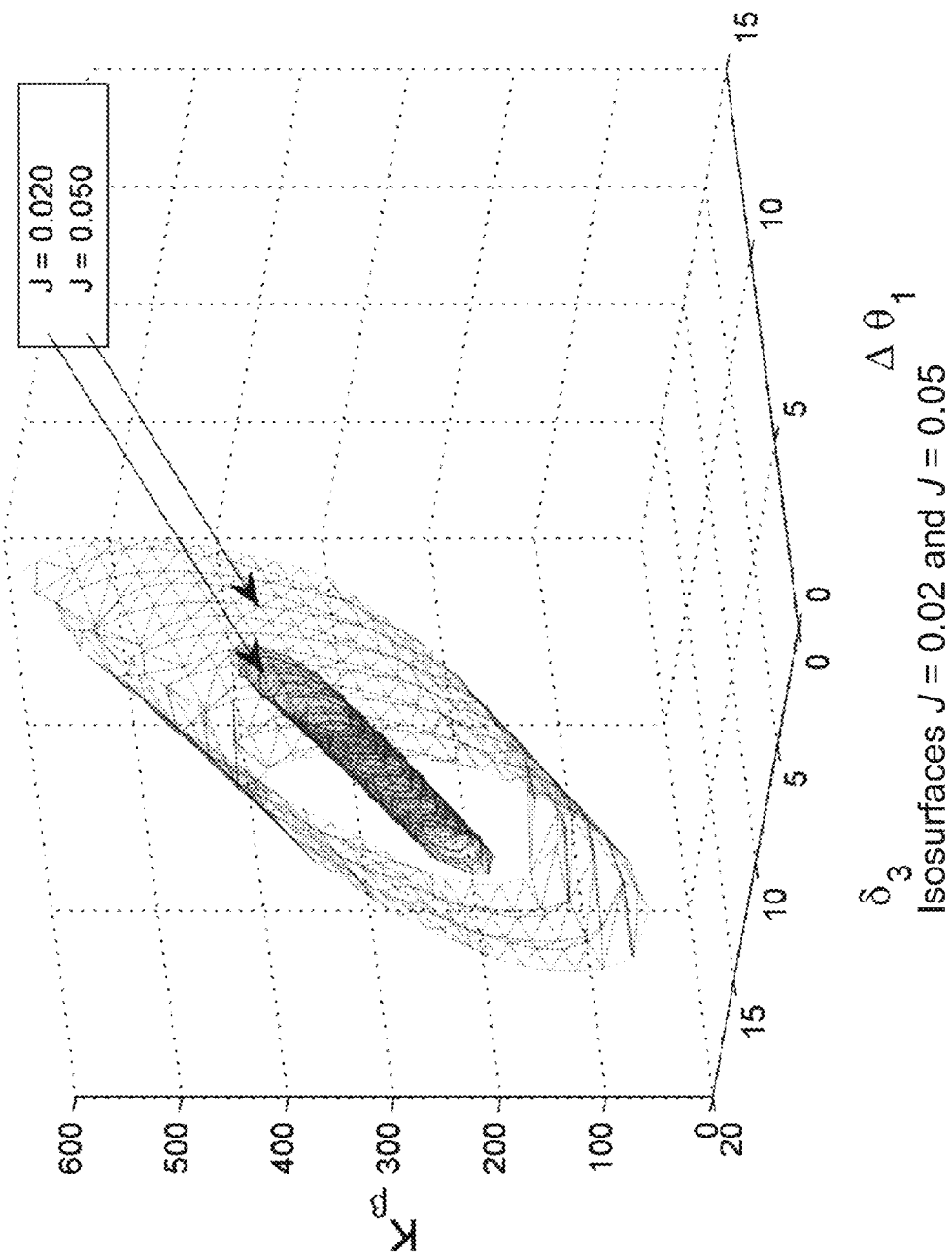
FIG. 3 illustrates an objective function for performing a computer-implemented numerical optimization of a mathematical model of dynamics of a vehicle, according to a non-restrictive illustrative embodiment.

FIG. 3 represents an example of an objective function J for a physically-based model with three parameters. The values of the three parameters are represented on the x, y, and z axis. Then, two isosurfaces corresponding to the set of values of the three parameters for which the objective function is equal to 0.020 and 0.050 are represented. The isosurface corresponding to 0.020 is a better optimization than the isosurface corresponding to 0.050.

For illustration purposes, we now consider a state-space model with two predetermined vehicle states (for example, a vehicle state corresponding to an hover mode, and a vehicle state corresponding to a 75 knots airspeed), for which four coefficients have been selected as previously for each of the two vehicle states. We consider the same parameters as in the previous example. Equations (5) is adapted as follows:

$$\min J(\Phi) = \sum_{i=1}^{4} \frac{w_i}{2}\left(1 - \frac{g_i^M(\Phi)}{g_i^S}\right)^2 \bigg|_{\text{hover}} + \sum_{i=1}^{4} \frac{w_i}{2}\left(1 - \frac{g_i^M(\Phi)}{g_i^S}\right)^2 \bigg|_{75 \text{ knots}} \quad (8)$$

A set of predefined ranges $R_i$, as illustrated in equation (1), shall be specified for each vehicle state (hover mode and 75 knots).

The determination of a set of parameters $\Phi$ constituting an appropriate numerical optimization of the physically-based model takes into consideration equation (8), and equation (1) with the set of ranges $R_i$ specified for each of the two vehicles states.

The model components are representative of various physical phenomena, and use physically-based mathematical models corresponding to these physical phenomena to simulate the phenomena. For example, the library of model components may consist of a library of software components, where each software component simulates a particular physical phenomenon, by implementing the underlying mathematical model corresponding to the physical phenomenon.

The physically-based computerized model is further populated with configuration data of the vehicle to be simulated; including for example aerodynamic coefficients, mass properties, and aeromechanical data. Some configuration data are not known. They constitute candidate parameters, which may selected and varied by the present method, to determine value(s) of the selected candidate parameters for which the accuracy of the physically-based model is improved, in accordance with the predetermined range(s).

Control derivatives and stability derivatives are well known in the art. The coefficients of a state-space model may include one or several coefficients corresponding to control derivatives, as well as one or several coefficients corresponding to stability derivatives. Thus, the selected stability and control coefficients of the state-space model used for improving the accuracy of the physically-based model may include one or several control derivatives, one or several stability derivatives, or a combination of control and stability derivatives. One advantage of the control and stability derivatives is that they are usually straightforward to calculate using the physically-based model. Thus, having selected a control or stability derivative from the state-space model, it is generally always possible to calculate a corresponding predicted value of the control or stability derivative, using the physically-based model. As already mentioned, this may not be the case for every coefficient of the state-space model. Some coefficients identified as selectable stability and control coefficients may not have a corresponding predicted value which can be calculated by a specific physically-based model, and thus cannot be used for improving the accuracy of this specific physically-based model.

For illustration purposes, we now consider the case where the vehicle is an helicopter and the physically-based model is a blade element rotor model.

An example of a state-space model is represented by the following equations (ref. 13)

$$M\dot{x} = Fx + Gu \quad (9)$$

$$y = H_0 x + H_1 \dot{x} + Lu \quad (10)$$

M represents the pitching moment derivative; F the state-space stability derivative matrix and G the state-space control derivative matrix; $H_0$, $H_1$, and L the state-space observation matrices; u the input vector; y the observation (output) vector; and x the state vector of the state-space model.

Using flight test data corresponding to the input vector u and the observation vector y, the coefficients of the state-space model (corresponding to M, F, G, $H_0$, $H_1$, L, x, and $\dot{x}$) are determined. Then, some coefficients are selected for performing the numerical optimization of the blade element rotor model.

For instance, stability derivatives may be selected from the state-space stability derivative matrix F and control derivatives may be selected from the state-space control derivative matrix G. These stability and control derivatives are used as the selected coefficients of the present method for performing the numerical optimization of the blade element rotor model.

Examples of rotor design parameters of the blade element rotor model which may be unknown, and shall thus be determined via the present method include: swash plate phase angle, pitch-flap coupling angle, and flap hinge stiffness. The three aforementioned parameters only constitute examples. Other parameters may be selected in the context of the optimization of a blade-element rotor model of an helicopter, as follows.

In some embodiments of the present method, the parameters of the physically-based computerized model mathematically modeling a helicopter are ones selected from a group consisting of parameters related to rotor inflow, aerodynamic phase lag, fuselage aerodynamics, empennage aerodynamics, rotor downwash impingement on the fuselage, tail rotor and empennage, tandem-rotor configuration mutual rotor inflow interaction, aeroelastics, aeromechanical configuration. (Ref. 15)

For the purpose of validating the numerically optimized physically-based computerized model, simulated time responses may be generated with the optimized physically-based model and compared with time responses from operational test data (which may, for example, have been recorded during the flight of a real aircraft if the vehicle is an aircraft).

Upon failure of the validation with operational test data, if it is determined that the failure is due to the usage of an inappropriate physically-based model of the vehicle, the physically-based model may be altered and the computer-implemented optimization of the altered physically-based model re-performed. Alternatively, the failure in the validation of the optimized physically-based model may be due to an inappropriate computer-implemented optimization. For example, the predetermined range(s) may not be sufficiently small. In this case, the predetermined range(s) may be altered, and the computer-implemented optimization of the physically-based model re-performed. Alternatively, the failure in the validation of the optimized physically-based model may be due to the usage of an inappropriate state-space model. In this case, an altered state-space model may be used, altered coefficient(s) selected from the altered state-space model, and the computer-implemented optimization of the physically-based model re-performed with the altered coefficients.

The computer-controlled vehicle simulator uses the physically-based model of the vehicle developed via the method described herein above, to replicate in a simulation environment the expected behavior of the vehicle in real operational conditions. For example, a user of the simulator generates control inputs. The computer processor of the simulator uses the physically-based model to calculate the effects of the control inputs on the behavior of the vehicle. These effects are the calculated outputs of the physically-based model when presented with the control inputs. And the computer processor of the simulator mechanically or visually simulates the resulting effects on the behavior of the vehicle, by means of control of appropriate components of the simulator. For example, the mechanical simulation is performed by at least one actuator for mechanically actuating the simulator, the at least one actuator being under the control of the computer processor of the simulator.

REFERENCES

The following references are incorporated by reference herein in their entirety in those jurisdictions permitting incorporations by reference:
(1) anon., Helicopter Training Toolkit, U.S. JHSIT, 1st Ed., September 2009.
(2) anon., Joint Aviation Requirements, JAR-FSTD H: Helicopter Flight Simulation Training Devices, Initial Issue, May 2008.
(3) Van Esbroeck, P., and Giannias, N., "Model Development of a Level D Black Hawk Flight Simulator," Paper No. AIAA-2000-4582, AIAA Modeling and Simulation Technologies Conference, Denver, Colo., August 2000.
(4) Smith, S., "Helicopter Simulation Modeling Techniques for Meeting FAA AC120-63 Level D Qualification Requirements," Proceedings of the American Helicopter Society 56th Annual Forum, Va. Beach, Va., May 2000.
(5) Quiding, C., Ivler, C., and Tischler, M., "GenHel S-76C Model Correlation using Flight Test Identified Models," Proceedings of the American Helicopter Society 64th Annual Forum, Montréal, Canada, Apr. 29-May 1, 2008.
(6) van der Vorst, J., Zeilstra, K. D. S., Jeon, D. K., Choi, H. S., and Jun, H. S., "Flight Mechanics Model Development for a KA32 Training Simulator," Proceedings of the 35th European Rotorcraft Forum, Hamburg, Germany, September 2009.
(7) Spira, D., and I., Davidson, "Development and Use of an Advanced Tandem-Rotor Helicopter Simulator for Pilot Training," Proceedings of the RAeS Conference on The Challenge of Realistic Rotorcraft Simulation, London, UK, November 2001.
(8) Howlett, J. J., "UH-60A Black Hawk Engineering Simulation Program: Vol. I: Mathematical Model," NASA CR-166309, 1981.
(9) anon., Federal Register 14 CFR Part 60, Federal Aviation Administration, May 2008.
(10) Jategaonkar, R. J., Flight Vehicle System Identification: A Time Domain Methodology, American Institute of Aeronautics and Astronautics, Reston, Va., 2006, Chapter 12.
(11) Hamel, P. G., and Kaletka, J., "Advances in Rotorcraft System Identification", Progress in Aerospace Science, Vol. 33, pp. 259-284, 1997.
(12) Talbot, P. D., Tinling, B. E., Decker, W. A., and Chen, R. T. N., "A Mathematical Model of a Single Main Rotor Helicopter for Piloted Simulation," NASA TM-84281, 1982.
(13) Tischler, M. B., and Remple, R. K., Aircraft and Rotorcraft System Identification: Engineering Methods with Flight Test Examples, American Institute of Aeronautics and Astronautics, Reston, Va., 2006.
(14) Murray, J. E., and Maine, E. M., pEst Version 2.1 User's Manual, NASA Technical Memorandum 88280, Ames Research Center, Dryden Flight Research Facility, Edwards, Calif., 1987.
(15) Padfield, G. D., Helicopter Flight Dynamics: The Theory and Application of Flying Qualities and Simulation Modeling, AIAA Education Series, Washington, D.C., 1996, Chapter 4.
(16) Theophanides, M., and Spira, D., "An Object-Oriented Framework for Blade Element Rotor Modelling and Scalable Flight Mechanics Simulation," Proceedings of the $35^{th}$ European Rotorcraft Forum, Hamburg, Germany, Sep. 22-25, 2009.
(17) Bailey, F. J., "A Simplified Theoretical Method of Determining the Characteristics of a Lifting Rotor in Forward Flight," NACA Report No. 716, 1941.
(18) Prouty, R. W., Helicopter Performance, Stability, and Control, Krieger Publishing Company, Malabar, Fla., 1995.
(19) Peters, D., and HaQuang, N., "Dynamic Inflow for Practical Applications", Journal of the American Helicopter Society, Vol. 33, No. 4, October 1988.
(20) Kantorovich, L. V., "On the method of steepest descent", Dokl. Akad. Nauk SSSR, Vol. 56, No. 3, pp. 233-236, 1947.
(21) Nocedal, Jorge and Wright, Stephen J., Numerical Optimization, Springer Science and Business Media, LLC, New York, N.Y., Chapter 2, 2nd ed., 2006.
(22) anon., 14 CFR Part 60, Flight Simulation Training Device Initial and Continuing Qualification and Use, May, 2008.

APPENDIX

Reducing Blade Element Model Configuration Data Requirements Using System Identification and Optimization Authors:
Daniel Spira, Technical Specialist, daniel.spira@cae.com
Vincent Myrand-Lapierre, Simulation System Specialist, vincent.myrandlapierre@cae.com
Olivier Soucy, Simulation System Specialist, olivier.soucy@,cae.com CAE Inc., Montréal, Quebec, Canada Presented at the American Helicopter Society 68th Annual Forum, Fort Worth, Tex., May 1-3, 2012. Copyright © 2012 by the American Helicopter Society International, Inc. All rights reserved.

Abstract

This paper presents a systematic helicopter simulation development method that enables a blade element model to simulate accurate stability and control characteristics for high fidelity pilot training with limited knowledge of the helicopter aeromechanical configuration data. This method combines system identification and numerical optimization to embed stability and control validation within the model development process. Control and stability derivatives are first identified from flight test data within a 6-DoF state space model. Selected identified derivatives are then treated as targets within an objective function for a numerical optimization of blade element model variables, which can be chosen based on the availability of aeromechanical configuration data. This new method is demonstrated using a full envelope simulation of a light twin-engine helicopter of which the aerodynamic coefficients were known, but the rotor hub and flap hinge mechanical properties were unknown. The unknown variables were optimized to match flight test identified control derivatives for two blade element inflow model structures. Aerodynamic model parameters were specified to match the identified static and dynamic stability derivatives. The optimized blade element models were validated against flight test data for cyclic step and doublet responses in hover and forward flight. The optimization procedure yielded comparable results for both blade element model structures. It was possible to select a physically realistic set of blade element model design values to obtain accurate control response without relying on manual tuning.

Notation

DoF Degrees of Freedom
F State-space stability derivative matrix
G State-space control derivative matrix
$g_i$ Control derivatives in objective function
$H_0$, $H_1$, J State-space observation matrices
J Hover and full-envelope objective functions
$K_\beta$ Flap hinge stiffness, ft-lb/rad
$L_{(\cdot)}$ Rolling moment derivative
L Dynamic inflow gain matrix
$M_{(\cdot)}$ Pitching moment derivative
MIMO Multi input-multi output
OO-BERM Object-Oriented Blade Element Rotor Model
p, q, r Angular velocity perturbations, rad/s
r Radial coordinate normalized by rotor radius
T Dynamic inflow time constant matrix
$U_0$ Trim airspeed, ft/s
U, V, W Linear velocities in body axes, ft/s
u, v, w Linear velocity perturbations, ft/s
$w_i$ Optimization weighting factors
u Input vector
x State vector
y Observation vector
$\alpha, \beta$ Free stream angles of attack and sideslip, rad
$\beta_{1s}$, $\beta_{1c}$ First-harmonic flap coefficients, rad
$\Delta\theta_1$ Swash plate phase angle, deg
$\delta_3$ Pitch-flap coupling angle, deg
$\delta_{lon}$ Longitudinal control position, % full travel
$\delta_{lat}$ Lateral control position, % full travel
$\delta_{ped}$ Yaw pedal control position, % full travel
$\lambda_i$ Induced velocity normalized by tip speed
$\lambda_0$ Average normalized induced velocity
$\lambda_c$, $\lambda_s$ First harmonic inflow coefficients
$\mu$ Advance ratio
$\phi$, $\theta$, $\psi$ Euler attitudes, deg
$\Phi$ Vector of design variables
$\theta_{1s}$, $\theta_{1c}$ Longitudinal & lateral cyclic blade pitch
$\psi_0$ Rotor azimuth coordinate, hub-wind frame
$(\bullet)_{tpp}$ Tip path plane
$(\bullet)_{\epsilon(\cdot)}$ Control moment derivative, s$^{-2}$/%
$(\bullet)_{u,v,w}$ Static moment derivative, (ft-s)$^{-1}$
$(\bullet)_{p,q,r}$ Dynamic moment derivative, s$^{-1}$

Introduction

Motivation

Increasing the use of flight simulation training devices for air-crew training is a key component of the International Helicopter Safety Team's continuing accident reduction strategy [1]. In order to satisfy the growing range of simulation-based scenario and mission training, the flight mechanics simulation needs to provide accurate performance and handling qualities predictably from rotor startup to shutdown and through all phases of flight. However, there is no comprehensive theory governing all aspects of helicopter flight mechanics required for real-time simulation. Consequently, flight mechanics simulation development strategies have relied traditionally on iterative tuning to achieve the required level of objective and subjective fidelity throughout the simulated flight envelope.

Blade element models are generally regarded as being best suited to provide the level of fidelity required for aircrew training with the computational efficiency required for real-time simulation [2]. Model subcomponents commonly tuned to achieve specific simulation behaviour include: rotor inflow parameters and aerodynamic phase lag [3, 4, 5]; fuselage and empennage aerodynamic coefficients [4, 5, 6]; interactional aerodynamic parameters representing rotor downwash impingement on the fuselage, tail rotor and empennage [4, 6], or mutual rotor inflow interaction for tandem-rotor configurations [7]; and simplified aeroelastic parameters [7, 8].

Figure 4:
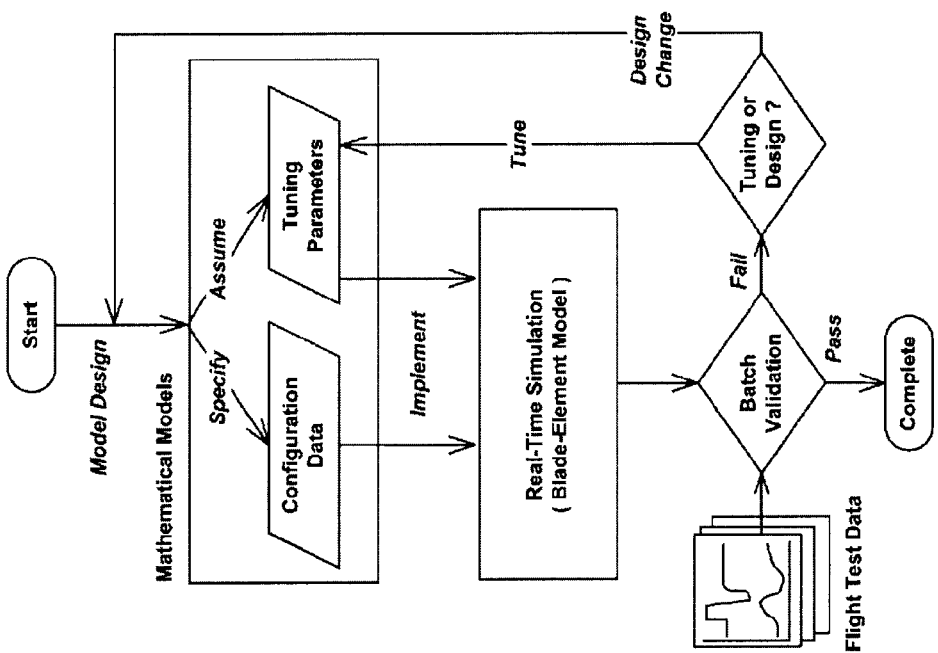
FIG. 4 illustrates a traditional simulation development method based on iterative tuning.

The traditional tuning-based simulation development method is illustrated in FIG. 4. Mathematical models representing physical phenomena, such as those listed in the preceding paragraph, are selected in a model design phase. The mathematical models need to be populated with helicopter configuration data, including aerodynamic coefficients, mass properties, and aeromechanical data such as hub geometry and hinge mechanical properties. The mathematical models also include unknown parameters that are commonly tuned, such as inflow model parameters, or downwash amplification factors for interactional aerodynamics. The decision of which parameters to adjust, either individually or in combination, is often based on physical reasoning, convenience or heuristics.

Tuning is generally performed using brute-force methods, such as sweeping combinations of parameter values and assessing the impact on large batches of trim and time response results. The impact on the model's stability and control prediction is not known until after the validation step is completed. If tuning is ineffective, then the mathematical model design needs to be changed and the process restarted. The task is significant: a flight data package must contain several hundred individual events to meet the minimum Level-D validation requirements of the Joint Aviation Authorities or Federal Aviation Administration [2, 9], while a flight test campaign with more refined and extensive flight envelope and configuration coverage as required for advanced military simulators yields several thousand events [3].

It is clear that the traditional tuning method requires several effort-intensive iterations to complete, and depends strongly on helicopter design and configuration data. However, complete aeromechanical configuration data packages are not always available to simulator design teams. Facing this data scarcity, the traditional iterative approach is unlikely to yield physically realistic simulation models that provide accurate flying qualities throughout the simulation envelope.

The application of system identification to general nonlinear flight mechanics models, such as blade-element models, has been explored in the literature. The "SIM and SID" approach [10] is a notable example. This approach can be considered to replace the "Tune" path in FIG. 4 with an "Identification" task by wrapping a parameter estimation routine around the blade element model. Jategaonkar [10] describes how this approach was applied to update a previously configured generic nonlinear helicopter model and improve off-axis response prediction by identifying a wake distortion model parameter. While practical for a model update, it must be realized that for the problem of missing configuration data considered here, there may be no model at the outset to update. With many parameter combinations to experiment with, an approach such as "SIM and SID" would remain a brute-force task in this context. Batches of estimation runs would need to be repeated following any change to real-time model assumptions or design. Problems related to parameter correlation, parameter insensitivities and solution convergence are unique to each model design and not always easily solved.

Nevertheless, the benefit that system identification does offer in this context is to guide the determination of missing configuration data by identifying the essential helicopter dynamics that the blade element model should produce. An identified state-space model has the potential to provide the most mathematically true representation of the helicopter's dynamics, even if not physically general [11]. A state-space model is a universal parametric model that encapsulates the helicopter dynamics about a given flight state independently of the blade element model structure.

Hence, the motivation is to devise an improved model development strategy incorporating the following features:

1. manual tuning of the blade-element model is reduced or eliminated;
2. incomplete aeromechanical configuration data packages are accommodated;
3. stability and control validation is incorporated through system identification.

This paper presents a new systematic simulation development method that meets these objectives. First, the simulation modeling problem in the absence of aeromechanical configuration data is described briefly. The new simulation development method is then presented. The subsequent sections describe the step-by-step application and validation of the new method using CAE's Object-Oriented Blade Element Rotor Model (OO-BERM) simulation platform.

Mathematical Illustration of Modeling Challenge

The problem of missing helicopter configuration data is illustrated by Equations (1-3). This system of equations, adapted from reference [12], expresses the main rotor hub roll and pitch moments in hover in the hub-wind frame, subject to standard disc-model assumptions (rectangular, rigid blades of uniform mass-density, constant lift-slope, zero root cutout, etc.). These simplified equations are instructive to highlight the flight mechanics modeling challenge at hand since any blade element model reduces to this form if configured with the same simplifications. Equations (1-3) have been condensed and rearranged from the format in [12] to highlight the features most pertinent to this discussion. They have also been augmented to include first-harmonic inflow and swash plate phase angle, which are not considered in [12]. Moments due to blade dynamics and hub motion have been omitted for brevity.

$$\begin{bmatrix} L \\ M \end{bmatrix}_{hov} = K_h \begin{bmatrix} \beta_{1s} \\ \beta_{1c} \end{bmatrix} + E_{h\theta} \begin{bmatrix} \theta_{1s} \\ \theta_{1c} \end{bmatrix} + E_{h\lambda} \begin{bmatrix} \lambda_s \\ \lambda_c \end{bmatrix} + \dots \quad (1)$$

$$\begin{bmatrix} \ddot{\beta}_{1s} \\ \ddot{\beta}_{1c} \end{bmatrix} + D_f \begin{bmatrix} \dot{\beta}_{1s} \\ \dot{\beta}_{1c} \end{bmatrix} + K_f \begin{bmatrix} \beta_{1s} \\ \beta_{1c} \end{bmatrix} = F_{f\theta} \begin{bmatrix} \theta_{1s} \\ \theta_{1c} \end{bmatrix} + F_{f\lambda} \begin{bmatrix} \lambda_s \\ \lambda_c \end{bmatrix} + \dots \quad (2)$$

$$\begin{bmatrix} \theta_{1c} \\ \theta_{1s} \end{bmatrix} = \begin{bmatrix} \cos\Delta\theta_1 & \sin\Delta\theta_1 \\ -\sin\Delta\theta_1 & \cos\Delta\theta_1 \end{bmatrix} \begin{bmatrix} \delta_{lat} \\ \delta_{lon} \end{bmatrix} \quad (3)$$

The on- and off-axis hub spring ($K_h$), shear moments ($E_{h\theta}$ and $E_{h\lambda}$), flap spring ($K_f$), flap damping ($D_f$) and flap forcing coefficient ($F_{f\theta}$, $F_{f\lambda}$) matrices are all nonlinear functions of aeromechanical configuration data through Lock number, flap hinge offset and blade mass moments, in addition to $K_\mu$ and $\delta_3$. The phasing of all flapping responses and hub moments with respect to pilot control inputs are further altered through the swash plate phase angle in Equation (3). The inflow states, $[\lambda_s, \lambda_c]^T$ exhibit first-order dynamics that feed back with flapping and hub motion through rotor air loads. Thus, the on- and off-axis hub moments, and hence aircraft motion, depend on nonlinear combinations of aeromechanical configuration and inflow model parameters.

In a traditional simulation development project wherein all configuration data are known, the inflow terms in Equations (1) and (2) are the only unknowns, so modifying inflow model equations or tuning inflow parameters is a reasonable approach to improve a simulation's correlation with flight test data. However, if the configuration data are unknown, the nonlinear coupling between rotor configuration and inflow parameters complicates the simulation design problem considerably. Increasing advance ratio away from hover alters each parameter's contribution to the hub moments and introduces new dependencies on coning angle and average inflow velocity [12]. Introducing fuselage and empennage aerodynamics with associated interactional aerodynamic models, required for high-fidelity aircrew training simulation, adds more contributions to the aircraft response.

The conclusion of this background discussion is that as fewer physical configuration parameters are known, the simulation design space becomes increasingly intractable through the traditional manual tuning loop depicted in FIG. 4. The likelihood that iterating through combinations of configuration data and aerodynamic parameters while analyzing large batches of flight test cases would yield accurate flying qualities predictably throughout the flight envelope becomes increasingly remote.

New Simulation Development Method

Figure 5:
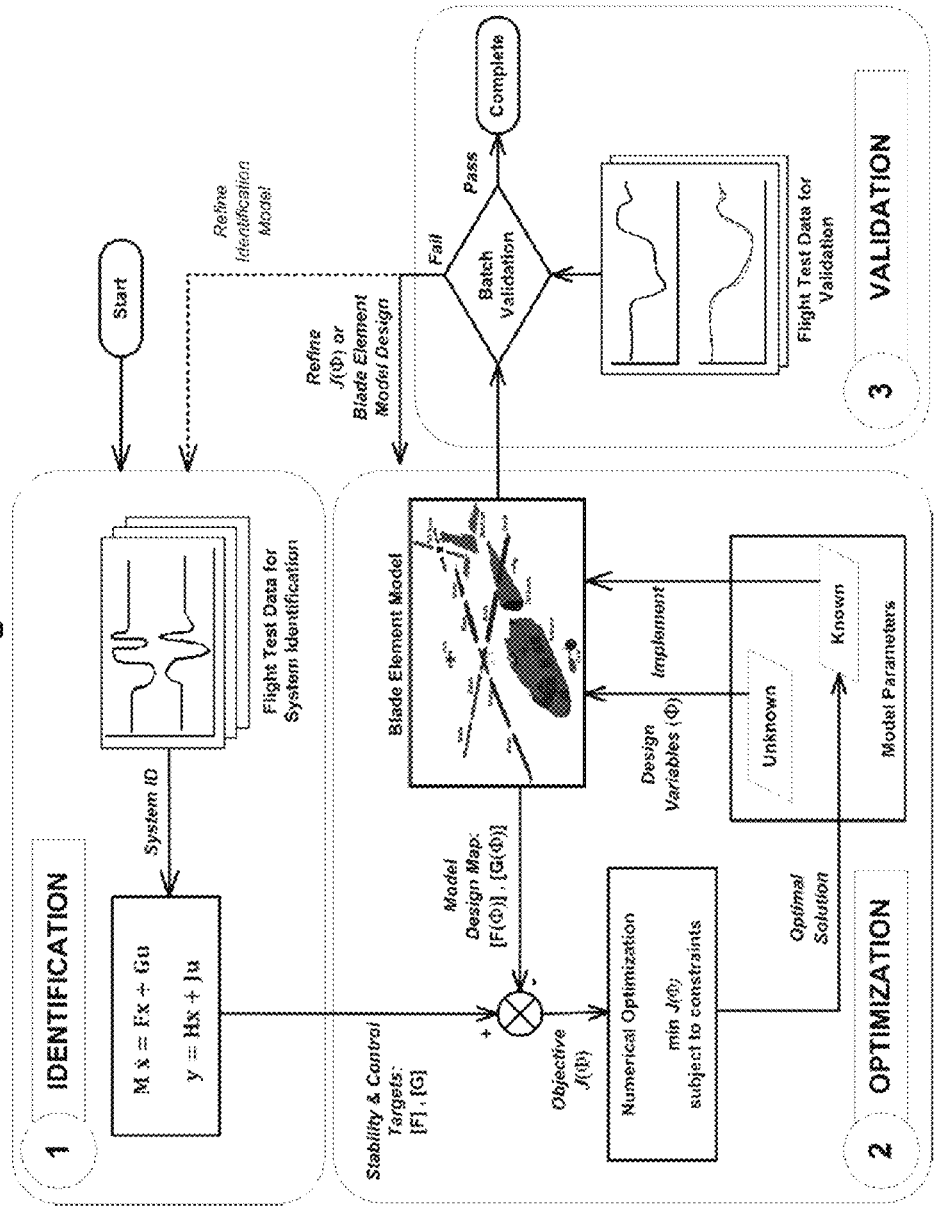
FIG. 5 illustrates a new systematic simulation development method.

A systematic simulation development method was devised to satisfy the goals stated in the Introduction and to address the challenge of developing flight mechanics simulations with limited configuration data described above. This new method, depicted in FIG. 5, incorporates stability and control derivative targets in a blade element model optimization objective.

First, a linear state-space model is identified at various design points throughout the flight envelope. Each state-space model defines target stability and control derivatives for subsequent blade element model optimization. At each design point, the state-space model is a universal representation of the helicopter dynamics over the frequency range required for subsequent blade element model design. Thus, the system identification task is independent of the final blade element model structure.

To prepare for optimization, the blade element model is first configured with known input data. Then, a design map is constructed by linearizing the model about each state and control axis while sweeping values of design variables over their required ranges. This design map expresses the blade element model's predicted equivalent state and control matrices over an n-dimensional space with design variables as basis functions. The choice of linearization technique is left to the practitioner, as this depends on the simulation framework and software tools.

The optimization step then determines values of selected unknown variables that minimize the error between the identified derivatives and those predicted by the linearized blade element model, expressed in the design map. The subset of derivatives to include in the objective function depends on the particular set of design variables being optimized. For example, if a set of design variables influences only pitch and roll damping derivatives, then only those derivatives should be included in the objective function. For the test cases presented later in this paper, only the main rotor on- and off-axis control derivatives were included in the objective function due to the set of design variables selected for this study.

As with linearization, the practitioner chooses a design map format (e.g. tabulated data or multivariate analytic function fit) that is compatible with the optimization algorithm and software tools. This strategy does not impose any specific format or algorithm.

Finally, the blade-element model is configured with the optimized values of all design variables, and validated with flight test data. If validation uncovers deficiencies, the optimization loop can be re-executed using a different set of design variables, a modified objective function, or an updated blade element model structure. If necessary, the state-space model can also be refined and re-identified.

Demonstration of New Method

Flight Test Data

Flight test data for model identification and validation was collected on a fully instrumented light twin-turbine helicopter. In addition to recording all relevant cockpit indications and helicopter system data, an air data nose boom was installed to measure angles of attack and sideslip, which were not available from the production air data system. The nose boom pitot-static data was processed with high-resolution GPS and inertial unit signals to correct for position errors throughout the flight envelope, providing an independent source of airspeed and static pressure. The GPS and inertial unit provided high resolution ground speed, track and vertical speed in the low airspeed regime, where air data measurements were unreliable. Pilot flight control positions were recorded using string potentiometers. The helicopter attitude, velocity and acceleration measurements were verified for kinematic consistency before proceeding with system identification.

The flight test program included standard test and evaluation maneuvers for static and dynamic stability. Control steps, pulses, doublets, 2-3-1-1 multisteps and frequency sweeps were performed in all four axes, in hover and at four cruise airspeeds. The step, pulse, doublet and multistep data were used for time-domain identification or validation. The frequency sweeps were collected following the recommendations in [13], and were used for frequency-domain identification.

The helicopter's automatic stabilization system was switched off for all test cases presented in this paper, so that all models discussed below represent the bare airframe dynamics. All test data presented below were collected with the helicopter loaded in a medium weight/central center of gravity configuration.

State Space Model Identification

Overview

Time- and frequency-domain methods were applied in a complementary fashion to identify state-space models from flight test data. The software tools used were pEst for time-domain identification [14] and CIFER® for frequency-domain identification [13].

The pEst software performs identification of nonlinear dynamic systems. The cost function is defined as the sum of square errors between the measured and computed time-responses for user-specified observation variables [14]. Cramer-Rao bounds, which are a measure of the standard deviation of each estimate, are also calculated. pEst allows the user to drive selected states' time responses from flight data measurements rather than compute them from the nonlinear state equations, thereby treating the driven states as control inputs. In this study, state variables were computed from 6-DoF nonlinear rigid-body equations of motion. The forces and moments were computed from linear aerodynamics represented by stability and control derivatives about the trim condition. The state-space model in pEst is summarized as:

$$\dot{x}=f_s(x,u,F,G) \quad (4)$$

$$y=f_o(x,\dot{x},u,H_0,H_1,J) \quad (5)$$

where $f_s$ and $f_o$ are the state and observation equations, respectively. As is commonly done [13, 15], all stability and control derivatives (F,G) are normalized by aircraft mass or moments of inertia.

CIFER® performs frequency domain identification using linear state-space model structures. The model structures here are linearized from the 6-DoF equations-of-motion. The general linear state-space structure [13] is:

$$M\dot{x}=Fx+Gu \quad (6)$$

$$y=H_0x+H_1\dot{x}+Ju \quad (7)$$

Frequency domain identification in CIFER® proceeds through a sequence of operations to identify single input-single output frequency response pairs through a chirp-z transform using multiple window sizes, and perform multi input-multi-output (MIMO) conditioning to correct for input signal correlation. A coherence function, which quantifies the energy transfer and linearity between each input-output pair, is calculated as part of this process. Finally, a state-space model is identified based on the conditioned frequency responses. The estimation cost function is based on frequency-response magnitude and phase errors. Cramer-Rao bounds are calculated, in addition to insensitivity factors, which quantify the influence of each parameter within the estimation cost [13].

State Space Model Structure Refinement

First-order transfer functions were used initially to estimate key on-axis derivatives: $L_p$, $L_{\delta lat}$, $M_q$ and $M_{\delta lon}$. These were then implemented as starting values in pEst for MIMO identification. The more complete set of derivatives estimated by pEst were then either used as starting values or fixed derivatives in CIFER®. In both pEst and CIFER®, parameters can be fixed and freed selectively. As the model structure was refined and identification progressed, the resulting derivatives were cross-fed between pEst and CIFER®. This was necessary because some derivatives were only well identified in either time- or frequency-domains; the coherence of some frequency response pairs was poor while time responses were good, or conversely, some poor time-domain data content was compensated by the frequency sweeps. Some static stability derivatives computed from steady-trim data were fixed in both pEst and CIFER®, such as My in the cruise models. In general, derivatives that were only identifiable using pEst were fixed in the CIFER® model structure. Parameters assigned high insensitivity in CIFER® were cross-checked in pEst to assess whether or not they should be eliminated from the model.

Hover State Space Model Model Identification

In hover, the state equations decoupled into yaw-heave and pitch-roll subsystems due to negligible aerodynamic coupling derivatives. Only the pitch-roll subsystem is discussed here.

It was not required to identify force derivatives for this study. Therefore, the linear velocity state variables, u and v, were driven to follow flight test measured evolution during time domain identification. This effectively treated u and v as inputs rather than states, so the attitude states, $\phi$ and $\theta$, were also not required for identification. Thus, the coupled pitch-roll system in hover was defined by:

$$x = y = [p\ q]^T \quad (8)$$

$$u = [\delta_{lat}\ \delta_{lon} | u\ v]^T \quad (9)$$

$$F = \begin{bmatrix} L_p & L_q \\ M_p & M_q \end{bmatrix} \quad (10)$$

$$G = \begin{bmatrix} L_p & L_q & | & L_u & L_r \\ M_p & M_q & | & M_u & M_v \end{bmatrix} \quad (11)$$

The full observation vector (9) and control matrix (11) defined the system for time-domain identification. In the frequency domain, all response pairs suffered from low coherence in the low frequency range, so identification was restricted to higher frequency ranges where the effects of speed stability are negligible. Therefore, only the left-hand blocks of Equations (9) and (11) were included in the CIFER® model.

Table 1 lists a selection of final identified values of derivatives of interest in hover, including Cramer-Rao bounds calculated by pEst and CIFER®, and insensitivity factors calculated by CIFER®. Time delays were negligible.

Figure 6A:
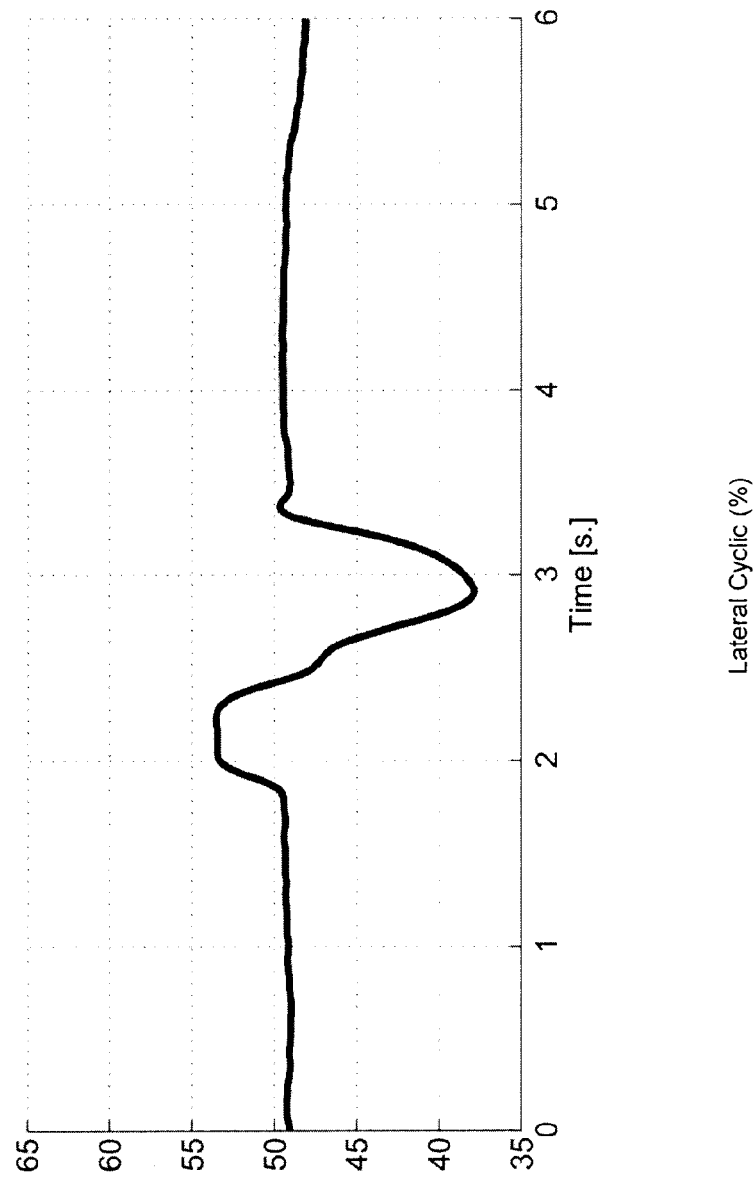
FIGS. 6a-c illustrate a state-space model validation (lateral control response, hover).
Figure 6B:
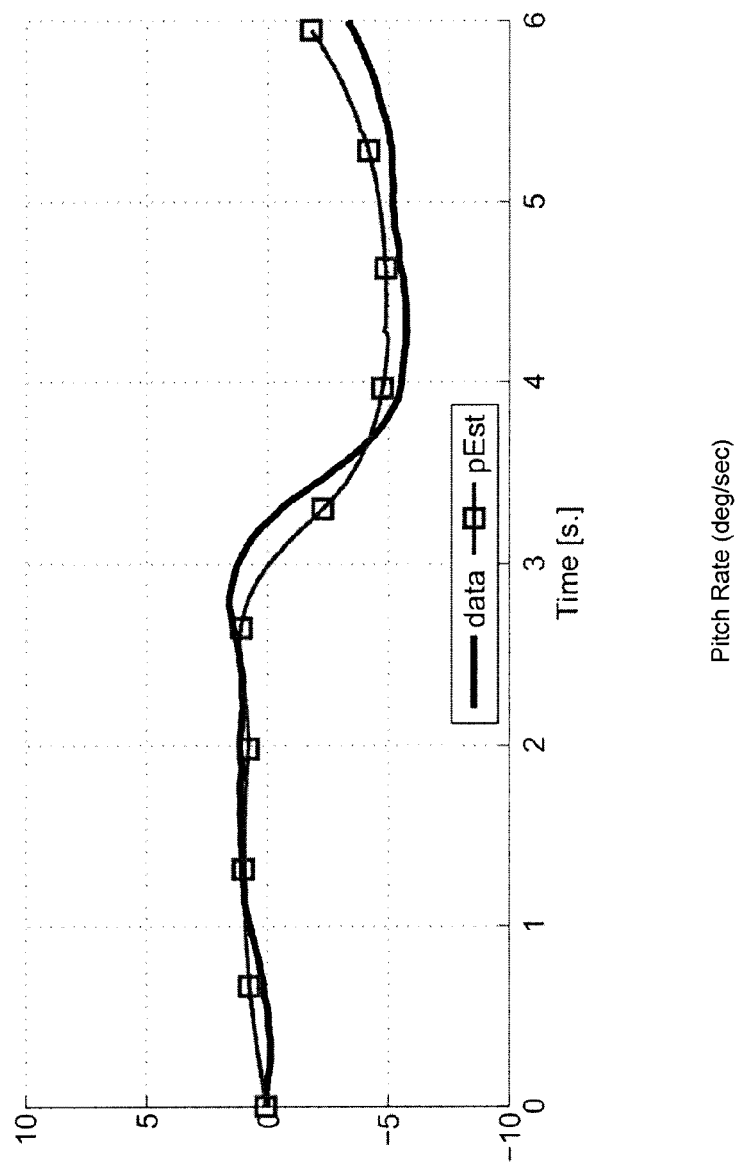
Figure 6C:
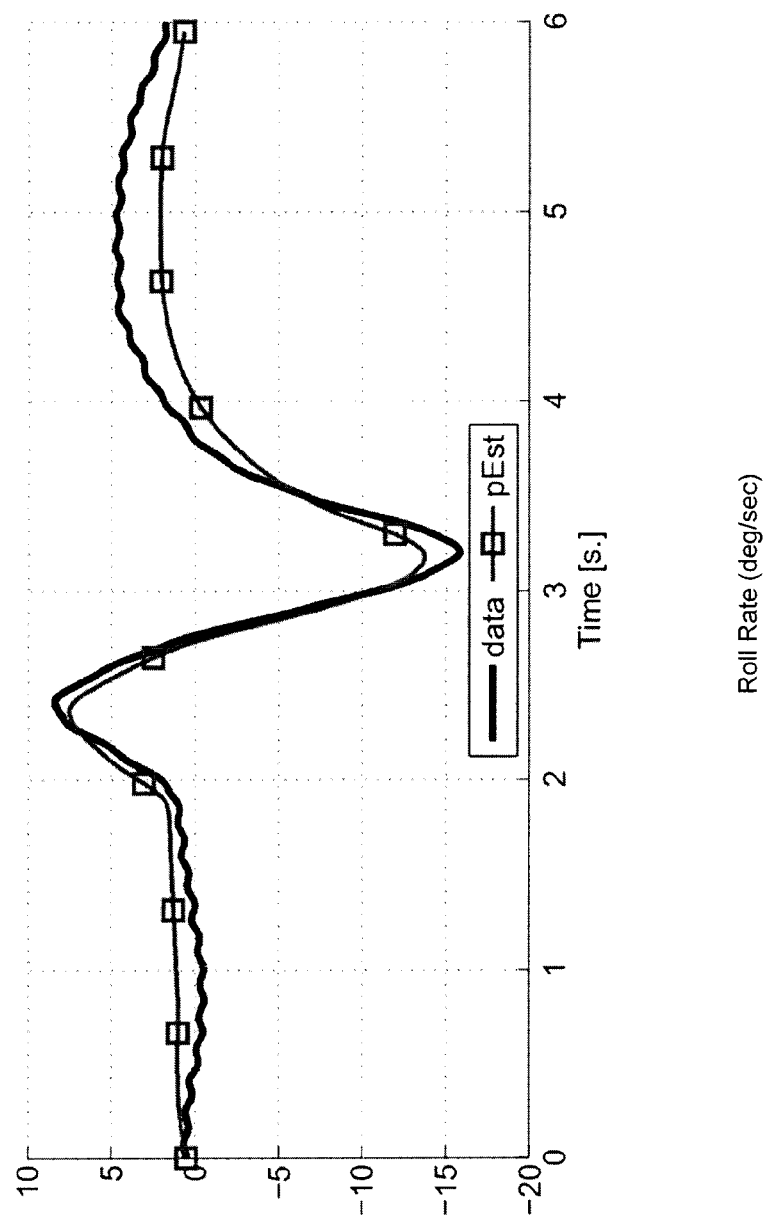

The attitude states, $\phi$ and $\theta$, were computed from the nonlinear equations of motion for time-domain validation. A sample result for a lateral cyclic control input is plotted in FIGS. 6a-c (state-space model validation—lateral control response, hover). Both pitch and roll rates correlate well with the flight test data, but both responses are slightly attenuated compared to the flight test data. The inability of 6-DoF models to capture the loose rotor-body coupling required for high-bandwidth applications has been documented in the literature (summarized in [10, 11, 13]). Common higher-order state-space models include tip path flap states, body acceleration derivatives or modal canonical extensions that do not correspond to blade element model responses as directly as the 6-DoF stability and control derivatives. Therefore, the potential bandwidth limitation of the 6-DoF model was accepted for this initial study. Exploration of higher order identification models is reserved for future research.

TABLE 1

Selected identified moment derivatives - Hover

| Parameter | Value | Cramer-Rao (%) | Insensitivity (%) |
|---|---|---|---|
| $L_p^*$ | −2.65 | 1.81 | N/A |
| $L_q^*$ | −0.48 | 5.23 | N/A |
| $M_p$ | 0.2504 | 9.981 | 3.944 |
| $M_q$ | −0.5330 | 17.63 | 7.930 |
| $L_{\delta lat}$ | 0.1099 | 3.808 | 1.717 |
| $L_{\delta lon}$ | 0.03372 | 4.215 | 2.084 |
| $M_{\delta lat}$ | −0.0099 | 4.499 | 1.987 |
| $M_{\delta lon}$ | 0.02833 | 4.339 | 2.069 |

*fixed derivative in CIFER ® using pEst result

Cruise State-Space Model Identification

As with hover model identification, it was not required to identify longitudinal force derivatives, so the state u was treated as an input and driven to flight test measured values for time-domain identification. Furthermore, the coherence of frequency response pairs at low frequencies, where effects of u are significant, required the low frequency ranges to be ignored for frequency domain identification. Consequently, u-derivatives were neglected in CIFER®. In addition, collective response data was excluded since adequate vertical axis information was obtained from the longitudinal control responses to satisfy the objectives of this study. Thus, the state-space model in cruise was defined by:

$$x = [v\ p\ r\ w\ q | \phi \theta]^T \quad (12)$$

$$y = [\beta\ p\ r\ \alpha\ q]^T \quad (13)$$

$$u = [\delta_{lat}\ \delta_{lon}\ \delta_{ped} | u]^T \quad (14)$$

$$F = \begin{bmatrix} Y_v & Y_p & Y_r - U_0 & Y_w & Y_p & g & 0 \\ L_v & L_p & L_r & L_w & L_q & 0 & 0 \\ N_v & N_p & N_r & N_w & N_q & 0 & 0 \\ Z_v & Z_p & Z_r & Z_w & Z_q + U_0 & 0 & 0 \\ M_v & M_p & M_r & M_w & M_c & 0 & 0 \\ 0 & 1 & 0 & 0 & 0 & 0 & 0 \\ 0 & 0 & 0 & 0 & 1 & 0 & 0 \end{bmatrix} \quad (15)$$

$$G = \begin{bmatrix} Y_{\delta lon} & Y_{\delta lat} & Y_{\delta ped} & Y_u \\ L_{\delta lon} & L_{\delta lat} & L_{\delta ped} & L_u \\ N_{\delta lon} & N_{\delta lat} & N_{\delta ped} & N_u \\ Z_{\delta lon} & Z_{\delta lat} & Z_{\delta ped} & Z_u \\ M_{\delta lon} & M_{\delta lat} & M_{\delta ped} & M_u \\ 0 & 0 & 0 & 0 \\ 0 & 0 & 0 & 0 \end{bmatrix} \quad (16)$$

The full observation vector u and control matrix G defined the system for time-domain identification. In the frequency domain, columns corresponding to the state u were omitted as discussed above.

In pEst, the aerodynamic angles are related to the linear velocity states by nonlinear equations:

$$\alpha = \tan^{-1}\left(\frac{W}{U}\right) \quad (17)$$

$$\beta = \tan^{-1}\left(\frac{V}{\sqrt{U^2 + V^2 + W^2}}\right) \quad (18)$$

In CIFER®, the perturbations are implemented as linear approximations about a trim airspeed $U_0$ as $\alpha \approx w/U_0$ and $\beta \approx v/U_0$.

Figure 7A:
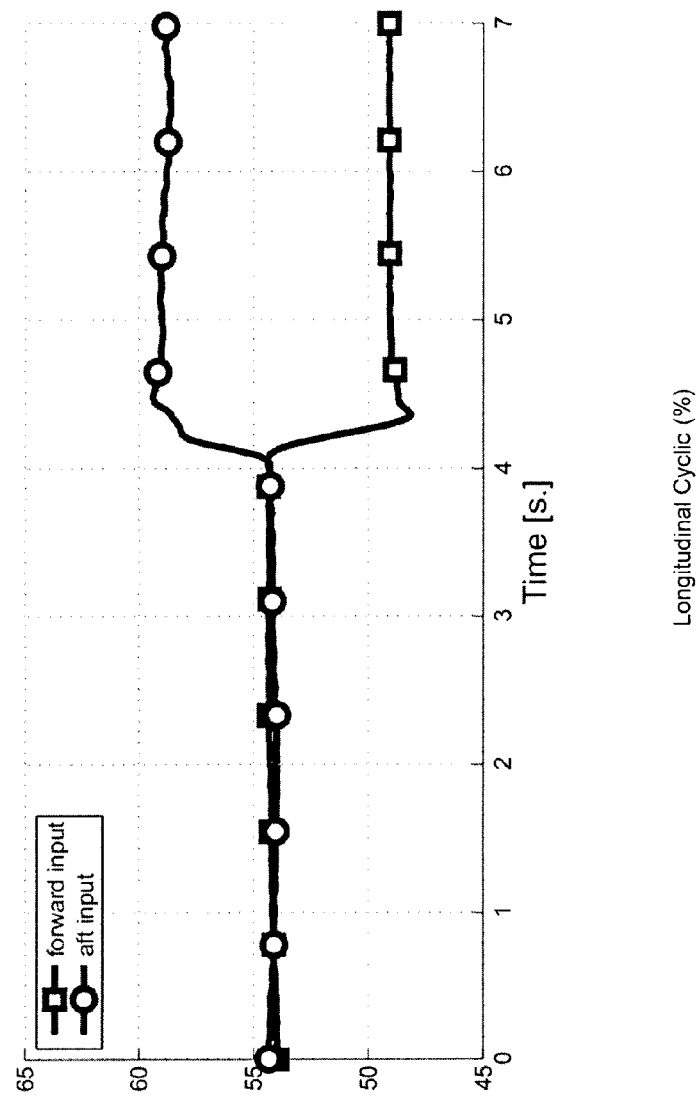
FIGS. 7a-c illustrate a state-space model response (linear aerodynamic, 75 knots cruise).
Figure 7B:
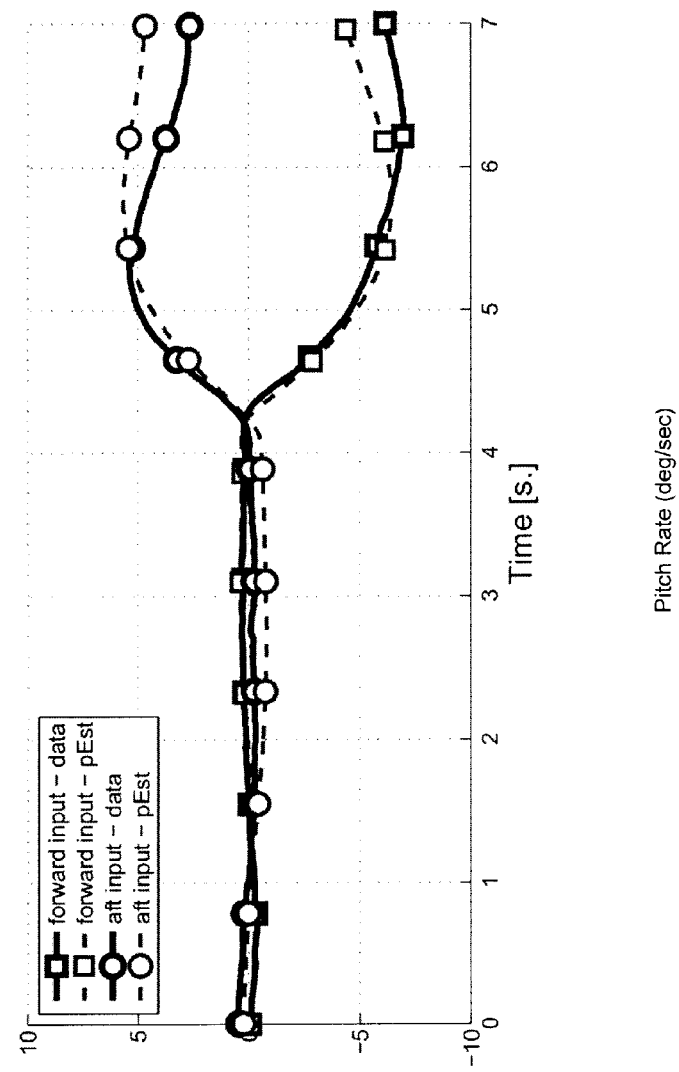
Figure 7C:
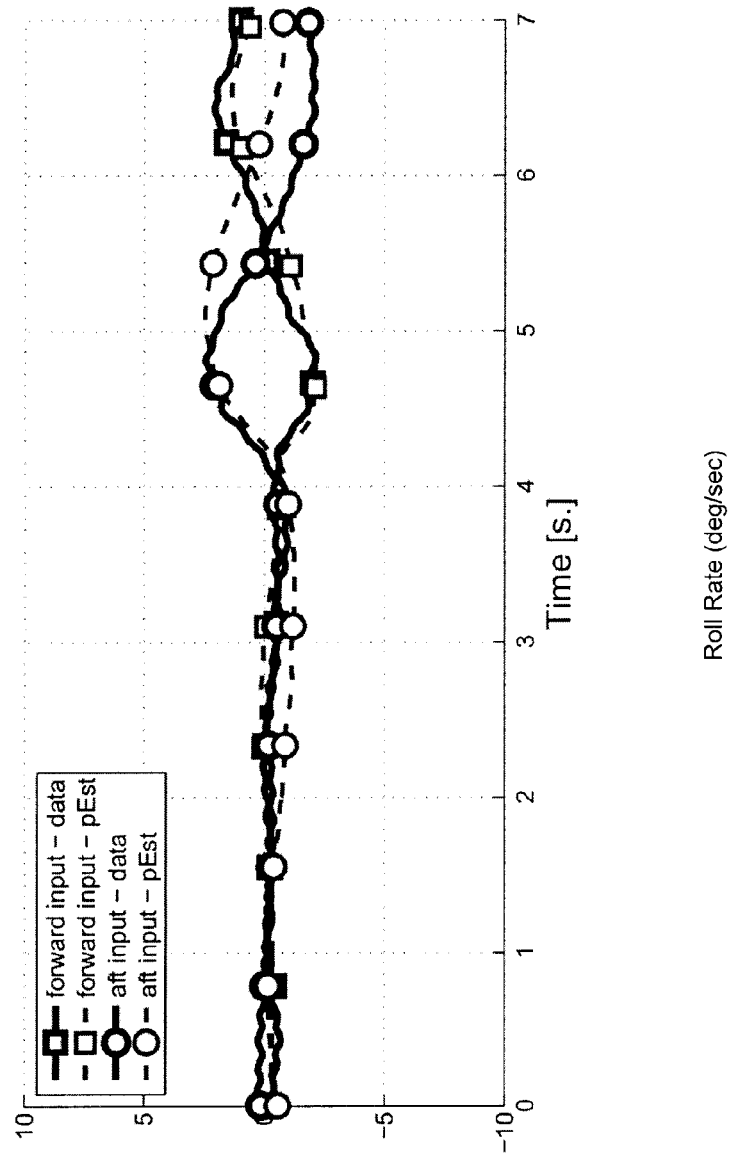

The main challenge encountered during cruise regime identification was to obtain consistent estimates for $M_w$. The presence of nonlinear pitching moment derivatives was suspected through poor pitch rate time-responses predicted by the identified linear model and asymmetric aircraft response illustrated in FIGS. 7a-c (state-space model response, linear aerodynamics, 75 knots cruise). The linear model's pitch rate response to forward cyclic input is slightly under-predicted, while the response to aft cyclic input exhibits an overshoot.

An analysis of static trim data revealed a nonlinear aircraft body pitching moment variation with angle of attack. A further analysis in pEst was undertaken to separate influences of positive and negative pitch responses by implementing a nonlinear pitching moment function. The analysis revealed that both the spring ($M_w$) and damping ($M_q$) moments become increasingly stable with increasing w. This is consistent with a change in pitching moment balance between the horizontal stabilizer and fuselage as the stabilizer transitions through the main rotor and fuselage wakes.

It should be noted that the pEst estimates for $M_{\delta lon}$ were not affected by the choice of constant vs. variable $M_w$ and $M_q$. Since it is only possible to impose or identify constant parameters for frequency domain identification, experiments were conducted in CIFER® to assess the sensitivity of the other parameter estimates with different combinations of $M_w$ and $M_q$ fixed and free. Frequency domain estimates for $M_{\delta lon}$ varied by only 10% across all experiments. Thus, it was still possible to identify main rotor control derivatives with confidence in the presence of this type of aerodynamic nonlinearity, in both time and frequency domains. Table 2 lists values, Cramer-Rao bounds and insensitivity factors for a selection of final identified derivatives.

Figure 8A:
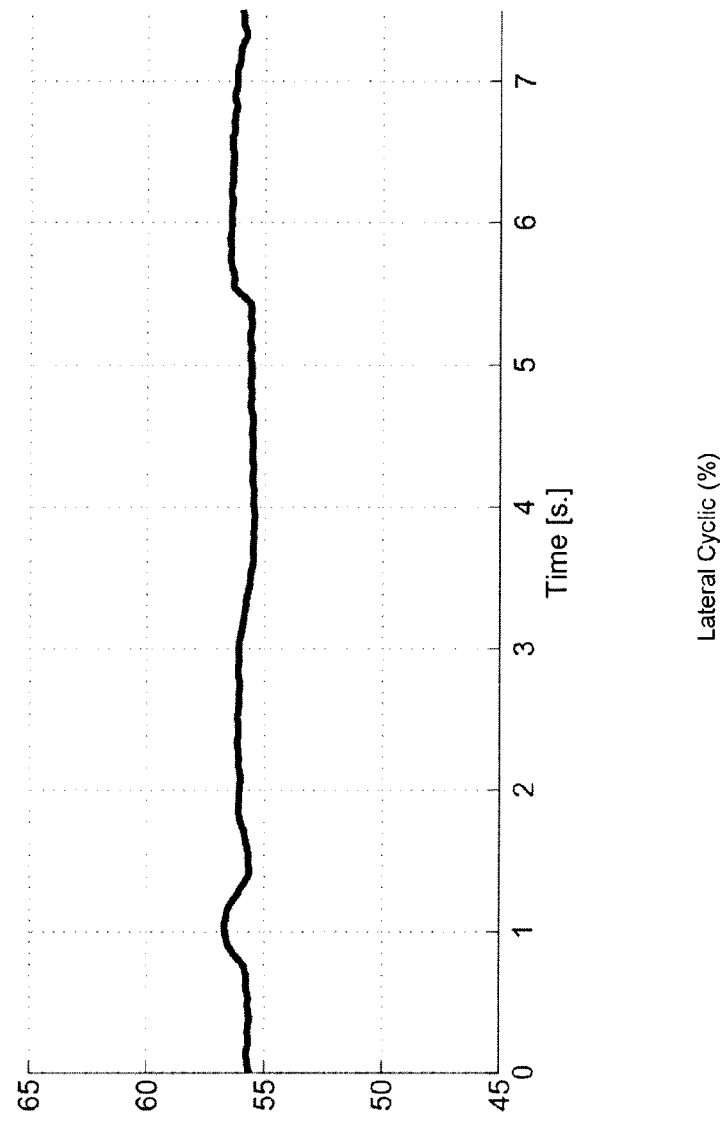
FIGS. 8a-c illustrate a state-space model validation (lateral control response, 75 knots cruise).
Figure 8B:
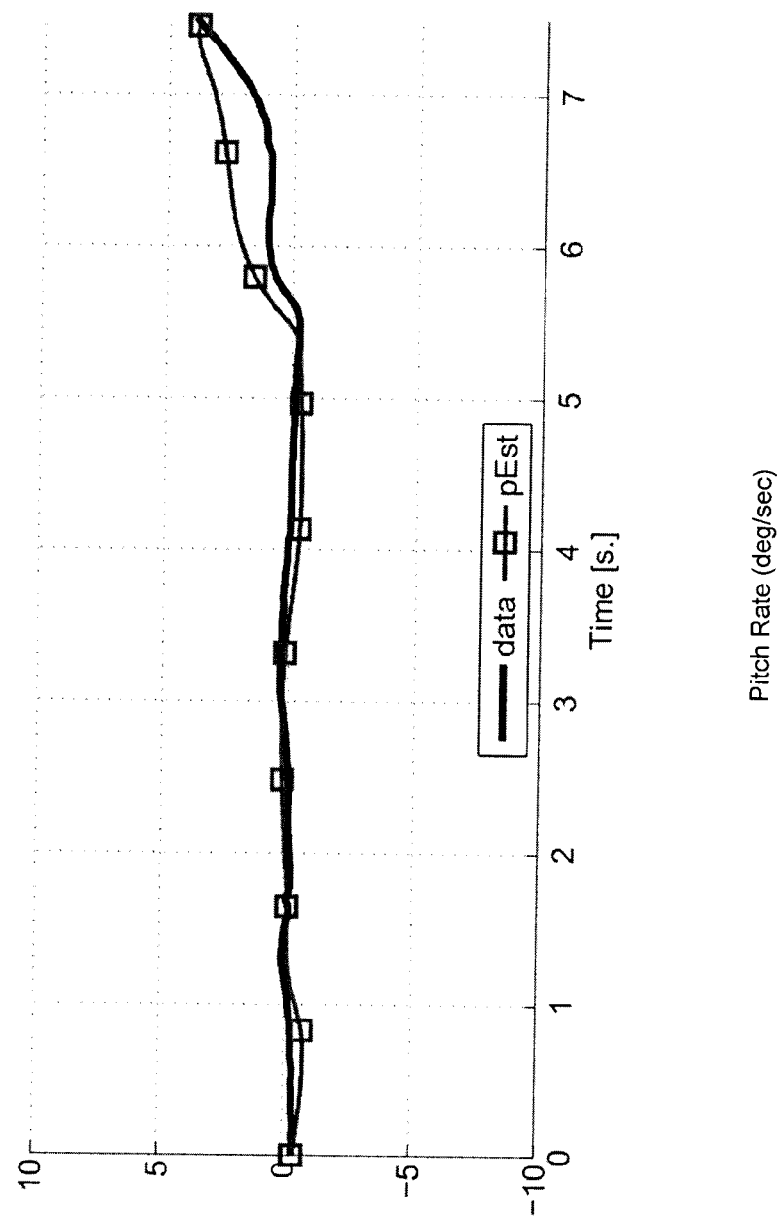
Figure 8C:
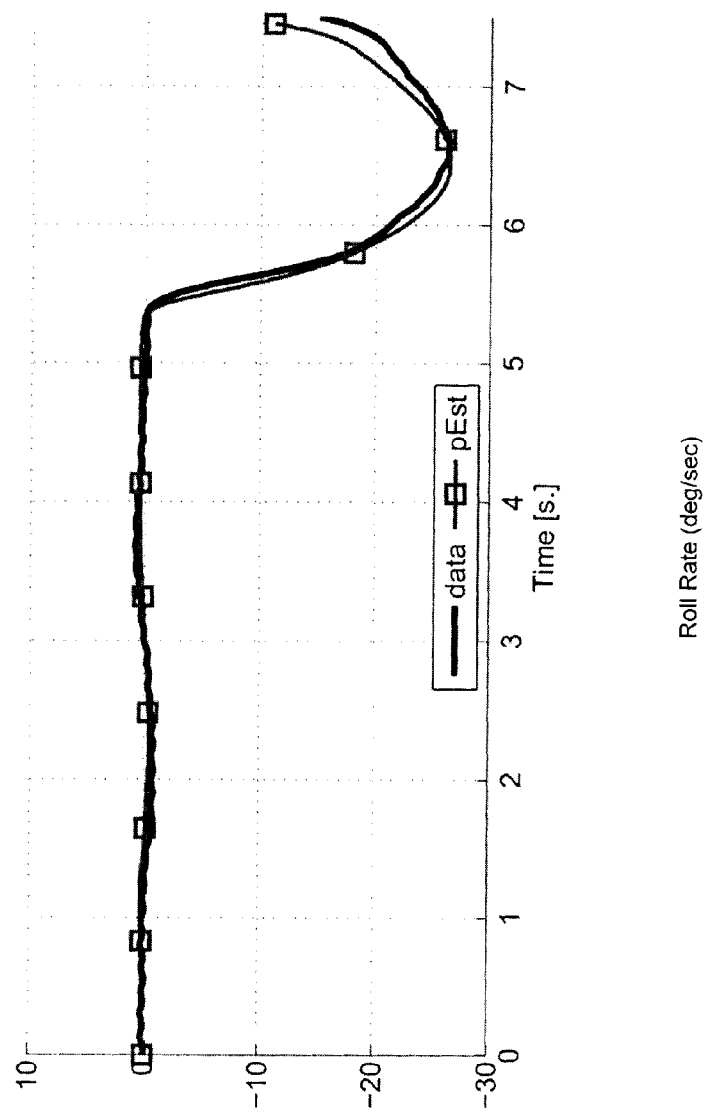

All states were computed from the nonlinear equations of motion for final time-domain validation. A sample result for lateral control response is plotted in FIG. 8 (state-space model validation—lateral control response, 75 knots cruise). The on-axis roll rate correlates very well with the flight test data. The off-axis pitch rate shows the correct sense and magnitude. These results are deemed sufficient to continue to the optimization step.

TABLE 2

Selected identified moment derivatives - 75-knots cruise

| Parameter | Value | Cramer-Rao (%) | Insensitivity (%) |
|---|---|---|---|
| $L_p$* | −2.60 | 3.45 | N/A |
| $L_q$* | −0.2 | 6.43 | N/A |
| $L_w$ | −0.01500 | 12.17 | 2.667 |
| $L_v$ | −0.04599 | 4.289 | 1.817 |
| $M_p$† | 0.08338 | 34.21 | 12.90 |
| $M_q$† | −0.8489 | 6.709 | 2.198 |
| $M_w$*† | −0.01 | N/A | N/A |
| $M_v$‡ | −0.0024 | N/A | N/A |
| $L_{\delta lat}$ | 0.105* | 2.23 | N/A |
| $L_{\delta lon}$ | 0.02329 | 5.041 | 2.513 |
| $M_{\delta lat}$ | −0.008272 | 5.050 | 2.309 |
| $M_{\delta lon}$ | 0.03087 | 4.895 | 1.330 |

*Fixed derivative in CIFER® using pEst result
†Linear model constant value
‡Calculated from static mid-speed trim data Blade Element Simulation The real-time nonlinear simulation platform used in this study was CAE's Object Oriented Blade Element Rotor Model (OO-BERM) [16]. The OO-BERM is a flight mechanics simulation framework that allows the simulation designer to compose multi-body vehicle models of scalable fidelity at simulation load time. Compiled libraries, written in C++, provide classes representing structural parts, aerodynamic model components and other force generators, as well as mathematical components such as data table interpolation, interfaces and base classes that the model designer can extend within a project library. Instances of library classes representing a specific vehicle simulation are declared in an XML configuration file that is parsed at run-time. The OO-BERM supports model reconfiguration during run time, allowing various models to be configured and swapped without the need for code generation or recompilation. This makes the OO-BERM a convenient platform for parametric studies and mathematical model trade studies such as performed here.

In this study, rigid blades with flap and lag degrees of freedom were simulated. The anti-torque tail rotor was modeled as an actuator disc based on Bailey's equations [17]. In order to ensure accurate rotor speed and torque transients, the helicopter power plant was simulated with full turboshaft engine, electronic fuel control unit, and transmission models typical of Level-D simulations.

The OO-BERM was set up to simulate the light twin-turbine helicopter that was flight tested for this study. No configuration data was known a-priori. Overall helicopter dimensions and geometry were easily observed on the test article. Zero fuel weight and center of gravity location were known from an aircraft weighing. The remaining fuselage and rotor blade mass properties were derived from engineering estimates and geometry measurements. Rotor blade lift and drag coefficients as a function of angle of attack and Mach number were known from the blade sectional profiles, although the span-wise profile variation was assumed. The identified control and on-axis damping derivatives are within the range typical of articulated rotors [15], and early optimization experiments not reported here also suggested a flap hinge offset approaching the hinge offset for this helicopter published by Prouty [18]. However, the blade retention system was concealed within the rotor hub housing, so the flap hinge stiffness was not certain. Therefore, the following rotor design parameters were treated as unknown: swash plate phase angle ($\Delta\theta_1$), pitch-flap coupling angle ($\delta_3$) and flap hing stiffness ($K_\beta$).

In order to study how the numerical optimization procedure accommodates different mathematical model structures, the OO-BERM was set up to run two different inflow models: (a) quasi-steady inflow, and (b) dynamic inflow model of Peters & HaQuang [19] including wake distortion as described in [10]. Both models compute three inflow states representing average and first harmonic induced velocities over the rotor plane in the hub-wind frame:

$$\lambda_i(\bar{r},\psi_b) = \lambda_0 + \bar{r}(\lambda_c \cos\psi_b + \lambda_s \sin\psi_b) \quad (19)$$

The quasi-steady inflow model is $$\tau_\lambda \dot{\lambda}_0 = \lambda_m(C_T,\mu,\alpha_{TPP}) - \lambda_0$$

$$\lambda_s = 0$$

$$\lambda_c = K_c(\lambda)\lambda_0 \quad (20)$$

where $\tau\lambda$ is a fixed 150 ms time constant, $\lambda_m$ is the average induced velocity from momentum theory, and $K_c$ is a longitudinal first harmonic inflow skew factor. The dynamic inflow model including wake distortion is $$T\begin{bmatrix}\dot{\lambda}_0\\\dot{\lambda}_s\\\dot{\lambda}_c\end{bmatrix} = L\begin{bmatrix}C_T\\C_L\\C_M\end{bmatrix}_2 - \begin{bmatrix}\lambda_0\\\lambda_s\\\lambda_c\end{bmatrix} + \begin{bmatrix}0\\K_p p_{TPP}\\K_q q_{TPP}\end{bmatrix} \quad (21)$$

Figure 9:
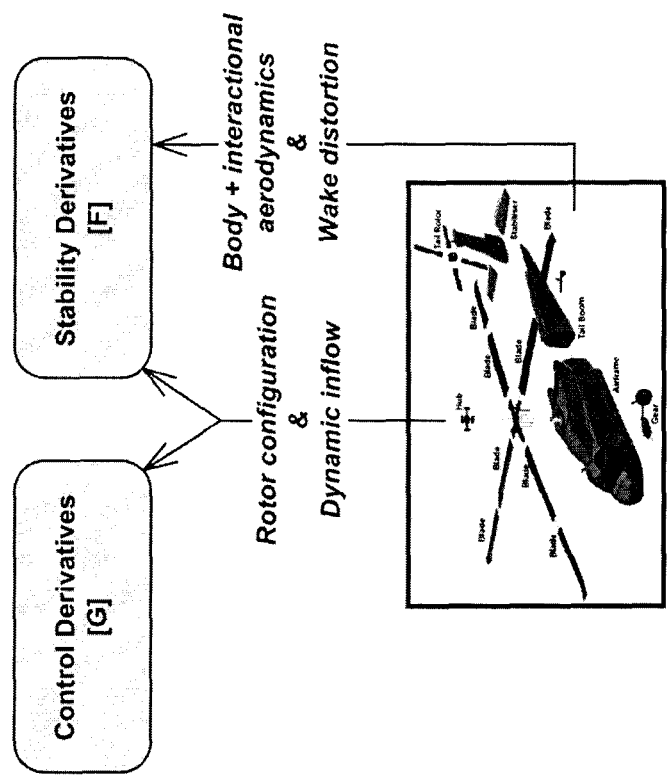
FIG. 9 illustrates an influence of blade element model parameters on predicted stability and control derivatives.
Figure 10A:
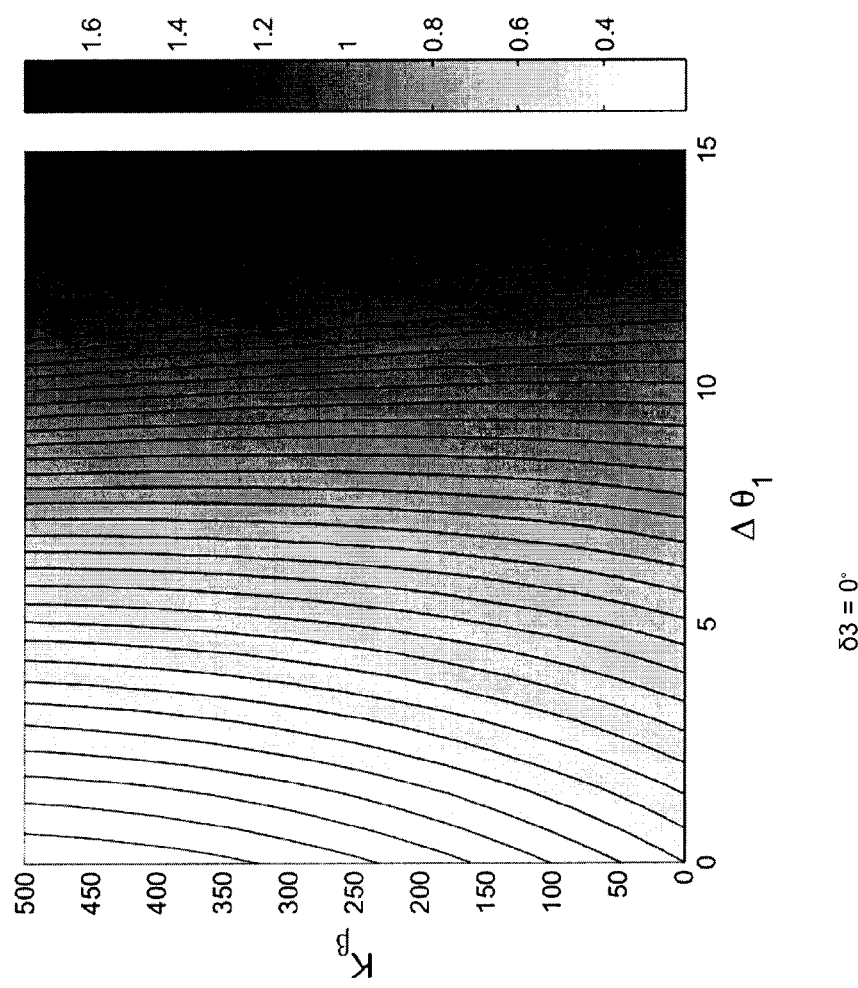
Figure 10B:
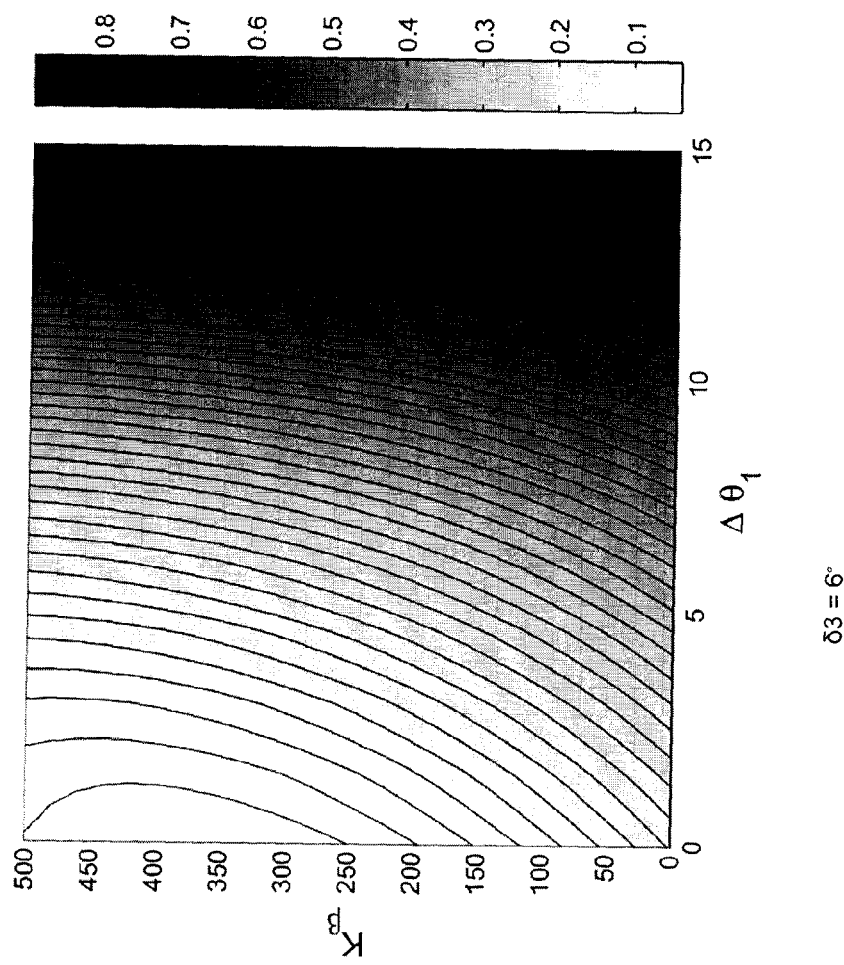
Figure 10C:
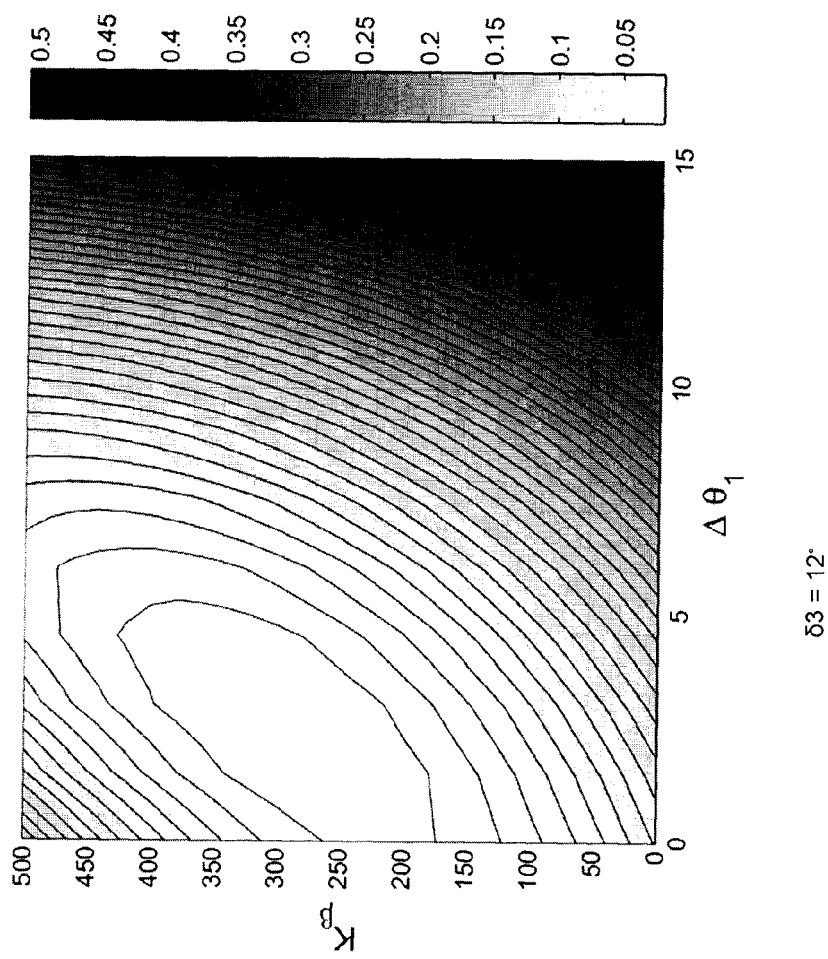
Figure 10D:
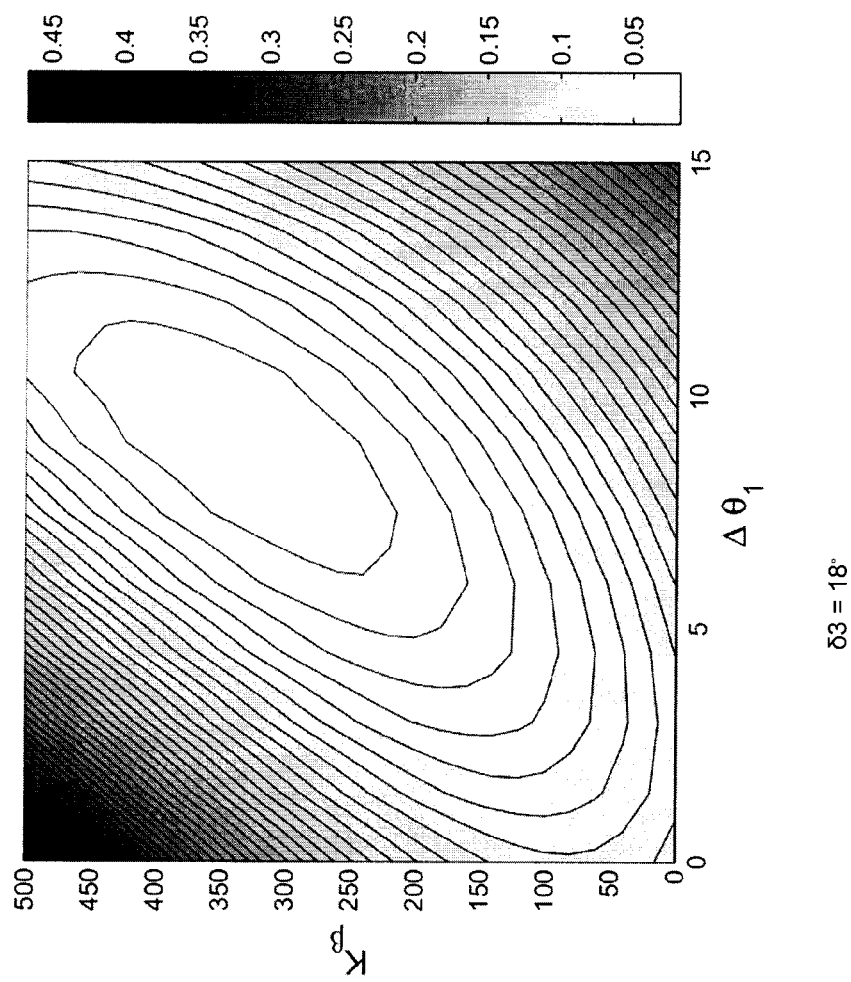

The purpose of using these two inflow models is not to compare their accuracy, but to verify whether the design optimization procedure can accommodate blade element model structures that exhibit different fundamental control and stability characteristics. It is expected that Equations (20) and (21) would predict different main rotor control derivatives and stability derivatives, as the dynamic inflow model includes aerodynamic moment feedback through the full L matrix. It is also expected that wake distortion would further affect the dynamic stability derivatives through pitch and roll rate feedback, but not the control derivatives. This dependency is illustrated in FIG. 9 (influence of blade element model parameters on predicted stability and control derivatives). The significance of this distinction for model optimization is discussed in the following sections.

Blade Element Model Optimization

Objective Function Definition

The three design variables ($\Delta\theta_1$, $\delta_3$ and $K_\beta$) are related to the rotor design, not aerodynamic models. Therefore, the blade element model optimization demonstrated in this section includes only main rotor control derivatives in the optimization objectives, not stability derivatives. The objective function is defined as a weighted sum of the squared normalized errors of on- and off-axis pitch and roll control derivatives as follows:

$$\Phi = [\Delta\theta_1, \delta_3, K_\beta] \quad (22)$$

$$\min J(\Phi) = \sum_{i=1}^{4} w_i \left(1 - \frac{g_i^M(\Phi)}{g_i^S}\right) \quad (23)$$

subjected to the physical constraints $$0° \leq \Delta\theta_1 \leq 15° \quad (24)$$

$$0° \leq \delta_3 \leq 20° \quad (25)$$

$$0 \leq K_\beta \leq 500 \text{ ft·lb/deg} \quad (26)$$

Where $g_i^S$ are the identified control derivatives ($L_{\delta lon}$, $L_{\delta lat}$, $M_{\delta lon}$, and $M_{\delta lat}$), and $w_i$ are weighting factors. The model control derivatives, $g_i^M(\Phi)$, were obtained by configuring the OO-BERM with known data and extracting control derivatives from small control perturbation finite differences for combinations of the unknown variables $\Delta\theta_1$, $\delta_3$ and $K_\beta$ over their full ranges. A tri-variate quadratic design map was constructed through a surface fit over $g_i^M(\Phi)$. The default weights are $w_i=1$, but can be modified by the user. It is imposed that the weights are normalized as $$\Sigma_{i=1}^{4} w_i = 1 \quad (27)$$

so that the objective function represents the square of the weighted average of control derivative errors. The optimization problem defined by Equations (23-27) was then solved using a gradient-based first order optimization algorithm [20].

Hover Optimization, Quasi-Steady Inflow

The first optimization experiment was restricted to the hover regime, targeting the control derivatives listed in Table 1. The control derivative error weights, which were determined empirically, are listed in Table 3. During early experiments, it was observed that the weight on $L_{\delta lat}$ had to be raised to obtain an error magnitude similar to the other derivatives'. A low weight was assigned to $M_{\delta lat}$ to prevent it from driving the other derivatives away from their optimal values.

Contour lines of the resulting objective function are plotted in FIGS. 10a-d (objective function contours and isosurfaces, hover optimization) for 53 angles ranging from of 0 to 18 degrees.

The results illustrate the nonlinear coupling between the design variables suggested by Equations (1-3).

The coupled effect of all three design variables on the objective function may be observed in FIG. 10e, where outer and inner isosurfaces represent J=0.05 and J=0.02 respectively. These compare to a control derivative error average of roughly 22% ($\sqrt{0.05}$) and 14% ($\sqrt{0.02}$). In the design space bounded by J<0.02, the control derivatives exhibit little variation. The cylindrical shape of these low-cost regions suggests that there exists a family of solutions of almost equal quality.

Figure 11:
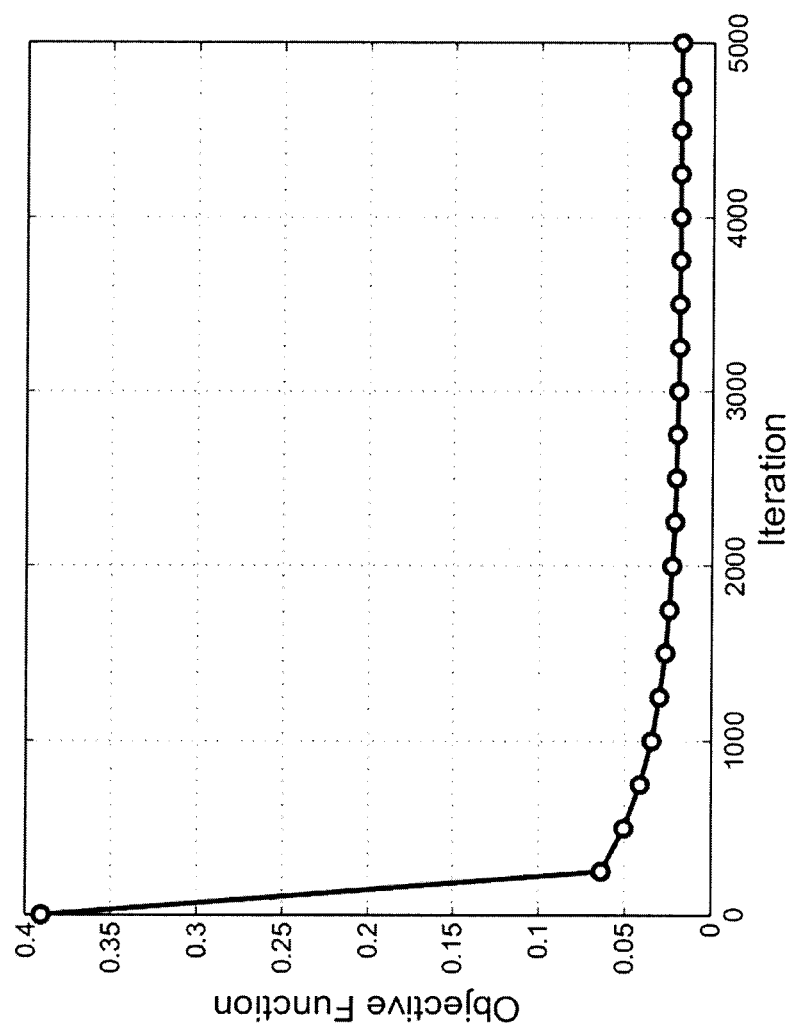
FIG. 11 illustrates a convergence history for hover optimization.

The optimal hover design solution and corresponding derivatives are presented in Table 4a. The convergence history presented in FIG. 11 (convergence history for hover optimization) shows that the solution is fully converged. The fully converged solution is characterized by a relative error of less than 11% on every control derivatives, except for $M_{\delta lat}$, which had been purposely deweighted.

TABLE 3

| Control Derivative Error Weights | | |
|---|---|---|
| Derivative | $w_i$ | normalized $w_i$ |
| $L_{\delta lon}$ | 1.0 | 0.27 |
| $L_{\delta lat}$ | 1.5 | 0.42 |
| $M_{\delta lon}$ | 1.0 | 0.27 |
| $M_{\delta lat}$ | 0.1 | 0.06 |

Full Envelope Optimization, Quasi-Steady Inflow

Since the design variables represent fixed physical characteristics of the rotor, they should be assigned unique global values in the blade element simulation. To accomplish this, a full envelope optimization was performed by targeting the identified control derivatives for hover, 75-knot and 120-knot cruise regimes simultaneously.

First, a cost function was defined for each regime separately and plotted as an isosurface J=0.02 in FIG. 12a. A visual inspection reveals an intersection of the three design spaces, suggesting that a solution satisfying the target control derivatives for hover, 75 knots and 120 knots exists. This leads to the following full-envelope objective function:

$$\Phi = [\Delta\theta_1, \delta_3, K_\beta] \quad (28)$$

$$\min J(\Phi) = \quad (29)$$

$$\sum_{i=1}^{4} \frac{w_i}{3}\left(1 - \frac{g_i^M(\Phi)}{g_i^S}\right)^2\bigg|_{hover} + \sum_{i=1}^{4} \frac{w_i}{3}\left(1 - \frac{g_i^M(\Phi)}{g_i^S}\right)^2\bigg|_{75\,knots} + \sum_{i=1}^{4} \frac{w_i}{3}\left(1 - \frac{g_i^M(\Phi)}{g_i^S}\right)^2\bigg|_{120\,knots}$$

Figure 12B:
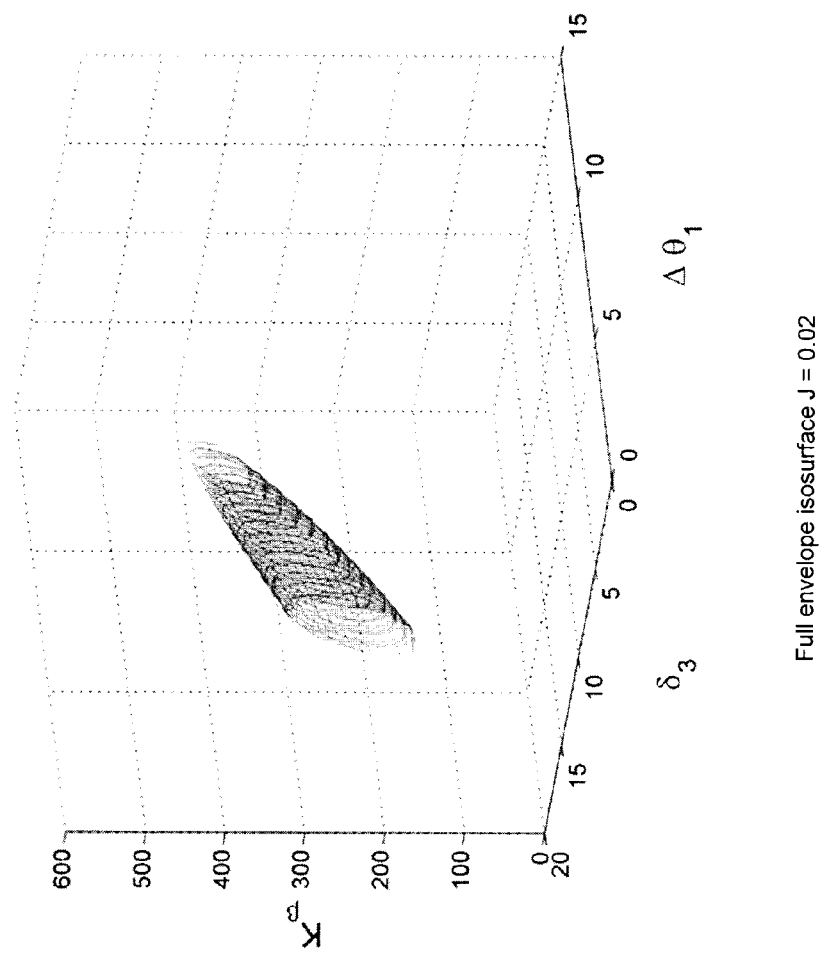

The same isosurface (J=0.02) of this new objective function is presented in FIG. 12b. Superimposing the quasi-cylindrical isosurfaces of each regime results in an ellipsoidal solution space. The global minimum appears to be located in the non-physical region $\Delta\theta_1<0$. Accordingly, the swash plate phase angle found during the optimization is the lower constraint $\Delta\theta_1=0°$ imposed by Equation 24. The solution and the resulting control derivatives are presented in Table 4b, respectively. The fully converged solution yielded errors below 15% on every derivative, except $M_{\delta_{lat}}$, similarly to the isolated hover optimization.

Full Envelope Optimization, Dynamic Inflow

Figure 13B:
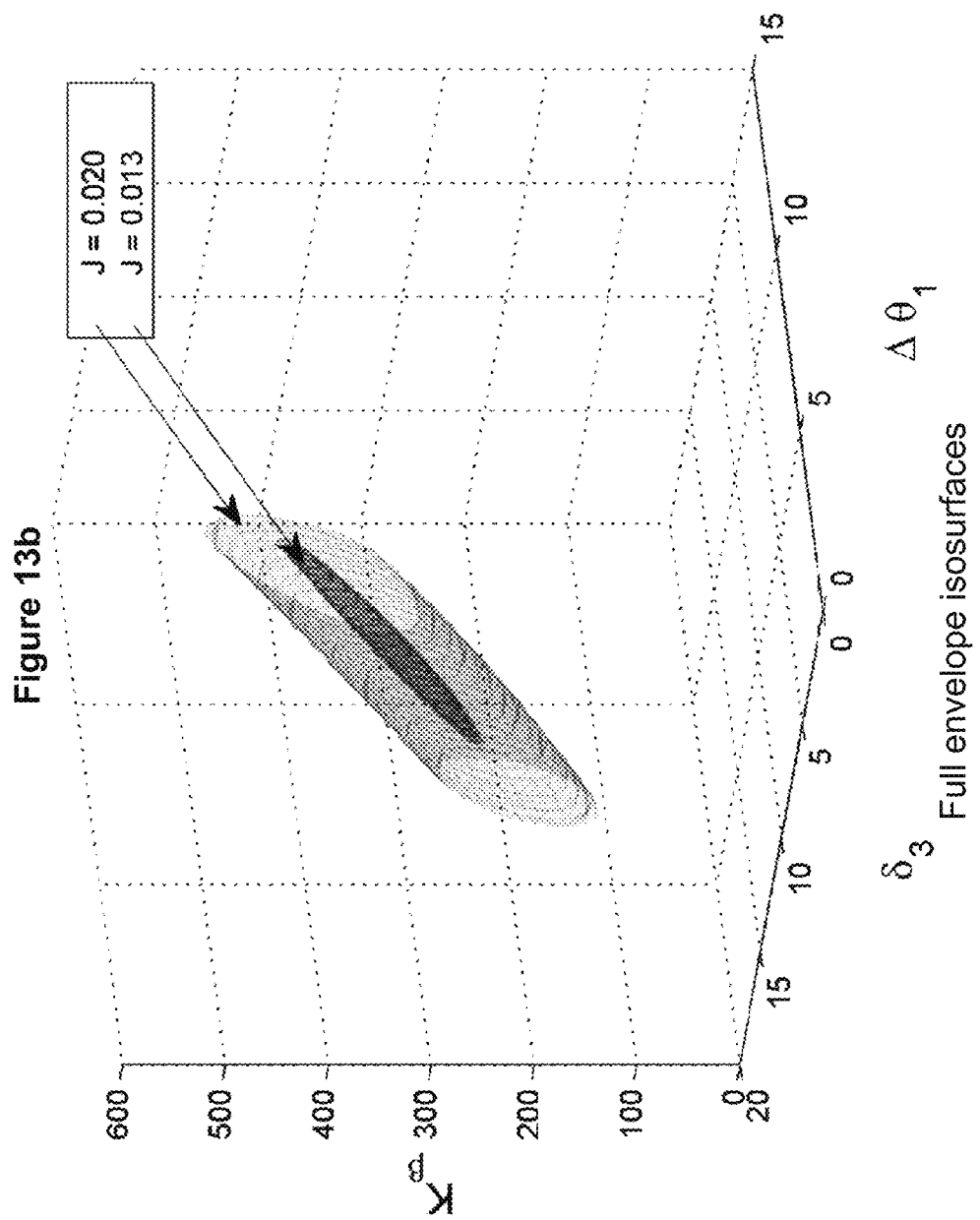

In addition to the mechanical characteristics of the main rotor, the inflow model also affects the cyclic control derivatives. To study this influence, the optimization was repeated with the OO-BERM running the dynamic inflow model (Equation 21). The resulting isosurfaces J=0.02 for each speed regime are presented in FIG. 13a. As expected, comparing FIGS. 12a and 13a reveals that the influence of the inflow model is strongest in hover and diminishes with airspeed. The hover optimal Ai region is shifted by approximately 8 degrees for a given $K_\beta$-$\delta_3$ combination. The same effect may also be observed on the full envelope objective function presented in FIG. 13a, where the inner isosurface J=0.013 suggests that the global minimum lies well within the physical constraints imposed by Equations 24-26. Accordingly, the algorithm found an optimal solution away from the $\Delta\theta_1 \geq 0$ constraint, as presented in Table 4c. The final cost obtained with the dynamic inflow model is lower than with the quasi-steady inflow model. Accordingly, the relative errors on the control derivatives are also generally lower.

Summary of Demonstration

Thus far, the optimization of blade element model design variables to predict desired control derivatives has been demonstrated. The same state-space model defined control derivative targets for both quasi-static and dynamic inflow blade element model structures. It was observed that the rotor design space for a dynamic inflow model was more physically realistic and led to a more accurate prediction of control derivatives than with the quasi-steady inflow model. It is suspected that as the blade element model structure becomes more sophisticated and realistic—such as by augmenting it with an elastic blade formulation as reported in [10]—the optimal rotor design solution will approach the actual helicopter's design values. However, it should be stressed that this method is not a helicopter reverse engineering procedure. Rather, the goal is to find the design variables within a given blade element model structure that would result in the most accurate stability and control characteristics that the model is capable of predicting.

Validation

Blade Element Model Setup

The purpose of this step is to validate that the OO-BERM simulates pitch and roll responses that are consistent with the results of the optimization procedure. Specifically, the accuracy of time responses, compared with flight test data, should correspond with the final control derivative errors of each optimal solution. It is expected that the time responses would generally match the flight test data well. Some differences from the 6-DoF state-space responses are expected since the OO-BERM simulates higher-order dynamics such as flap and lead-lag, as well as nonlinearity from the tail rotor simulation that are missing from the 6-DoF model.

The OO-BERM was set up to run both quasi-steady and dynamic inflow models, configured with their respective optimal design variables listed in Tables 4b and 4c. These design variables were determined to maximize the accuracy of on- and off-axis cyclic control derivatives. Within each optimally-configured model structure, aerodynamic model parameters were then set in order to reproduce the identified stability derivatives, as illustrated in the right-hand branch of FIG. 9. This was accomplished in two ways.

The first method involved treating the helicopter fuselage and empennage as a lumped body, and calculating the corresponding body aerodynamic coefficients to produce stability derivative contributions not provided by the optimal rotor design. These aerodynamic coefficients represent the net effect of all physical phenomena acting on the fuselage and empennage that are manifested through stability derivatives. This implementation is somewhat artificial, but has the advantage of retaining the most direct link with the identified state-space model, and is the simplest form to obtain the required stability and control.

Figure 14:
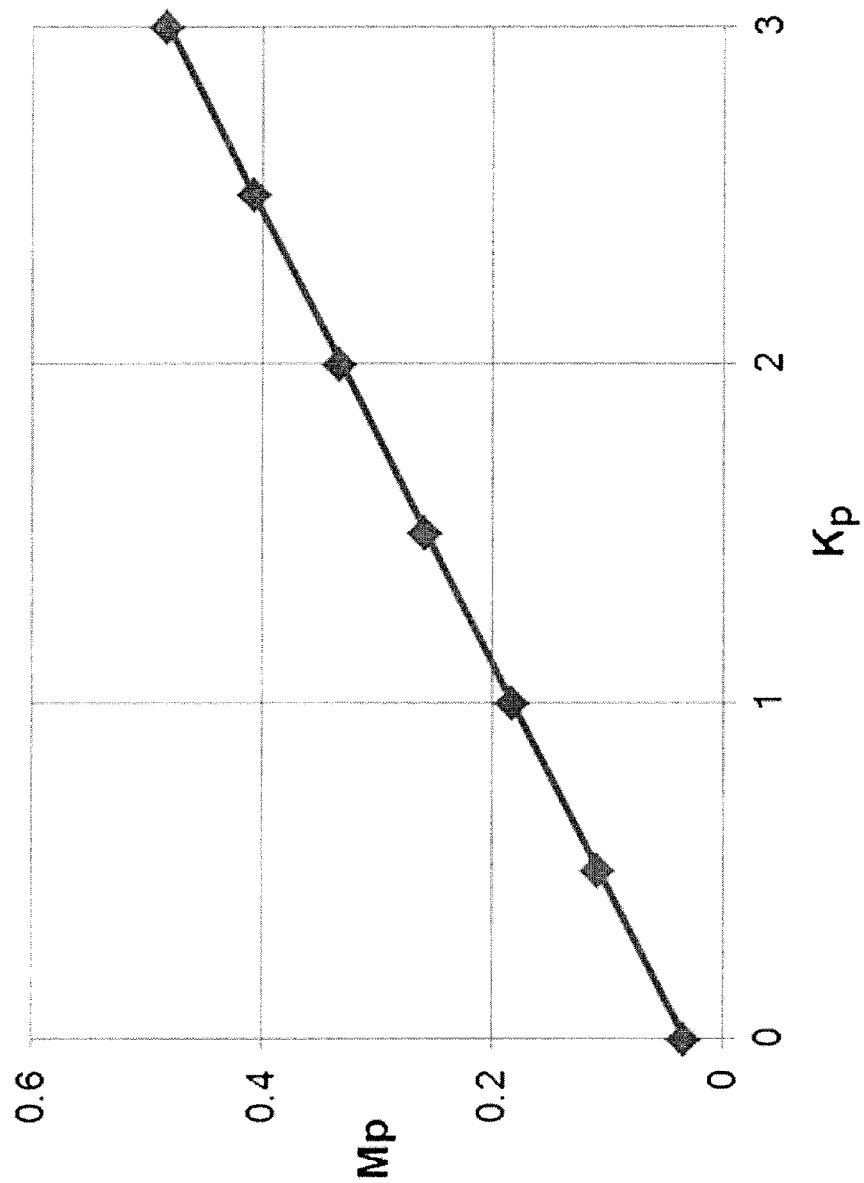
FIG. 14 illustrates Mp versus Kp values in hover from small perturbation analysis of OO-BERM running a dynamic inflow model.

The second—and more sophisticated—method involved selecting mathematical models representing more refined aerodynamic phenomena typical of Level-D simulations, and either calculating or optimizing their unknown parameters to obtain the target stability derivatives. For example, the variation of $M_p$ versus the wake distortion factor $K_p$ in hover, extracted using small perturbation finite differences from the OO-BERM running the dynamic inflow configuration, is plotted in FIG. 14 ($M_p$ vs. $K_p$ in hover from small perturbation analysis of OO-BERM running dynamic inflow model). If the model designer chooses to use this wake distortion model, a value of $K_p=1.45$ can be selected to obtain the required derivative $M_p=0.250$.

The time response results using either method were generally indistinguishable. This highlights that it might be more important to achieve good handling qualities through accurate stability and control characteristics rather than through complex

TABLE 4

Final OO-BERM Control Derivatives Using Optimal Design Variables

| Optimal Solution | Regime | | $L_{\delta lon}$ | $L_{\delta lat}$ | $M_{\delta lon}$ | $M_{\delta lat}$ |
|---|---|---|---|---|---|---|
| (a) Hover Optimization | | | | | | |
| $\Delta\theta_1 = 0.0$ | Hover | Identified derivative | 0.0337 | 0.1099 | 0.0283 | −0.0099 |
| $\delta_3 = 9.67$ | | OO-BERM derivative | 0.0344 | 0.0983 | 0.0312 | −0.0036 |
| $K_\beta = 271.89$ | | Error (%) | 1.92 | 10.6 | 10.1 | 63.2 |
| $J = 0.01867$ | | | | | | |
| (b) Full Envelope Optimization, Quasi-steady Inflow | | | | | | |
| $\Delta\theta_1 = 0.0$ | Hover | Identified derivative | 0.0337 | 0.1099 | 0.0283 | −0.0099 |
| $\delta_3 = 8.36$ | | OO-BERM derivative | 0.0312 | 0.1008 | 0.0320 | −0.0033 |
| $K_\beta = 288.60$ | | Error (%) | 7.36 | 8.32 | 13.1 | 66.1 |
| $J = 0.01369$ | 75 knots | Identified derivative | 0.0250 | 0.1050 | 0.0265 | −0.0078 |
| | | OO-BERM derivative | 0.0276 | 0.1032 | 0.0297 | −0.0040 |
| | | Error (%) | 10.2 | 1.71 | 12.0 | 48.6 |
| | 120 knots | Identified derivative | 0.0250 | 0.1040 | 0.0334 | −0.0069 |
| | | OO-BERM derivative | 0.0249 | 0.1040 | 0.0306 | −0.0042 |
| | | Error (%) | 0.39 | 0.02 | 8.32 | 39.2 |
| (c) Full Envelope Optimization, Dynamic inflow | | | | | | |
| $\Delta\theta_1 = 9.9$ | Hover | Identified derivative | 0.0337 | 0.1099 | 0.0283 | −0.0099 |
| $\delta_3 = 16.2$ | | OO-BERM derivative | 0.0347 | 0.0988 | 0.0313 | −0.0037 |
| $K_\beta = 333.02$ | | Error (%) | 2.97 | 10.1 | 10.7 | 62.5 |
| $J = 0.01242$ | 75 knots | Identified derivative | 0.0250 | 0.1050 | 0.0265 | −0.0078 |
| | | OO-BERM derivative | 0.0266 | 0.1024 | 0.0300 | −0.0043 |
| | | Error (%) | 6.34 | 2.51 | 13.2 | 44.8 |
| | 120 knots | Identified derivative | 0.0250 | 0.1040 | 0.0334 | −0.0069 |
| | | OO-BERM derivative | 0.0240 | 0.1029 | 0.0304 | −0.0042 |
| | | Error (%) | 0.39 | 1.09 | 8.79 | 39.3 | aerodynamic models. Since the purpose of this step is to validate the optimal rotor design for control, it is immaterial for this study how the stability derivatives are decomposed further into airframe aerodynamic models following the rotor design step, as long as the target derivatives are obtained. Different aerodynamic models would influence response predictions away from regions validated by flight test data, which is not within the scope of this study. Therefore, the simpler linear body coefficient derivatives were retained for all subsequent test cases to avoid biasing the interpretation of results by slight nonlinearities in the more complex models.

Hover Validation

Figure 15A:
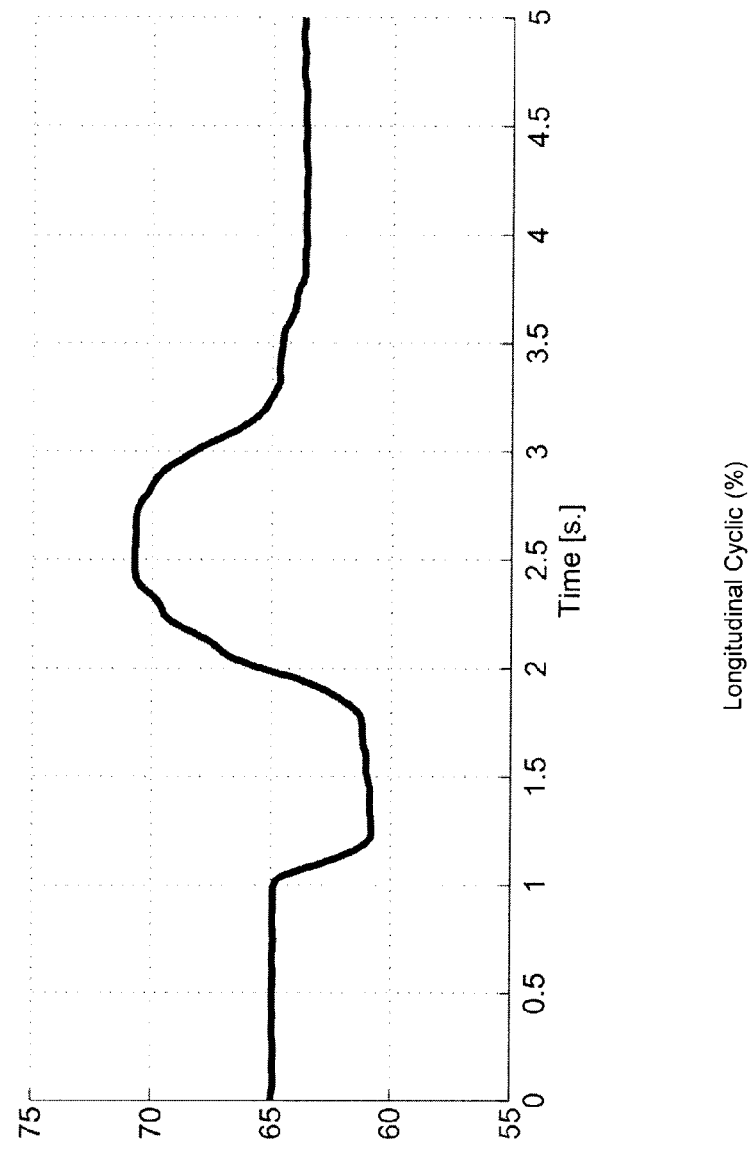
FIGS. 15a-c illustrate an OO-BERM validation (longitudinal cyclic input in hover).
Figure 15B:
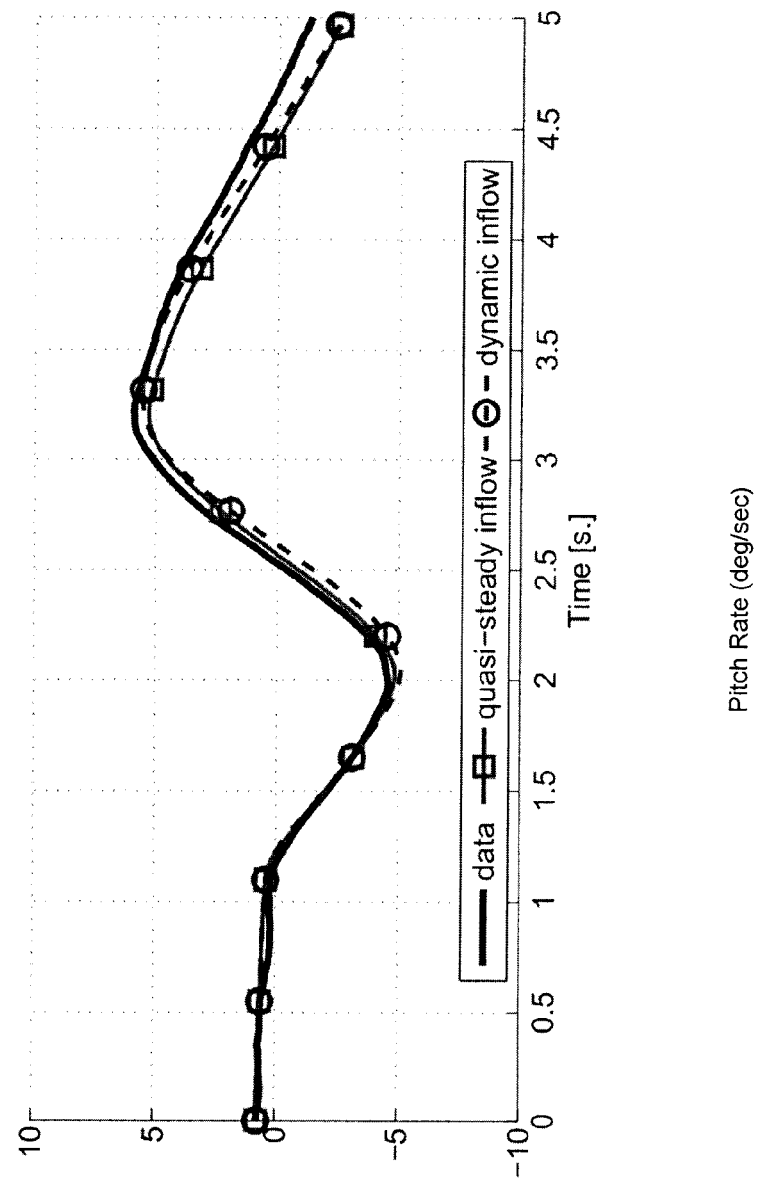
Figure 15C:
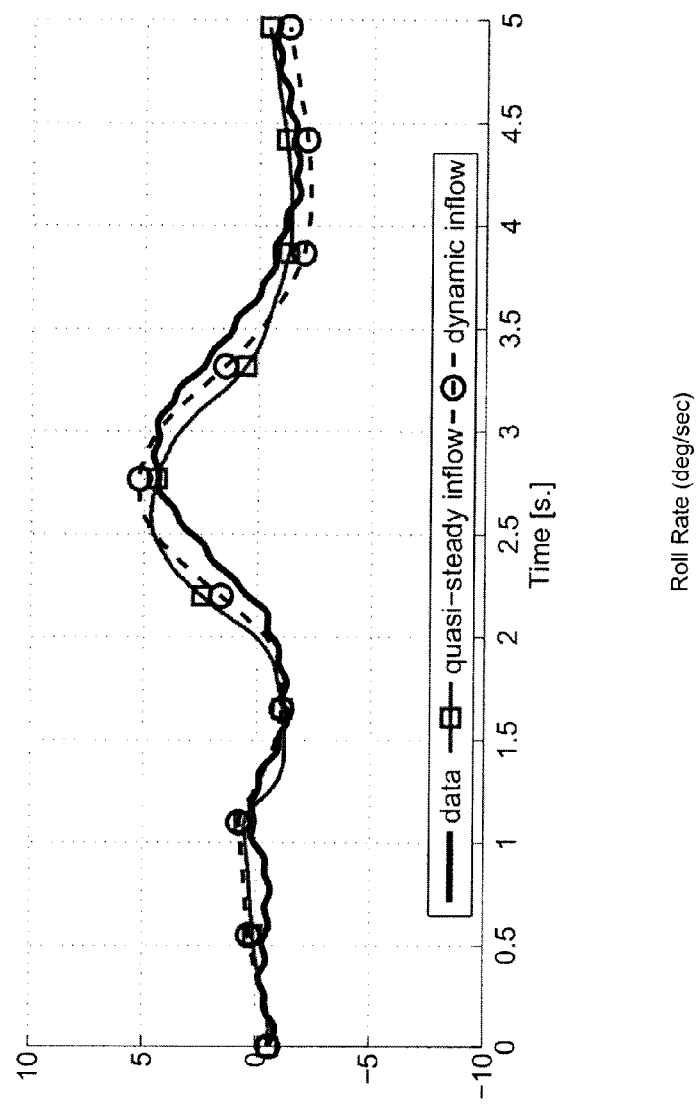

Results for longitudinal cyclic doublet and lateral cyclic step inputs in hover are plotted in FIGS. 15a-c (OO-BERM validation—longitudinal cyclic input in hover) and 16a-c (OO-BERM validation—lateral cyclic input in hover), respectively. The on-axis pitch and roll responses in both cases satisfy Level-D tolerances. The off-axis responses correlate well with flight test data.

The results with dynamic inflow show better phasing of the peak off-axis roll rate from longitudinal cyclic input than with quasi-static inflow (FIG. 15c), even though both inflow models were configured to yield identical control and stability derivatives. It appears that the first-order inflow dynamics in Equation (21) introduce a lag on the influence of $L_{\delta lon}$ that attenuates the initial acceleration and improves the off-axis roll response. The on-axis pitch response is not affected by the choice of inflow model, as long as the rotor simulation is optimized for each inflow model.

Figure 16A:
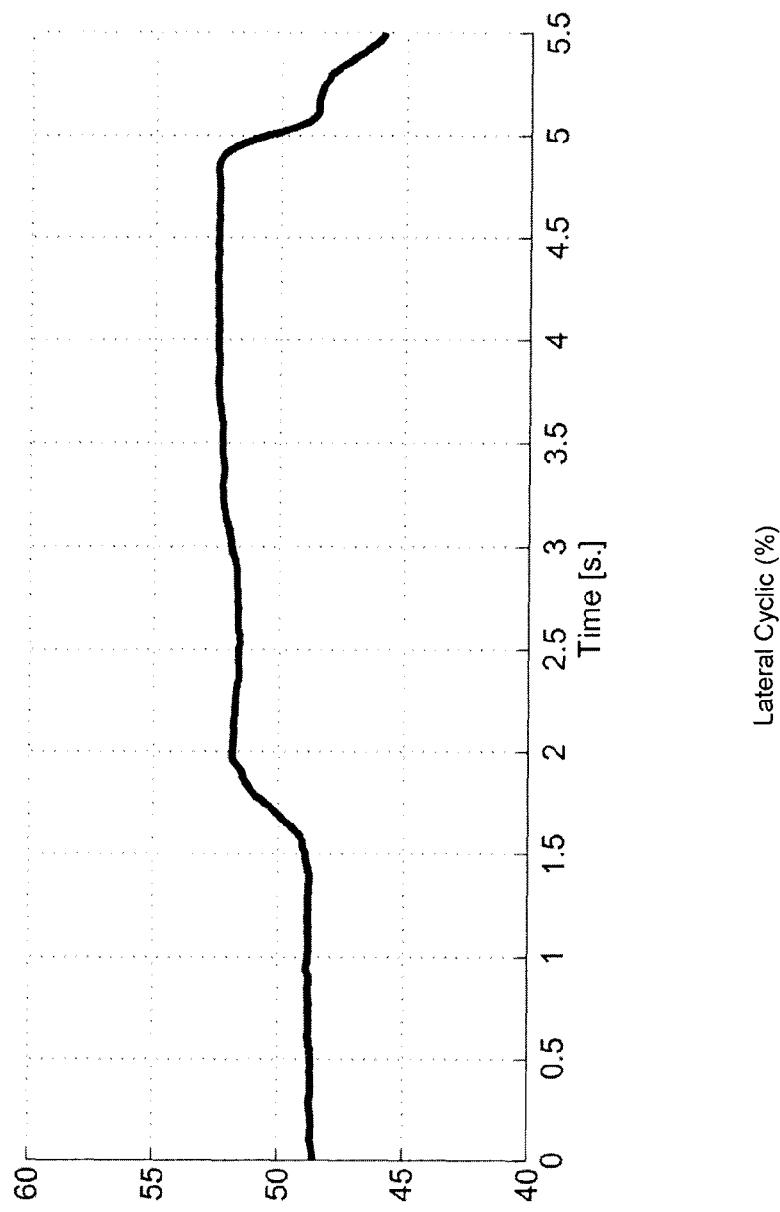
FIGS. 16a-c illustrate an OO-BERM validation (lateral cyclic input in hover).
Figure 16B:
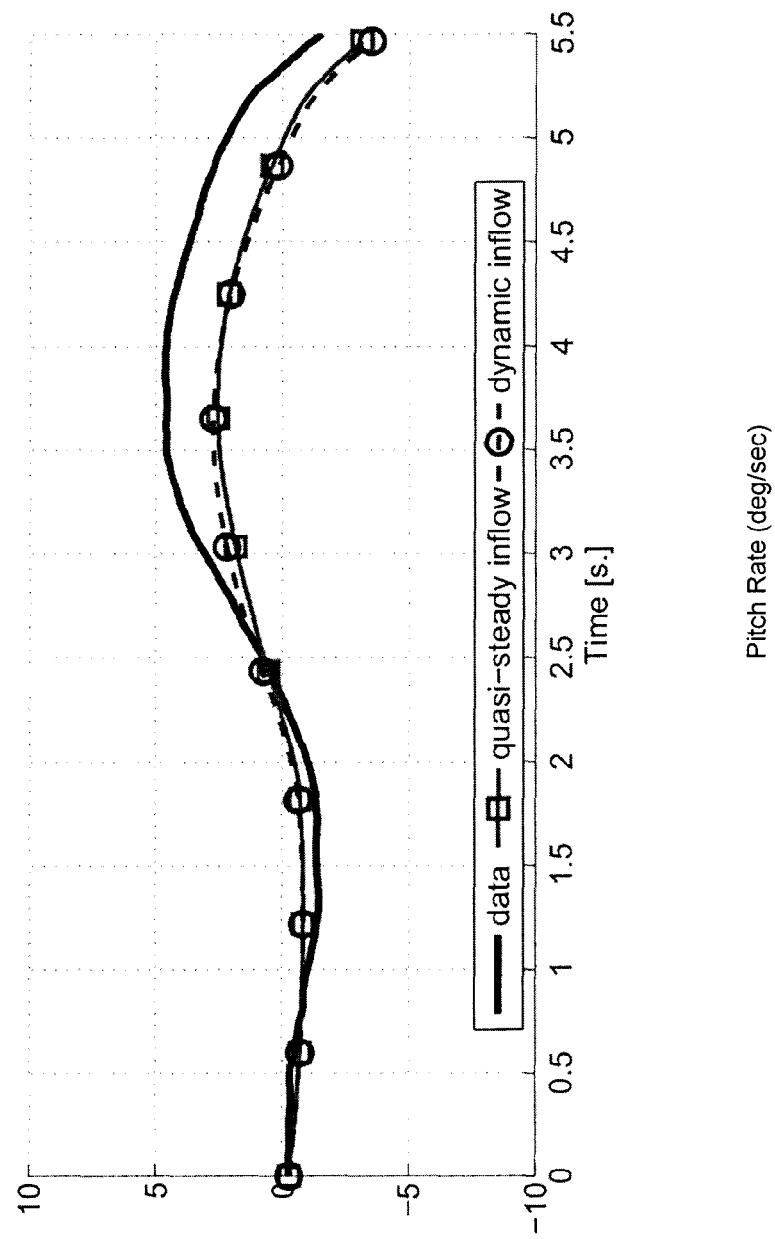
Figure 16C:
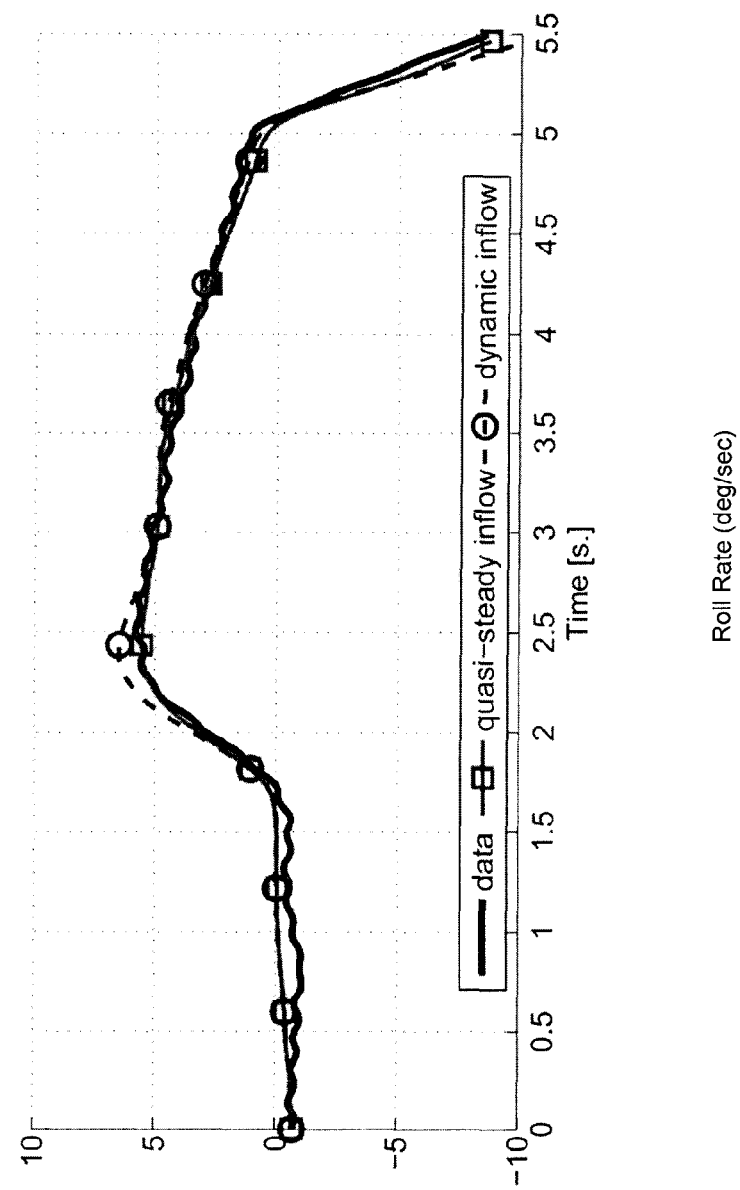

The off-axis pitch response to lateral cyclic step input (FIG. 16b) is underpredicted. This is attributed to the $M_{\delta lat}$ errors of 66.1% and 62.5% in hover for both inflow models (Tables 4b and 4c). However, since the exact value of $L_q$ was obtained in both models through aerodynamic model parameters, the shape of the pitch rate throughout the free response (approx. t=2-5 s) follows the flight test data well, albeit with an offset.

It is expected that improving the prediction of $M_{\delta lat}$—by either including more design parameters within the rotor optimization or augmenting the blade element simulation with more sophisticated mathematical models, such as aeroelastic models—would also improve the initial pitch acceleration. Nevertheless, by optimizing the blade element simulations to identified control and stability derivatives, it is assured that these results are the best that could be predicted by either blade element model structure. This level of confidence is not likely attainable through a manual tuning process, especially in the absence of rotor configuration data.

Cruise Validation

Figure 17A:
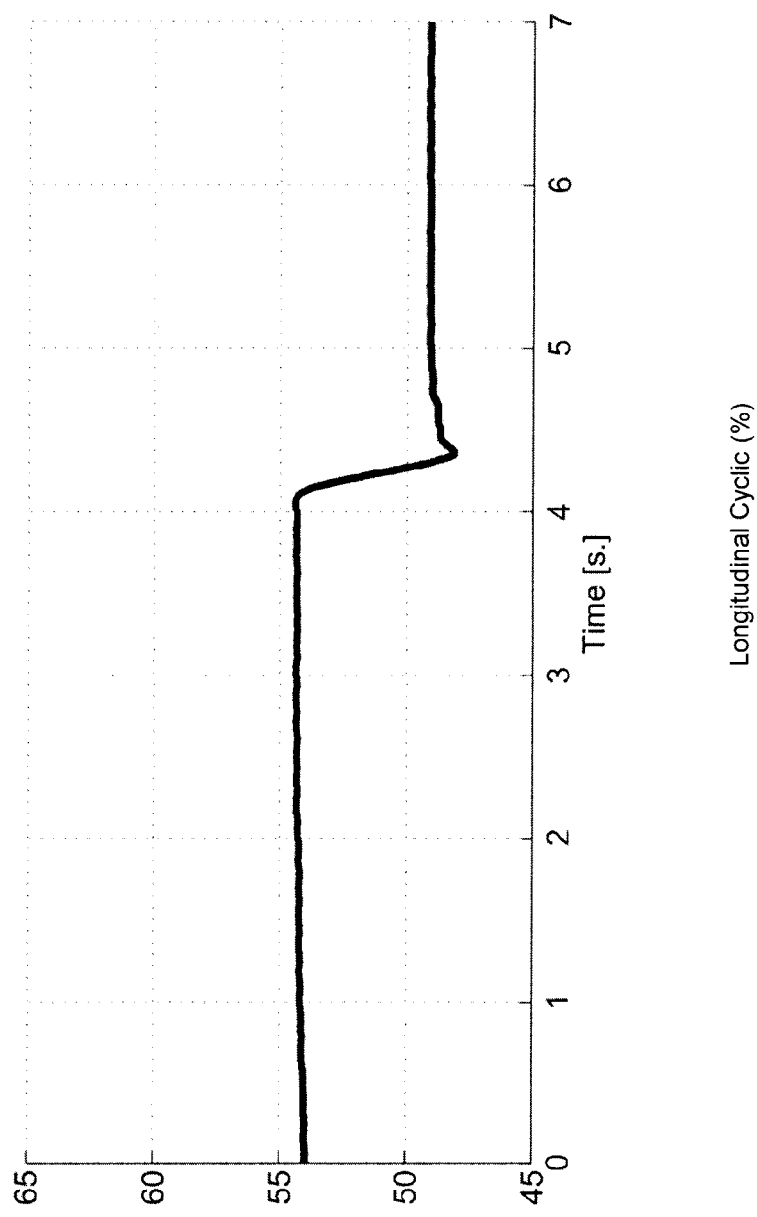
FIGS. 17a-c illustrate an OO-BERM validation (longitudinal cyclic forward input at 75 knots).
Figure 17B:
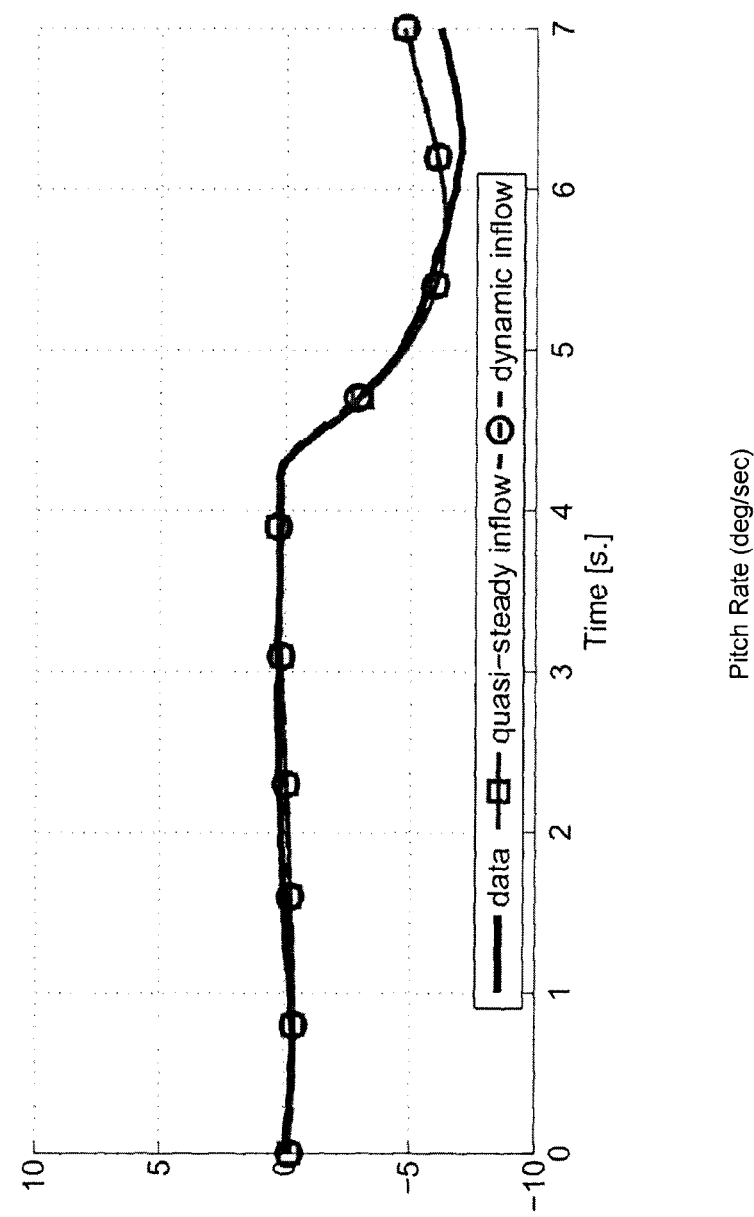
Figure 17C:
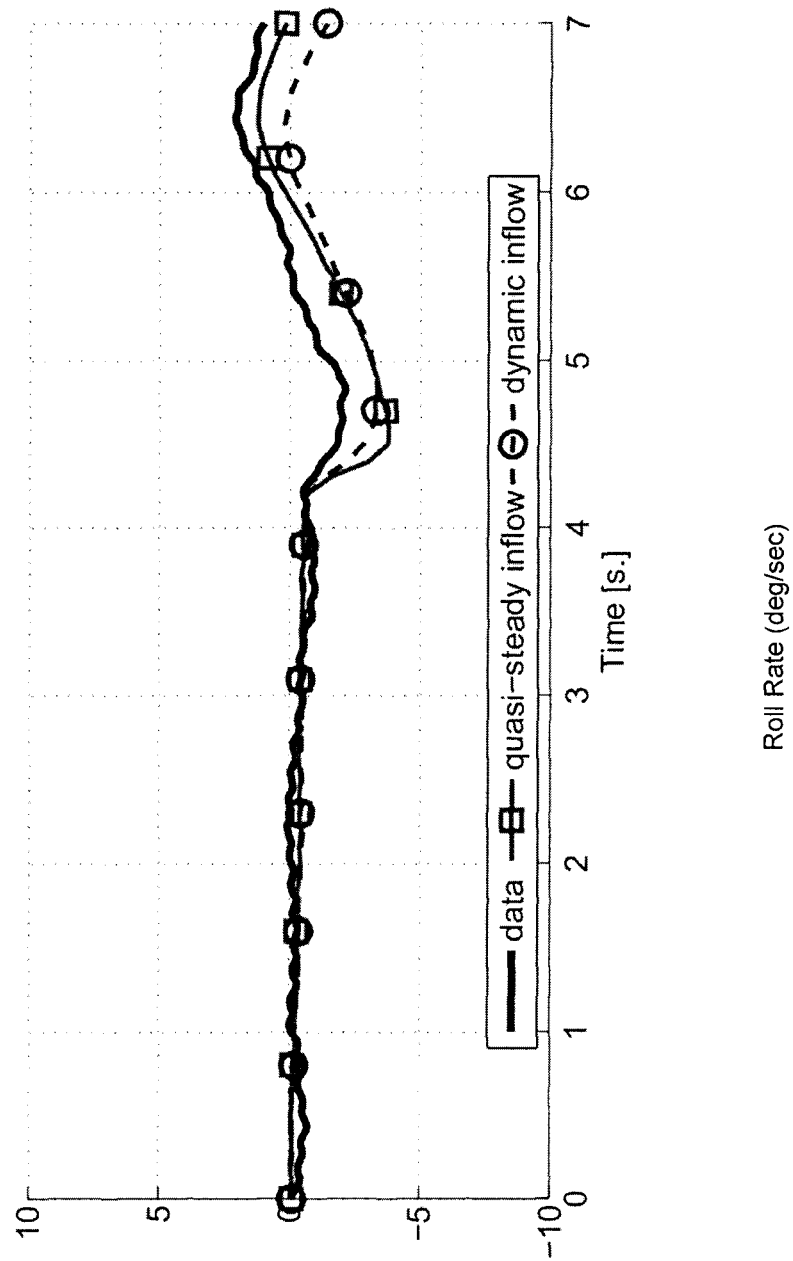

Results for longitudinal and lateral cyclic step inputs in 75-knot cruise are presented in FIGS. 17a-c (OO-BERM validation—longitudinal cyclic forward input at 75 knots), 18a-c (OO-BERM validation—longitudinal cyclic aft input at 75 knots), and 19a-c (OO-BERM validation—lateral cyclic input at 75 knots).

The difference in off-axis response between the quasi-steady and dynamic inflow models is shown in FIG. 17c for a forward cyclic input. As with the hover results, a less abrupt roll acceleration is predicted by the dynamic inflow model following longitudinal control inputs than the quasi-steady inflow model, even though both were configured to produce nearly the same control derivatives. The off-axis roll rate follows the shape of the flight test data closely, but with a −2 deg/s offset caused by excessive initial acceleration. Unlike in hover, the errors of $L_{\delta lon}$ are 10.2% and 6.3% for the quasi-steady and dynamic inflow models, respectively (Tables 4b and 4c). $L_q$ is not in question since the roll rate evolution during the free response matches the shape of the flight test response well. The excessive roll acceleration in this case could be due to a lack of bandwidth of the 6-DoF state-space model as discussed in the System Identification section, which could have biased the control derivative estimates. However, it was beyond the scope of this initial research to study how higher order state-space models could be used as a basis for blade element model optimization. This question merits further research. Nevertheless, on-axis pitch response (FIG. 17b) follows the flight test data closely, especially during the first 1.5 s following the control input.

Figure 18A:
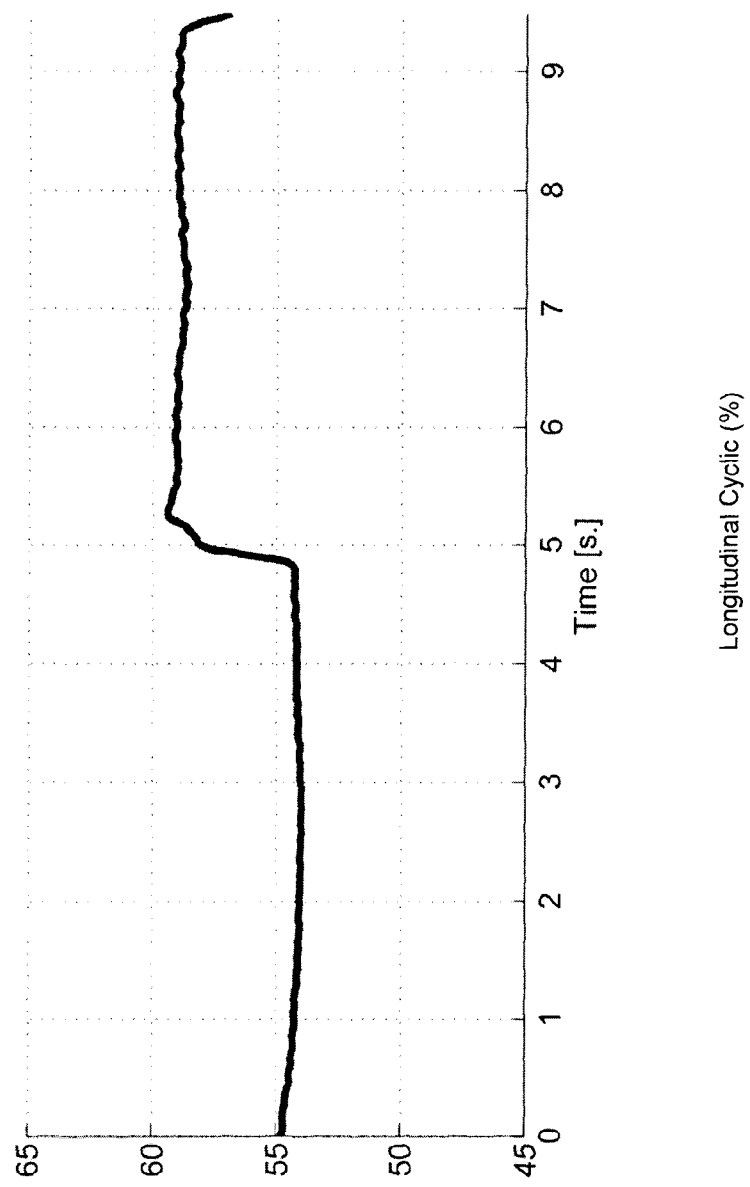
FIGS. 18a-c illustrate an OO-BERM validation (longitudinal cyclic aft input at 75 knots).
Figure 18B:
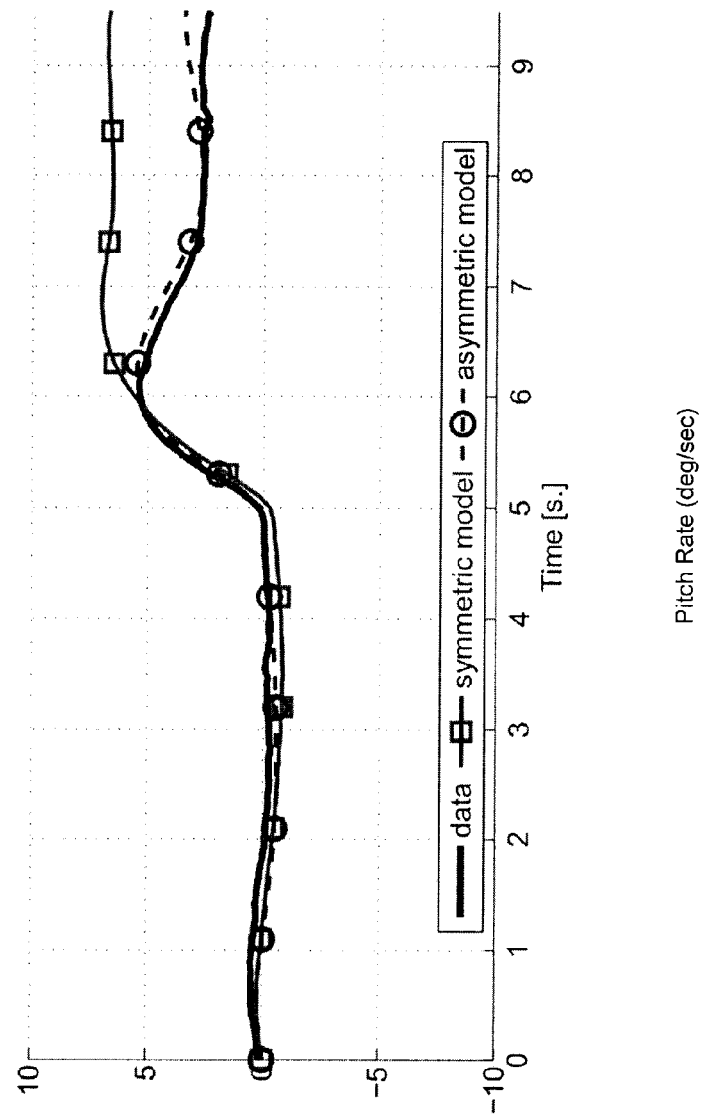
Figure 18C:
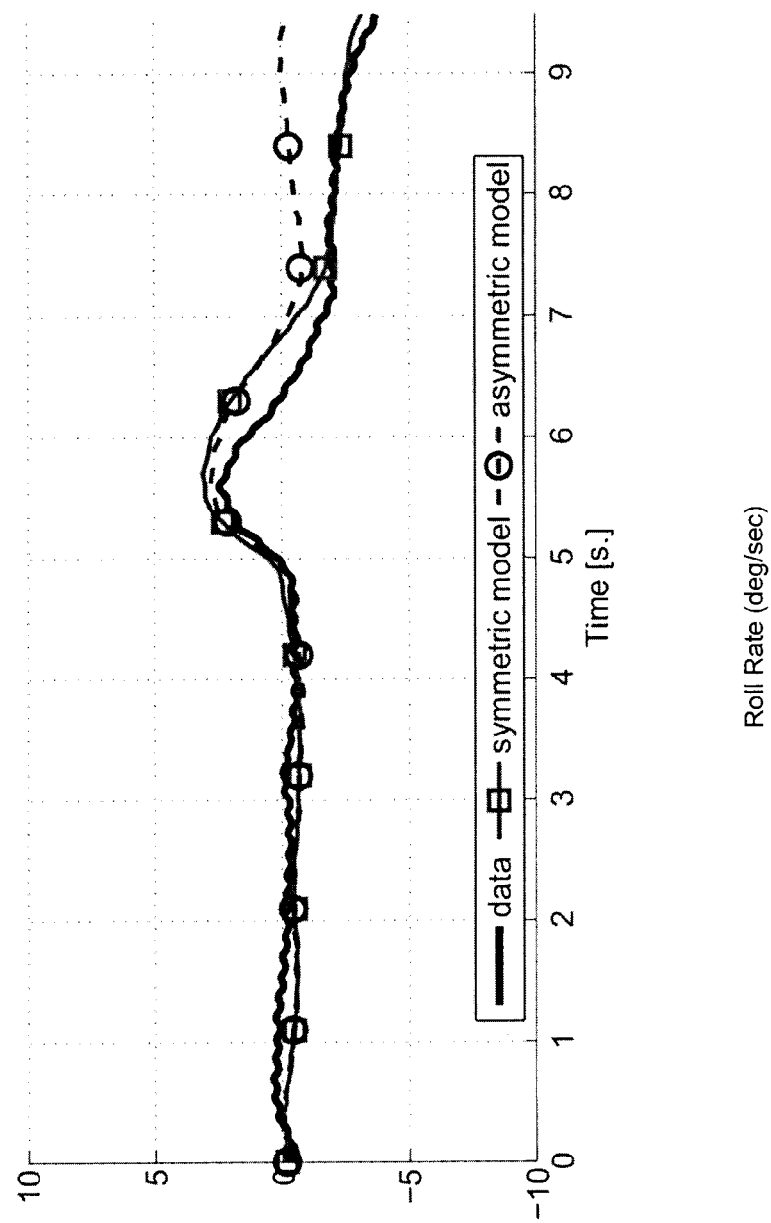

The results for an aft cyclic input are presented in FIGS. 18a-c. This figure highlights the difference between the linear and nonlinear body aerodynamic pitching moments, discussed in the Cruise State-Space Model Identification section above. Both results were generated using the dynamic inflow model. The pitch response (FIG. 18b) during the first 0.5 s following the control input exhibits the same acceleration as the flight test data, which validates the rotor optimization for this condition. The linear model overshoot after t=6 s reflects the imbalance between the constant values $M_w$ and $M_q$ in the linear model. The nonlinear model, which implements variable airframe pitching moments vs. w and q according to nonlinear parameter estimates, matches the on-axis pitch response within Level-D tolerances with no arbitrary tuning. The roll rate (FIG. 18c) exhibits the same initial overshoot as in the forward input case, but follows the subsequent decay until t=7 s with only a 1 deg/s offset compared to the flight test data. The roll rate drift during the last 2 seconds is due to a Dutch roll mode that is apparent in the flight test data yaw rate and sideslip (plots are omitted for brevity), but inadequately excited by the simulation. Since the focus of study was main rotor design optimization, particularly for control derivative accuracy, this residual drift was tolerated. The good correlation of pitch and roll responses during the 3 seconds following the control input was deemed sufficient to validate the rotor optimization method.

Figure 19A:
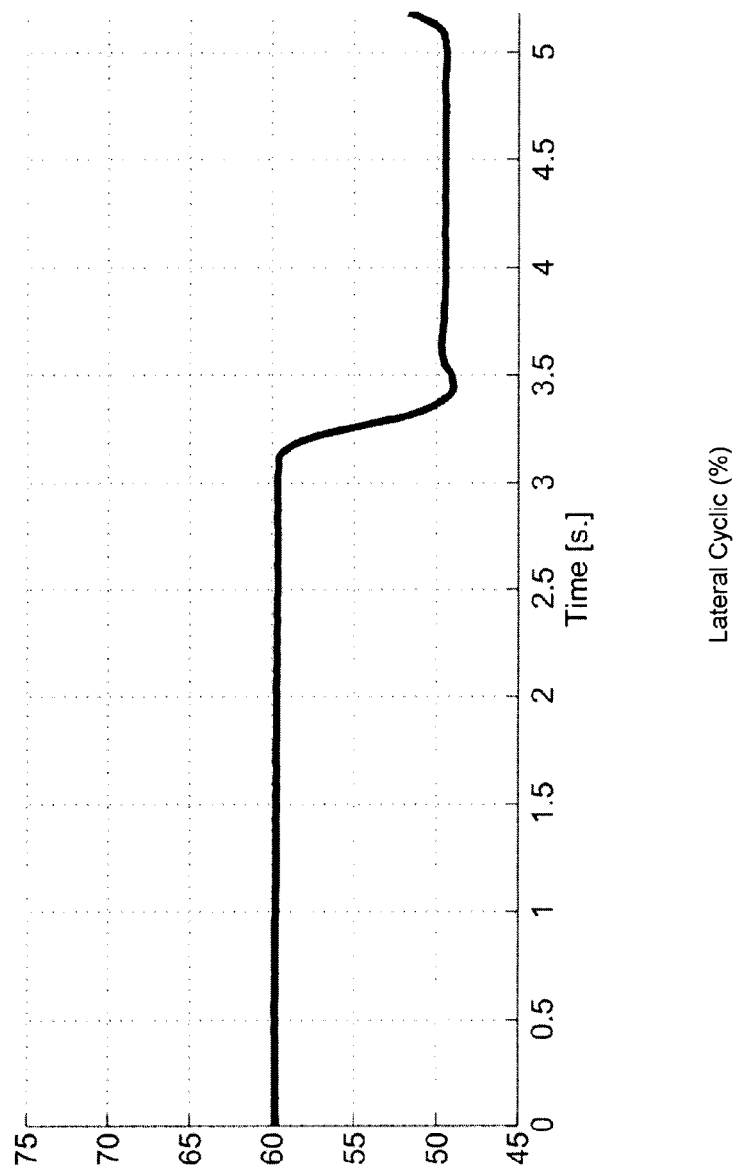
FIGS. 19a-c illustrate an OO-BERM validation (lateral cyclic input at 75 knots).
Figure 19B:
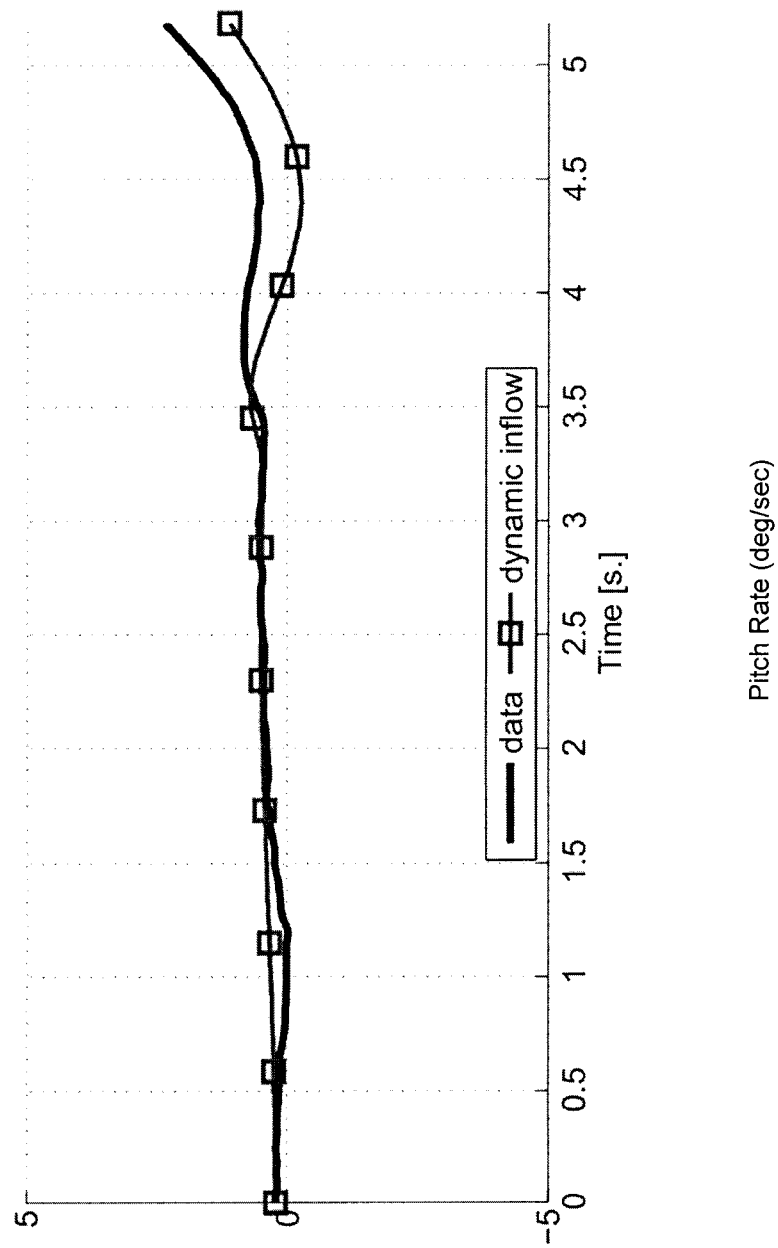
Figure 19C:
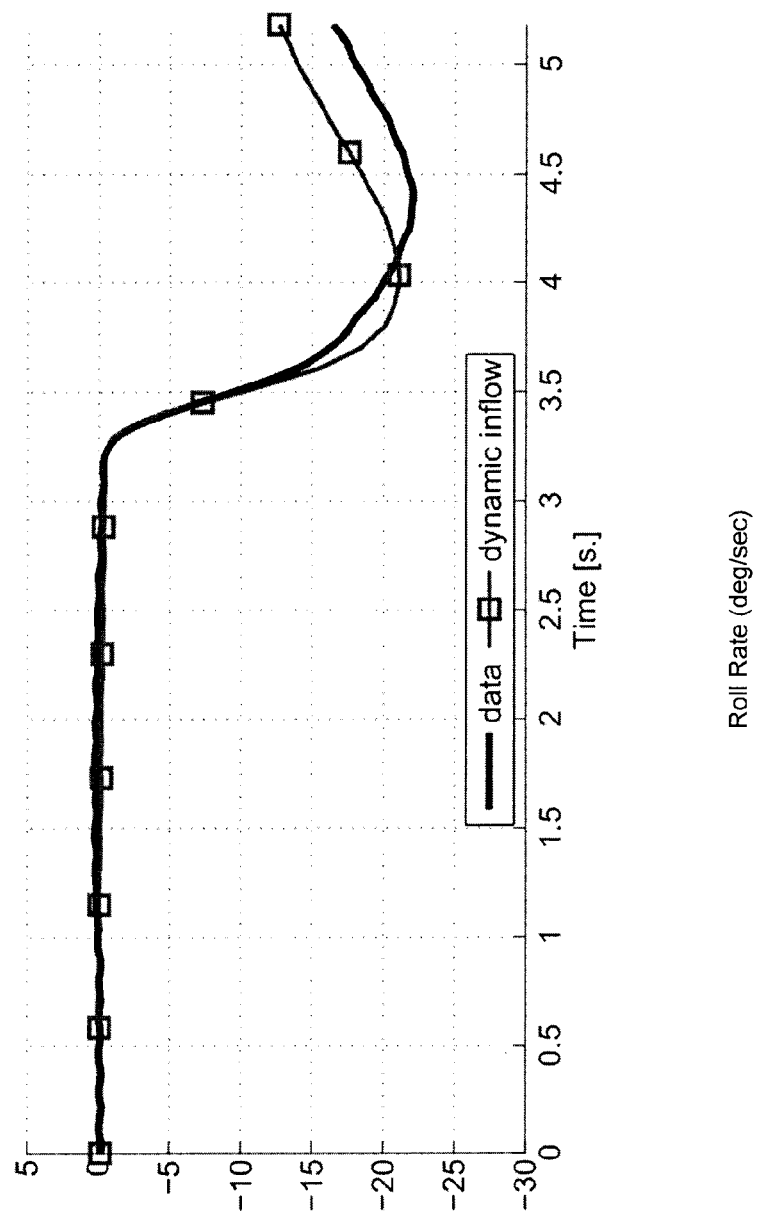

The lateral control response result from the dynamic inflow model is presented in FIGS. 19a-c. As with the preceding tests, the on-axis response (FIG. 19c) correlates well with the flight test data. The relatively small magnitude of $M_{\delta_{lat}}$ is reflected by the low pitch rate attained (FIG. 19b) compared to the roll rate. As in hover, the initial off-axis pitch acceleration is in the correct direction, but the magnitude is under-predicted. The shape of the pitch rate response follows the flight test data with a 0.5-1 deg/s offset during the free response after t=3.5 s. The under-prediction of initial pitch acceleration is consistent with the $M_{\delta_{lat}}$ error of 44.8% (Table 4c).

These blade element simulation responses are consistent with the accuracy of the control derivatives resulting from the optimization procedure. Differences in initial off-axis roll acceleration were observed, which may be due to a difference in bandwidth between the identified 6-DoF model and the higher-order blade element simulation. In general, the OO-BERM configured using the systematic method described in this paper predicted pitch and roll responses that either satisfy Level-D control response tolerances or are close to the tolerance limits.

Conclusions

A systematic method was presented for developing blade element models for pilot training simulation with incomplete knowledge of the helicopter configuration data. A 6-DoF state-space model is identified from flight test data at various design points within the flight envelope. The identified stability and control derivatives are used as targets for blade element model optimization in which the design variables include unknown configuration data. This embeds stability and control validation within the blade element model development process.

This method was applied to a real-world simulation design problem. The main rotor swash plate phase angle, pitch-flap coupling angle and flap hinge stiffness were the design variables; the objective function included on- and off-axis pitch and roll control derivatives. An optimal solution covering the flight envelope from hover to 120 knots cruise was found for each of two blade element model structures: one incorporating quasi-static inflow, the other incorporating three-state dynamic inflow. Each optimized model was validated with flight test data in hover and cruise regimes. The conclusions of the study are as follows:

1. The cruise state-space model had to include a nonlinear pitching moment derivative due to vertical speed in order to reproduce pitch dynamics accurately. However, this had little effect on the control derivative estimates.

2. It was possible to optimize the rotor design for each blade element model structure. The optimal design solution for the dynamic inflow model was more physically realistic than for the quasi-static inflow model.

3. The quality of time responses predicted by the blade element model optimized for both inflow models were comparable. However, the dynamic inflow results exhibited more accurate initial roll acceleration due to longitudinal cyclic input, and consequently, better phasing of roll rate evolution with respect to the flight test data.

4. It is possible that off-axis control derivatives were overestimated due to bandwidth limitation of the 6-DoF state-space model. This was manifested as excessive peak roll rate due to longitudinal cyclic input in cruise predicted by the blade element model, which simulates higher-order dynamics.

5. The blade element simulation responses were consistent with the accuracy of the control derivatives resulting from the optimization procedure. The on-axis control derivatives were simulated accurately. The optimization procedure yielded an off-axis control derivative $M_{\delta_{lat}}$ that was lower than the identified derivative. The blade element simulation lateral cyclic control responses confirmed this under-prediction.

6. It was possible to configure the blade element model to predict pitch and roll responses that either satisfied Level-D control response tolerances or were close to the tolerance limits without arbitrary tuning.

Further research should be undertaken to quantify the sensitivity of time responses to the quality of optimized control and stability derivatives. More comprehensive optimization is recommended, by including more design variables in the optimization procedure and expanding the optimization to include control and stability derivatives simultaneously. Finally, the necessity and possibility of incorporating higher-order state-space model parameters as optimization targets should be investigated.

Acknowledgments

The authors are grateful to David McMahon for his work on system identification and model configuration, and to Mike Theophanides and MingXin Xie for OO-BERM software design, development and support.

REFERENCES

[1] anon., Helicopter Training Toolkit, U.S. JHSIT, 1st Ed., September 2009.

[2] anon., Joint Aviation Requirements, JAR-FSTD H: Helicopter Flight Simulation Training Devices, Initial Issue, May 2008.

[3] Van Esbroeck, P., and Giannias, N., "Model Development of a Level D Black Hawk Flight Simulator," Paper No. AIAA-2000-4582, AIAA Modeling and Simulation Technologies Conference, Denver, Colo., August 2000.

[4] Smith, S., "Helicopter Simulation Modeling Techniques for Meeting FAA AC120-63 Level D Qualification Requirements," Proceedings of the American Helicopter Society 56th Annual Forum, Virginia Beach, Va., May 2000.

[5] Quiding, C., Ivler, C., and Tischler, M., "GenHel S-76C Model Correlation using Flight Test Identified Models," Proceedings of the American Helicopter Society 64th Annual Forum, Montréal, Canada, Apr. 29-May 1, 2008.

[6] van der Vorst, J., Zeilstra, K. D. S., Jeon, D. K., Choi, H. S., and Jun, H. S., "Flight Mechanics Model Development for a KA32 Training Simulator," Proceedings of the 35th European Rotorcraft Forum, Hamburg, Germany, September 2009.

[7] Spira, D., and I., Davidson, "Development and Use of an Advanced Tandem-Rotor Helicopter Simulator for Pilot Training," Proceedings of the RAeS Conference on The Challenge of Realistic Rotorcraft Simulation, London, UK, November 2001.

[8] Howlett, J. J., "UH-60A Black Hawk Engineering Simulation Program: Vol. 1: Mathematical Model," NASA CR-166309, 1981.

[9] anon., Federal Register 14 CFR Part 60, Federal Aviation Administration, May 2008.

[10] Jategaonkar, R. J., Flight Vehicle System Identification: A Time Domain Methodology, American Institute of Aeronautics and Astronautics, Reston, Va., 2006, Chapter 12.

[11] Hamel, P. G., and Kaletka, J., "Advances in Rotorcraft System Identification", Progress in Aerospace Science, Vol. 33, pp. 259-284, 1997.

[12] Talbot, P. D., Tinling, B. E., Decker, W. A., and Chen, R. T. N., "A Mathematical Model of a Single Main Rotor Helicopter for Piloted Simulation," NASA TM-84281, 1982.

[13] Tischler, M. B., and Remple, R. K., Aircraft and Rotorcraft System Identification: Engineering Methods with Flight Test Examples, American Institute of Aeronautics and Astronautics, Reston, Va., 2006.

[14] Murray, J. E., and Maine, E. M., pEst Version 2.1 User's Manual, NASA Technical Memorandum 88280, Ames Research Center, Dryden Flight Research Facility, Edwards, Calif., 1987.

[15] Padfield, G. D., Helicopter Flight Dynamics: The Theory and Application of Flying Qualities and Simulation Modeling, AIAA Education Series, Washington, D C, 1996, Chapter 4.

[16] Theophanides, M., and Spira, D., "An Object-Oriented Framework for Blade Element Rotor Modelling and Scalable Flight Mechanics Simulation," Proceedings of the 35$^{th}$ European Rotorcraft Forum, Hamburg, Germany, Sep. 22-25, 2009.

[17] Bailey, F. J., "A Simplified Theoretical Method of Determining the Characteristics of a Lifting Rotor in Forward Flight," NACA Report No. 716, 1941.

[18] Prouty, R. W., Helicopter Performance, Stability, and Control, Krieger Publishing Company, Malabar, Fla., 1995.

[19] Peters, D., and HaQuang, N., "Dynamic Inflow for Practical Applications", Journal of the American Helicopter Society, Vol. 33, No. 4, October 1988.

[20] Kantorovich, L. V., "On the method of steepest descent", Dokl. Akad. Nauk SSSR, Vol. 56, No. 3, pp. 233-236, 1947.

The invention claimed is:

1. A method of updating a dynamics model of a vehicle, the method comprising:
   providing a state-space model having a plurality of coefficients describing the dynamics of the vehicle;
   providing a physically-based model having a parameter related to a first predetermined vehicle state selected from a group consisting of (a) a set of physical characteristics of the vehicle, (b) a set of phenomena influencing the dynamics of the vehicle and (c) a combination thereof;
   selecting a coefficient of the state-space model, the selected coefficient having a first value for the first predetermined state;
   varying a value of the parameter of the physically-based model;
   storing an updated value of the parameter of the physically-based model when a difference between a value predicted by the physically-based model and the value of the selected coefficient of the state-space model is within a first predetermined range for the first predetermined vehicle state; and
   using the dynamics model of the vehicle in a computer-controlled vehicle simulation.

2. The method of claim 1, comprising:
   selecting a group of coefficients among the plurality of coefficients of the state-space model; and
   storing the updated value of the parameter of the physically-based model when differences between values of each of the selected coefficients of the state-space model and values predicted by the physically-based model with respect to each corresponding selected coefficient are within the first predetermined range.

3. The method of claim 2, wherein the selected group of coefficients defines a first group of coefficients, the method further comprising:
   validating the updated physically-based model against actual vehicle operating data; and
   if the validation fails:
      changing at least one of the coefficients in the first group of coefficients to define a second group of coefficients, and
      recalculating the differences from values predicted by the physically-based model based on the second group of coefficients.

4. The method of claim 1, comprising concurrently varying a plurality of parameters of the physically-based model.

5. The method of claim 4, comprising:
   selecting a group of coefficients among the plurality of coefficients of the state-space model; and
   storing updated values for each of the plurality of parameters of the physically-based model when differences between values of each of the selected coefficients of the state-space model and values predicted by the physically-based model with respect to each corresponding selected coefficient are within the first predetermined range.

6. The method of claim 4, wherein the plurality of parameters defines a first plurality of parameters, the method further comprising:
   validating the updated physically-based model against actual vehicle operating data; and if the validation fails:
changing at least one of the parameters in the first plurality of parameters to define a second plurality of parameters, and
concurrently varying the second plurality of parameters.

7. The method of claim 1, wherein the selected coefficient has a second value for a second predetermined vehicle state, the method comprising:
varying the value of the parameter of the physically-based model such that, concurrently:
a first difference between a first value predicted by the physically-based model and the first value of the coefficient of the state-space model for the first predetermined vehicle state is within the first predetermined range, and
a second difference between a second value predicted by the physically-based model and the second value of the coefficient of the state-space model for the second predetermined vehicle state is within a second predetermined range for the second predetermined vehicle state.

8. The method of claim 1, comprising:
selecting a group of coefficients among the plurality of coefficients of the state-space model, each of the selected coefficients having a first value for the first predetermined vehicle state and a second value for a second predetermined vehicle state;
wherein, concurrently:
a first difference between the first value of each of the selected coefficients of the state-space model for the first predetermined vehicle state and a first value predicted by the physically-based model with respect to that coefficient is within the first predetermined range, and
a second difference between the second value of each of the selected coefficients of the state-space model for the second predetermined vehicle state and a second value predicted by the physically-based model with respect to that coefficient is within a second predetermined range for the second predetermined vehicle state.

9. The method of claim 1, wherein the selected coefficient has a second value for a second predetermined vehicle state, the method comprising:
concurrently varying a plurality of parameters of the physically-based model such that, concurrently
a first difference between a first value predicted by the physically-based model and the first value of the coefficient of the state-space model for the first predetermined vehicle state is within the first predetermined range, and
a second difference between a second value predicted by the physically-based model and the second value of the coefficient of the state-space model for the second predetermined vehicle state is within a second predetermined range for the second predetermined vehicle state.

10. The method of claim 1, comprising:
selecting a group of coefficients among the plurality of coefficients of the state-space model, each of the selected coefficients having a first value for the first predetermined vehicle state and a second value for a second predetermined vehicle state;
concurrently varying a plurality of parameters of the physically-based model such that, concurrently:
a first difference between the first value of each of the selected coefficients of the state-space model for the first predetermined vehicle state and a first value predicted by the physically-based model with respect to that coefficient is within the first predetermined range, and
a second difference between the second value of each of the selected coefficients of the state-space model for the second predetermined vehicle state and a second value predicted by the physically-based model with respect to that coefficient is within a second predetermined range for the second predetermined vehicle state.

11. The method of claim 1, further comprising:
validating the updated physically-based model against actual vehicle operating data; and
if the validation fails:
altering at the first predetermined range; and
recalculating differences based on values predicted by the physically-based model.

12. The method of claim 1, further comprising
validating the updated physically-based model against actual vehicle operating data; and
if the validation fails:
altering the physically-based model; and
recalculating differences based on values predicted by the altered physically-based model.

13. The method of claim 1, wherein the physically-based model is constructed from a library of predetermined model components.

14. The method of claim 1, wherein the coefficients of the state-space model are selected from a group consisting of stability and control derivatives of the state-space model.

15. The method of claim 1, wherein the parameters of the physically-based model are selected from a group consisting of parameters related to rotor inflow, unsteady aerodynamics, fuselage aerodynamics, empennage aerodynamics, rotor downwash impingement on the fuselage, tail rotor and empennage, tandem-rotor configuration mutual rotor inflow interaction, aeroelastics, and aeromechanical configuration.

16. The method of claim 1, comprising a numerical optimization includes including a gradient-based analysis.

17. The method of claim 1, wherein a computer implements a numerical optimization process to vary the value of the parameter of the physically-based model and to determine when to store the updated value of the parameter of the physically-based model.

18. A non-transitory computer-readable information storage device storing the dynamics model of the vehicle updated using the method of claim 1.

19. A computer-controlled vehicle simulator for simulating a vehicle, the computer-controlled vehicle simulator comprising:
the non-transitory computer-readable information storage device of claim 18;
a computer processor in operative communication with the non-transitory computer-readable information storage device; and
an actuator for mechanically actuating the computer-controlled vehicle simulator, the computer processor controlling the actuator via use of the dynamics model of the vehicle.

20. The computer-controlled vehicle simulator of claim 19, wherein the vehicle is an aircraft and wherein the computer-controlled vehicle simulator is a flight simulator, the computer-controlled vehicle simulator further comprising:

a simulator cabin for simulating at least a portion of a flight deck of the aircraft; and a plurality of actuators structured and arranged to produce accelerations in multiple degrees of freedom within the simulator cabin.

21. A computer-controlled vehicle simulator for simulating a vehicle, the computer-controlled vehicle simulator comprising:

the non-transitory computer-readable information storage device of claim 18;

a computer processor in operative communication with the non-transitory computer-readable information storage device; and a visual display system, the computer processor controlling the visual display system via use of the dynamics model of the vehicle in order to depict motion of the vehicle.

\* \* \* \* \*